(12) United States Patent  
Ehrlich

(10) Patent No.: US 8,006,386 B2
(45) Date of Patent: Aug. 30, 2011

(54) METHOD OF MAKING A ONE-PIECE SIDEWALL LINER WITH LOGISTIC SLOT

(75) Inventor: Rodney P. Ehrlich, Monticello, IN (US)

(73) Assignee: Wabash National. L.P., Lafayette, IN (US)

( * ) Notice: Subject to any disclaimer, the term of this patent is extended or adjusted under 35 U.S.C. 154(b) by 0 days.

(21) Appl. No.: 12/503,234

(22) Filed: Jul. 15, 2009

(65) Prior Publication Data

US 2009/0271969 A1     Nov. 5, 2009

Related U.S. Application Data

(60) Division of application No. 11/401,730, filed on Apr. 11, 2006, now abandoned, which is a continuation-in-part of application No. 10/925,609, filed on Aug. 25, 2004, now abandoned.

(51) Int. Cl.
*B21D 53/88* (2006.01)
(52) U.S. Cl. ..................... 29/897.2; 296/186.1
(58) Field of Classification Search ............... 29/897.2; 83/620, 331–349; 296/186.1
See application file for complete search history.

(56) References Cited

U.S. PATENT DOCUMENTS

| | | | |
|---|---|---|---|
| 2,107,068 A * | 2/1938 | Dauwalter | 83/169 |
| 2,389,769 A | 11/1945 | Folsom | |
| 3,303,075 A | 2/1967 | Rebus | |
| 3,433,692 A | 3/1969 | Gewiss | |
| 3,460,299 A | 8/1969 | Wilson | |
| 3,500,710 A * | 3/1970 | Taber | 83/588 |
| 3,530,830 A * | 9/1970 | Smith | 119/406 |
| 3,557,992 A | 1/1971 | Reeves | |
| 3,614,154 A | 10/1971 | Evans | |
| 3,711,148 A | 1/1973 | Hindin | |
| 3,817,569 A | 6/1974 | Ehrlich | |
| 3,842,755 A * | 10/1974 | Carr | 410/113 |
| 3,884,646 A | 5/1975 | Kenney | |
| 3,917,338 A | 11/1975 | Becker | |
| 3,917,354 A | 11/1975 | Adams, Jr. | |
| 3,951,284 A | 4/1976 | Fell et al. | |
| 3,980,196 A | 9/1976 | Paulyson et al. | |
| 4,020,725 A * | 5/1977 | Climo | 83/349 |
| 4,021,074 A | 5/1977 | Heiser | |
| 4,054,226 A | 10/1977 | Bjelland et al. | |
| 4,082,882 A | 4/1978 | Weinstein et al. | |
| 4,089,555 A | 5/1978 | Allen | |
| 4,089,558 A | 5/1978 | Banerjea et al. | |
| 4,124,136 A | 11/1978 | Bielland et al. | |
| 4,155,469 A | 5/1979 | Cole | |
| 4,185,024 A | 1/1980 | Handrick et al. | |

(Continued)

FOREIGN PATENT DOCUMENTS

SU     179579     2/1966

*Primary Examiner* — David P Bryant
*Assistant Examiner* — Jacob J Cigna

(57) ABSTRACT

A method of forming an inner wall of a sidewall configuration of a trailer is provided which comprises the steps of: (a) providing a plurality of posts, each post having slots provided therethrough; (b) providing at least one pre-configured punching die; (c) providing a one-piece continuous liner; (d) securing the one-piece continuous liner to the plurality of posts; and (e) punching slots through the one-piece continuous liner with the at least one pre-configured punching die. In a first embodiment of the method, step (d) is performed before step (e). In a second embodiment of the method, step (e) is performed before step (d).

29 Claims, 36 Drawing Sheets

U.S. PATENT DOCUMENTS

| | | |
|---|---|---|
| 4,226,189 A | 10/1980 | Bertolini |
| 4,309,054 A | 1/1982 | Allen |
| 4,372,568 A | 2/1983 | Campbell |
| 4,516,906 A | 5/1985 | Krein |
| 4,592,583 A | 6/1986 | Dresen et al. |
| 4,627,629 A | 12/1986 | O'Neill |
| 4,640,729 A | 2/1987 | Fujii et al. |
| 4,643,314 A | 2/1987 | Kidd |
| 4,684,424 A | 8/1987 | Augason |
| 4,729,505 A | 3/1988 | Remaks et al. |
| 4,744,137 A | 5/1988 | Palazzo |
| 4,783,228 A | 11/1988 | Aker et al. |
| 4,863,339 A | 9/1989 | Krein |
| 4,884,496 A | 12/1989 | Donavich |
| 4,940,279 A | 7/1990 | Abott et al. |
| 4,942,978 A | 7/1990 | Bessette |
| 4,958,472 A | 9/1990 | Ehrlich |
| 5,009,564 A | 4/1991 | Lutz et al. |
| 5,022,809 A | 6/1991 | Hinson |
| 5,026,112 A | 6/1991 | Rice |
| 5,038,960 A | 8/1991 | Seery |
| 5,137,170 A | 8/1992 | Matias |
| 5,189,935 A * | 3/1993 | Rosemann ............... 83/343 |
| 5,222,621 A | 6/1993 | Matias |
| 5,225,812 A | 7/1993 | Faghri |
| 5,240,301 A | 8/1993 | Arnold |
| 5,492,747 A * | 2/1996 | Kemp et al. ............ 428/98 |
| 5,683,525 A | 11/1997 | Kemp et al. |
| 5,794,502 A * | 8/1998 | Arens et al. ............ 83/670 |
| 5,934,742 A | 8/1999 | Fenton et al. |
| 6,253,819 B1 * | 7/2001 | Frendle et al. ........... 156/518 |
| 6,412,854 B2 * | 7/2002 | Ehrlich .................. 296/191 |
| 6,505,883 B1 | 1/2003 | Ehrlich |
| 6,626,622 B2 | 9/2003 | Zubko |
| 6,655,250 B1 * | 12/2003 | Ishii et al. ............... 83/559 |
| 6,986,546 B2 | 1/2006 | Ehrlich |
| 2005/0134086 A1 | 6/2005 | Jones et al. |
| 2005/0242621 A1 | 11/2005 | Buchholz et al. |
| 2005/0248183 A1 | 11/2005 | Booher |
| 2006/0028050 A1 | 2/2006 | Ehrlich |

* cited by examiner

METHOD OF MAKING A ONE-PIECE SIDEWALL LINER WITH LOGISTIC SLOT

CROSS-REFERENCE AND INCORPORATION BY REFERENCE

This application is a Divisional of co-pending U.S. patent application Ser. No. 11/401,730, filed on Apr. 11, 2006, and entitled "One-Piece Sidewall Liner With Logistic Slot And Method Of Making Same" which, in turn, is a Continuation-In-Part of U.S. patent application Ser. No. 10/925,609, filed on Aug. 25, 2004, and entitled "One-Piece Sidewall Liner With Logistic Slot And Method Of Making Same", now abandoned. U.S. patent application Ser. Nos. 11/401,730 and 10/925,609 are hereby incorporated by reference herein in their entireties.

BACKGROUND OF THE INVENTION

The present invention relates to a sidewall construction for a trailer and a method of forming same. More specifically, the present invention relates to an inner wall of a sidewall construction for a trailer which is formed of a one-piece continuous liner secured to posts of the trailer, where the posts and the one-piece continuous liner both have slots therethrough for enabling engagement of equipment to the sidewall of the trailer, as well as the method of forming same.

Trailers are formed to have sidewalls which are both strong, in order to withstand the abuse put on them, for instance by forklifts banging in to them, as well as lightweight such that more cargo can be stored within the trailer as there are weight restrictions on trailers when they travel across certain roads and highways. The construction and method of forming these sidewalls, though, are often complex. Also, such constructions and methods do not generally provide means for allowing the engagement of equipment, which can be very beneficial during the transportation of cargo within the trailer.

Thus, there is a need for a sidewall construction for a trailer which overcomes the aforementioned disadvantages. The present invention provides such a sidewall construction for a trailer. Features and advantages of the present invention will become apparent upon a reading of the attached specification, in combination with a study of the drawings.

SUMMARY OF THE INVENTION

Briefly, and in accordance with the foregoing, the invention provides a method of forming an inner wall of a sidewall configuration of a trailer is provided which comprises the steps of: (a) providing a plurality of posts; each post having slots provided therethrough; (b) providing at least one pre-configured punching die; (c) providing a one-piece continuous liner; (d) securing the liner to the plurality of posts; and (e) punching slots through the liner with the at least one pre-configured punching die. In a first embodiment of the method, step (d) is performed before step (e). In a second embodiment of the method, step (e) is performed before step (d).

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 8 is a flow chart of the first embodiment of the method;

FIG. 9 is a perspective view of the one-piece continuous liner being secured to the frame by an adhesive;

FIG. 10 is an enlarged, partially cut-away perspective view of the one-piece continuous liner being secured to the frame by an adhesive;

FIG. 11 is a perspective view of the pre-configured punching die punching slots through the one-piece continuous liner which is secured to the frame by the adhesive;

FIG. 12 is a perspective view of the one-piece continuous liner being secured to the frame by the adhesive and having the slots punched therethrough;

FIG. 13 is a perspective view of the one-piece continuous liner being secured to the frame by the adhesive and having the slots punched therethrough, and having a scuff plate secured to a bottom end of the one-piece continuous liner by an adhesive;

FIG. 14 is an enlarged, partially cut-away perspective view of the scuff plate being secured to a bottom end of the one-piece continuous liner by an adhesive;

FIG. 15 is a flow chart of the second embodiment of the method;

FIG. 16 is a perspective view of the one-piece continuous liner being secured to the frame by a plurality of rivets;

FIG. 17 is a cross-sectional view of the one-piece continuous liner being secured to the frame by a plurality of rivets;

FIG. 18 is a perspective view of the one-piece continuous liner being secured to the frame by a plurality of rivets and having the slots punched therethrough;

FIG. 19 is a flow chart of the third embodiment of the method;

FIG. 20 is a perspective view of the one-piece continuous liner being secured to the frame by rivets and by adhesive, and having the slots punched therethrough;

FIG. 21 is a flow chart of the fourth embodiment of the method;

FIG. 22 is a perspective view of the one-piece continuous liner having the slots punched therethrough and having apertures provided proximate to the top end thereof;

FIG. 23 is a perspective view of the one-piece continuous liner having the slots punched therethrough and having the apertures provided therethrough proximate to the top end thereof and being secured to the frame by adhesive such that the bottom end of the one-piece continuous liner does not abut against the bottom rail;

FIG. 24 is a perspective view of a scuff plate being adhered to the one-piece continuous liner illustrated in FIG. 23;

FIG. 25 is a flow chart of the fifth embodiment of the method;

FIG. 26 is a perspective view of the one-piece continuous liner being secured to the frame by a plurality of rivets and having the slots punched therethrough;

FIG. 31 is a flow chart of the seventh embodiment of the method;

FIG. 32 is a side view of the one-piece continuous liner being secured to the frame by the adhesive and having the enlarged slots punched therethrough;

DETAILED DESCRIPTION OF THE ILLUSTRATED EMBODIMENTS

Figure 1:
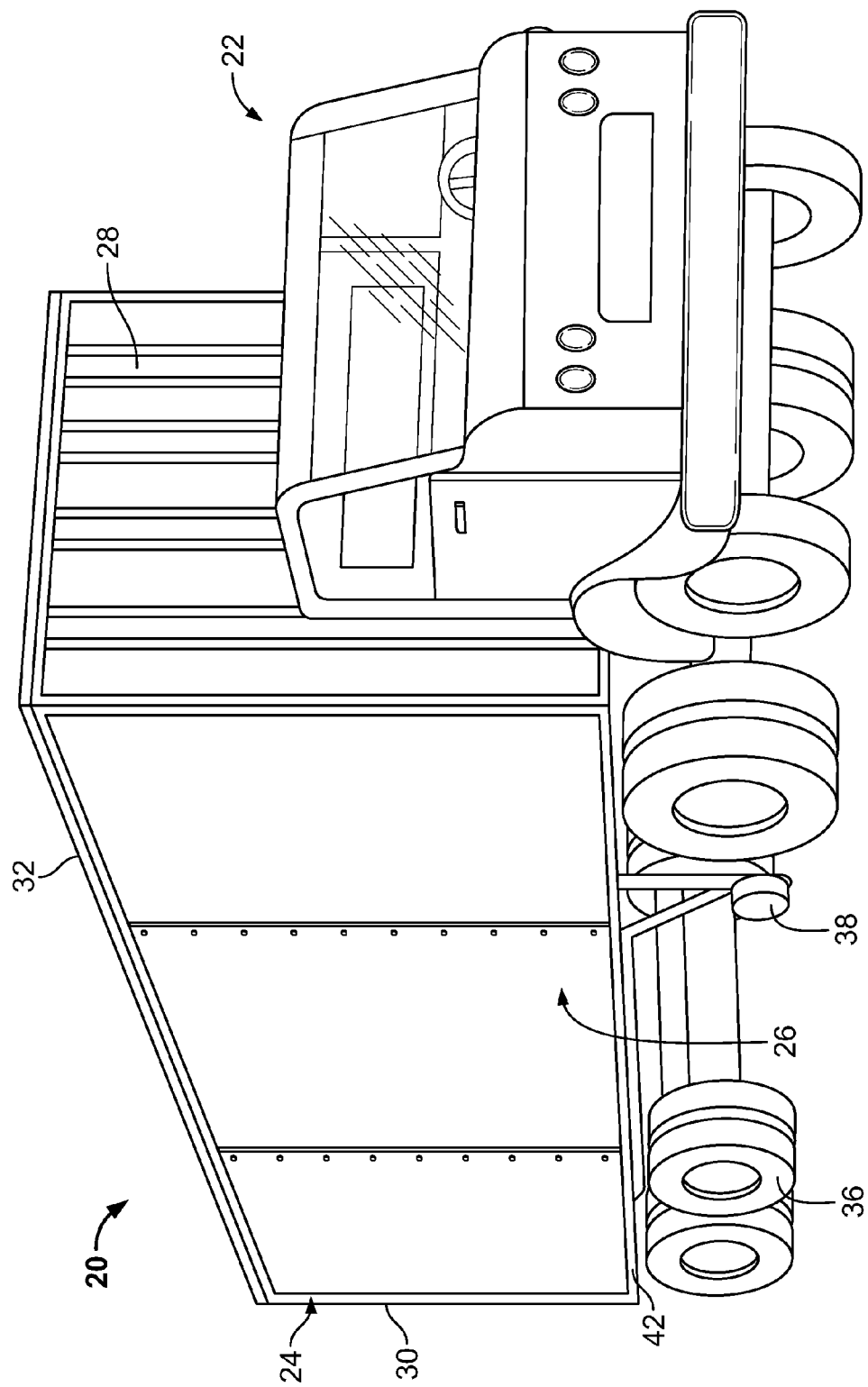
FIG. 1 is a perspective view of a trailer which incorporates the features of the invention with the trailer connected to a tractor.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 2:
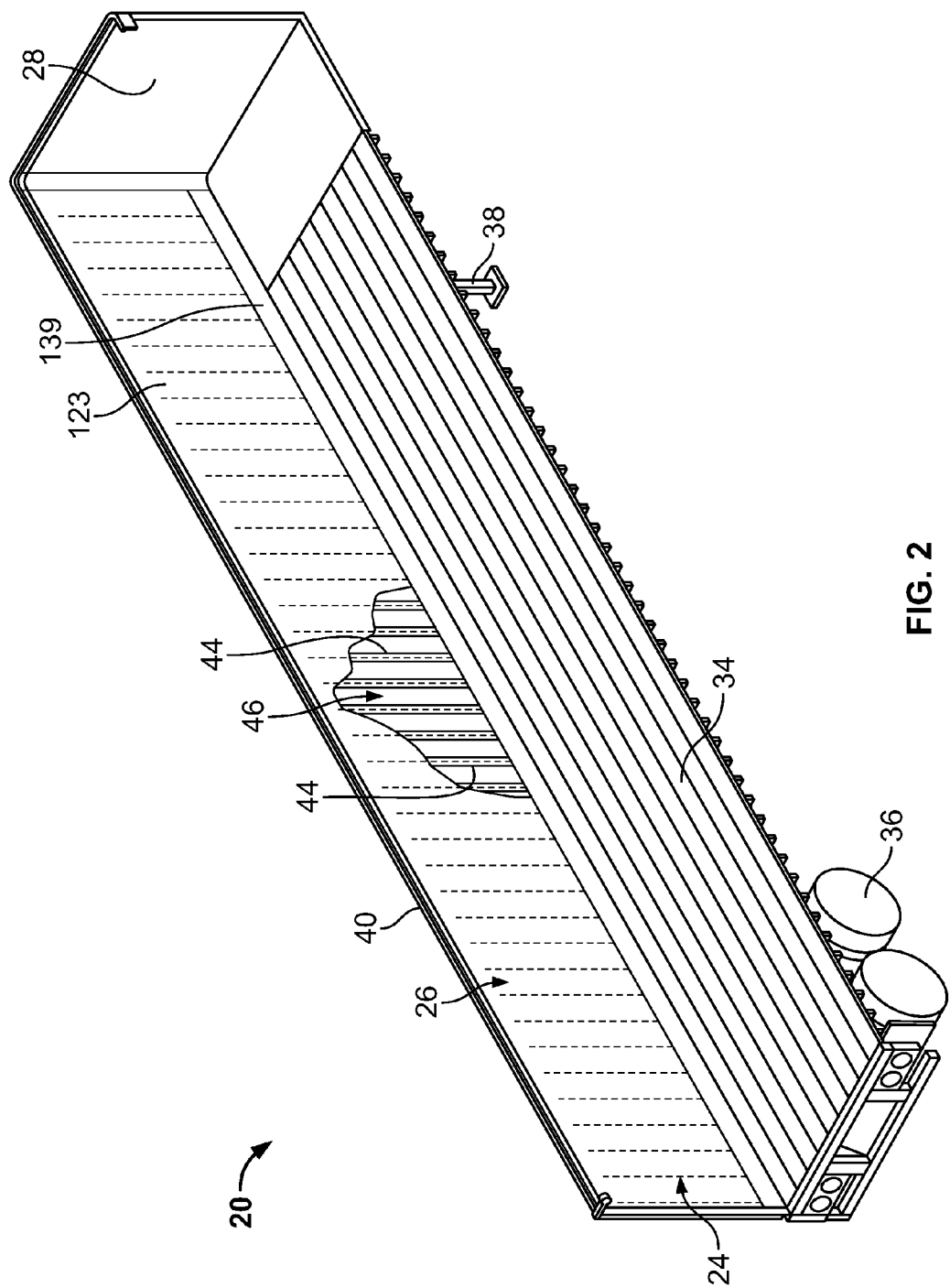
FIG. 2 is a partially cut-away perspective view of the trailer equipped with the one-piece sidewall liner with logistic slot which incorporates features of the present invention.
Figure 3:
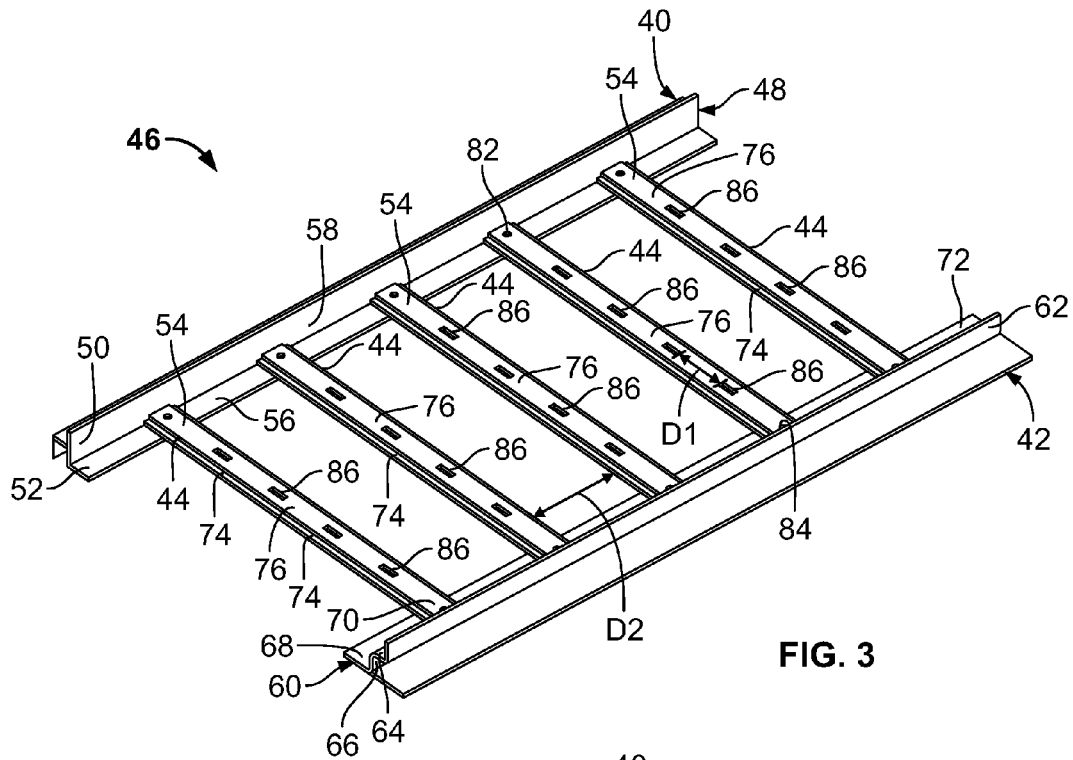
FIG. 3 is a perspective view of a frame of a sidewall of the trailer illustrated in FIG. 2, which is used in forming an inner wall of the sidewall, illustrating a preferred embodiment of the posts of the frame.

A trailer 20 having a pair of sidewalls 26 constructed in accordance with the present invention is shown in FIGS. 1-3. The trailer 20 of FIG. 1 is shown connected to a tractor 22 by conventional means, such as a fifth wheel assembly. The trailer 20 includes a body 24 formed from the pair of rectangular sidewalls 26, a front wall 28, rear doors 30, a top panel or roof 32, and a floor 34. The floor 34 is supported by a conventional rear undercarriage assembly 36 and has a landing gear 38 secured thereunder. The top panel 32 and an upper portion of the sidewalls 26 are secured to a top rail 40, and the floor 34 and lower portion of the sidewalls 26 are secured to a bottom rail 42. A plurality of posts 44 connect the top rail 40 to the bottom rail 42. The top rail 40, the bottom rail 42, and the plurality of posts 44 comprise a frame 46 of the sidewall 26, as illustrated in FIG. 3.

The top rail 40 includes an L-shaped member 48 having a first horizontal flat portion 50 and a second vertical flat portion 52 which is generally perpendicular to the first portion 50. The top panel or roof 32 is attached to a top surface (not shown) of the first portion 50. Top ends 54 of the plurality of posts 44 are attached to an inner surface 56 of the second portion 52 and are positioned proximate to, and preferably abut against, a bottom surface 58 of the first portion 50.

The bottom rail 42 includes a member 60 having a first horizontal flat portion 62, a second vertical flat portion 64, a third horizontal flat portion 66, and a fourth vertical flat portion 68. The first portion 62 is perpendicular to the second portion 64; the second portion 64 is perpendicular to the third portion 66; and the third portion 66 is perpendicular to the fourth portion 68. The first portion 62 is parallel to the third portion 66 and the second portion 64 is parallel to the fourth portion 68. The floor 34 is attached to a top surface (not shown) of the first portion 62. Bottom ends 70 of the plurality of posts 44 are attached to an inner surface 72 of the fourth portion 68 and are positioned proximate to, and preferably abut against, a top surface (not shown) of the third portion 66.

Each post 44 as explained above has a top end 54 and a bottom end 70, and is preferably formed from a strong metal. Each post 44 is preferably formed to have flat end portions 74 and an intermediate portion 76 which bulges inwardly from the flat end portions 74 such that the post 44 is generally U-shaped. Each post 44 also has inner and outer surfaces 78, 80. The top end 54 of each post 44 is positioned against the top rail 40 such that the outer surface 80 of each flat end portion 74 is positioned against the inner surface 56 of the second portion 52 of the top rail 40, and such that the top end 54 of each post 44 is positioned proximate to, and preferably abuts against, the bottom surface 58 of the first portion 50. The bottom end 70 of each post 44 is positioned against the bottom rail 42 such that the outer surface 80 of each flat end portion 74 is positioned against the inner surface 72 of the fourth portion 68 of the bottom rail 42, and such that the bottom end 70 of each post 44 is positioned proximate to, and preferably abuts against, the top surface (not shown) of the third portion 66. Each post 44 is secured to the top and bottom rails 40, 42 by known means, such as by fasteners, for instance rivets, or by adhesive, or both.

Each post 44 has an aperture 82 provided through the intermediate portion 76 thereof proximate to the top end 54 thereof. Each post 44 has an aperture 84 provided through the intermediate portion 76 thereof proximate to the bottom end 70 thereof. The purpose for the apertures 82, 84 being provided through the intermediate portion 76 of each post 44 will be discussed in further detail hereinbelow.

In addition, each post 44 has a plurality of spaced-apart openings or slots 86 therethrough along a length of the intermediate portion 76 thereof, with each of the slots 86 preferably being positioned between the aperture 82 and the aperture 84. Each slot 86 is preferably distanced from an adjacent slot 86 by a predetermined distance D1. The predetermined distance D1 may vary depending on the construction of the trailer 20, but generally equates to twelve (12) inches. Of course, it is to be understood that each post 44 may be outfitted with as many slots 86 as desired, and the positioning of each slot 86 relative to an adjacent slot 86 need not be a predetermined uniform distance. Each slot 86 is preferably rectangular in configuration such that it has opposite lop and bottom edges 87a, 87b and opposite side edges 87c, 87d.

Each post 44 is preferably distanced from an adjacent post 44 by a predetermined distance D2. The predetermined distance D2 may vary depending on the construction of the trailer 20, but generally equates to twelve (12), sixteen (16) or twenty-four (24) inches. Of course, it is to be understood that the positioning of each post 44 relative to an adjacent post 44 need not be a predetermined uniform distance.

While the configuration of the posts 44 as described hereinabove and as best illustrated in FIG. 3 is the preferred embodiment of the posts, the posts can also be configured in any other suitable manner, such as those illustrated in FIGS. 4-6.

Figure 4:
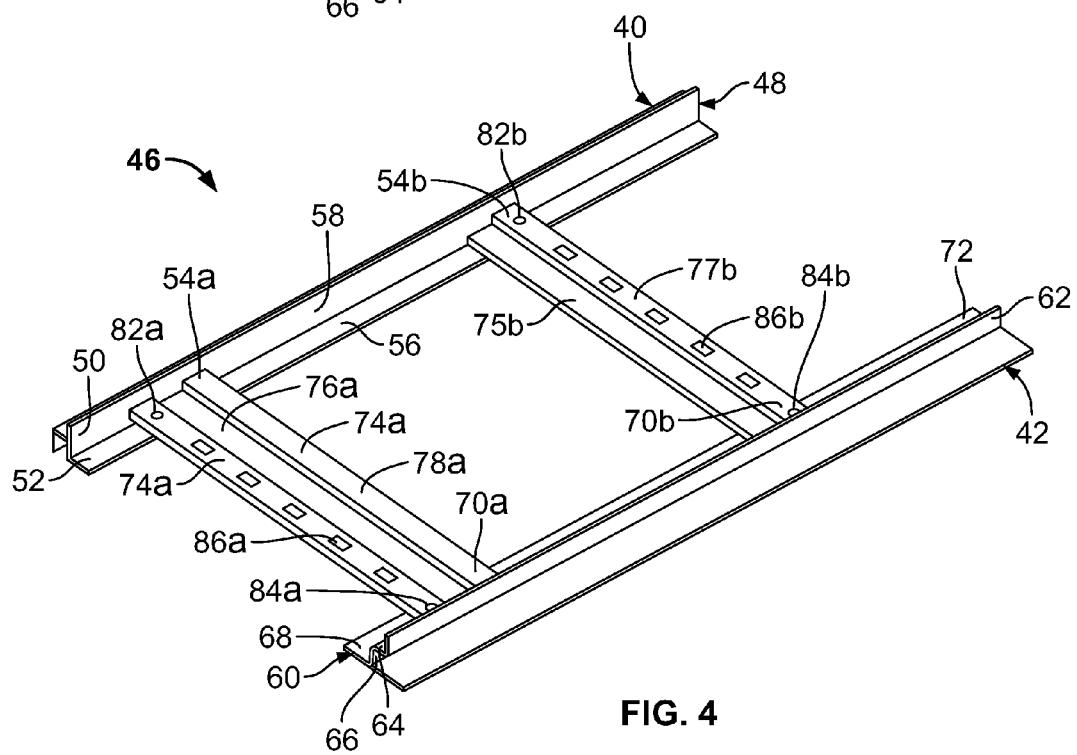
FIG. 4 is a perspective view of a frame of a sidewall of the trailer illustrated in FIG. 2, illustrating two alternative embodiments of the posts of the frame.
Figure 5:
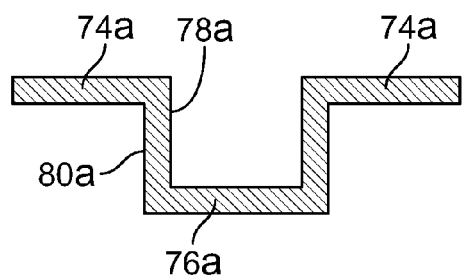
FIG. 5 is a cross-sectional view of the first alternative embodiment of the posts of the frame illustrated in FIG. 4.

FIGS. 4 and 5 illustrate a first alternative configuration of the post 44, which is denoted by reference numeral 44a. Post 44a has a top end 54a and a bottom end 70a, and is preferably formed from a strong metal. Each post 44a is preferably formed to have flat end portions 74a and an intermediate portion 76a which bulges outwardly from the flat end portions 74a, such that the post 44a is generally U-shaped. Each post 44a also has inner and outer surfaces 78a, 80a. The top end 54a of each post 44a is positioned against the lop rail 40 such that the outer surface 80a of the intermediate portion 76a is positioned against the inner surface 56 of the second portion 52 of the top rail 40, and such that the top end 54 of each post 44a is positioned proximate to, and preferably abuts against, the bottom surface 58 of the first portion 50. The bottom end 70 of each post 44a is positioned against the bottom rail 42 such that the outer surface 80a of the intermediate portion 76a is positioned against the inner surface 72 of the fourth portion 68 of the bottom rail 42, and such that the bottom end 70 of each post 44a is positioned proximate to, and preferably abuts against, the top surface (not shown) of the third portion 66. Each post 44a is secured to the top and bottom rails 40, 42 by known means, such as by fasteners, for instance rivets, or by adhesive, or both.

Each post 44a has an aperture 82a provided through at least one of the flat end portions 74a thereof proximate to the top end 54a thereof. Each post 44a has an aperture 84a provided through at least one of the flat end portions 74a thereof proximate to the bottom end 70a thereof. The purpose for the apertures 82a, 84a being provided through the at least one of the flat end portions 74a of each post 44a will be discussed in further detail hereinbelow.

In addition, each post 44a has a plurality of spaced-apart openings or slots 86a therethrough along a length of at least one of the flat end portions 74a thereof, with each of the slots 86a preferably being positioned between the aperture 82a and the aperture 84a. The distance between each slot 86a is preferably identical to the distance between each slot 86 and the distance between adjacent posts 44a is preferably identical to the distance between adjacent posts 44. Each slot 86a is preferably rectangular in configuration such that it has opposite top and bottom edges 87a', 87b' and opposite side edges 87c', 87d'.

Figure 6:
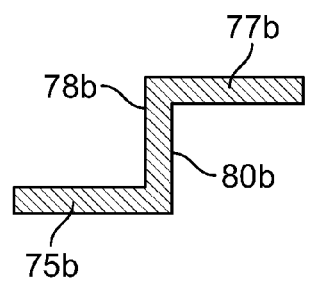
FIG. 6 is a cross-sectional view of the second alternative embodiment of the posts of the frame illustrated in FIG. 4.

FIGS. 4 and 6 illustrate a second alternative configuration of the post 44, which is denoted by reference numeral 44b. Post 44b has a lop end 54b and a bottom end 70b, and is preferably formed from a strong metal. Each post 44b is preferably formed to have a first flat end portion 75b and a second flat end portion 77b, which are connected to one another, but which are not in the same plane, such that the post 44b is generally Z-shaped. Each post 44b also has inner and outer surfaces 78b, 80b. The top end 54b of each post 44b is positioned against the top rail 40 such that the outer surface 80b of the first flat end portion 75b is positioned against the inner surface 56 of the second portion 52 of the top rail 40, and such that the top end 54 of each post 44b is positioned proximate to, and preferably abuts against, the bottom surface 58 of the first portion 50. The bottom end 70 of each post 44b is positioned against the bottom rail 42 such that the outer surface 80b of the first flat end portion 75b is positioned against the inner surface 72 of the fourth portion 68 of the bottom rail 42, and such that the bottom end 70 of each post 44b is positioned proximate to, and preferably abuts against, the top surface (not shown) of the third portion 66. Each post 44b is secured to the top and bottom rails 40, 42 by known means, such as by fasteners, for instance rivets, or by adhesive, or both.

Each post 44b has an aperture 82b provided through the second flat end portion 77b thereof proximate to the top end 54b thereof. Each post 44b has an aperture 84b provided through the second flat end portion 77b thereof proximate to the bottom end 70b thereof. The purpose for the apertures 82b, 84b being provided through the second flat end portion 77b of each post 44b will be discussed in further detail hereinbelow.

In addition, each post 44b has a plurality of spaced-apart openings or slots 86b therethrough along a length of the second flat end portion 77b thereof, with each of the slots 86b preferably being positioned between the aperture 82b and the aperture 84b. The distance between each slot 86b is preferably identical to the distance between each slot 86 and the distance between adjacent posts 44b is preferably identical to the distance between adjacent posts 44. Each slot 86b is preferably rectangular in configuration such that it has opposite top and bottom edges 87a", 87b" and opposite side edges 87c", 87d".

While posts 44a and 44b have been described hereinabove and illustrated in FIGS. 4-6, further description of the invention will generally be made with reference to only post 44 as it is the preferred configuration for the post. It is to be understood that the posts 44a and 44b, as well as any other similar configuration of post, could be utilized instead of the post 44 in order to achieve the objects of the invention.

Figure 19:
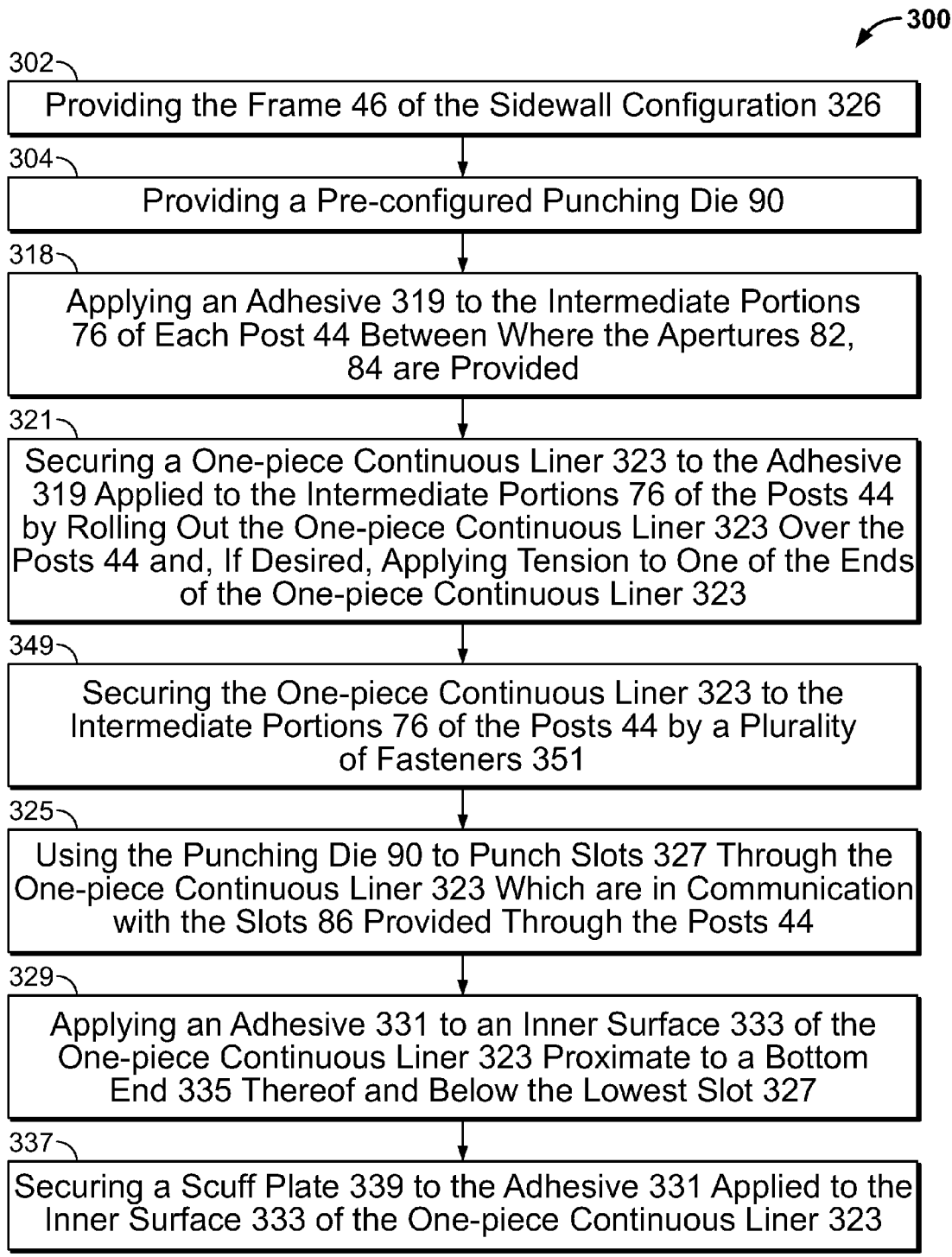
FIGS. 19 and 20 illustrate a third embodiment of a method for forming the inner wall of the sidewall.
Figure 20:
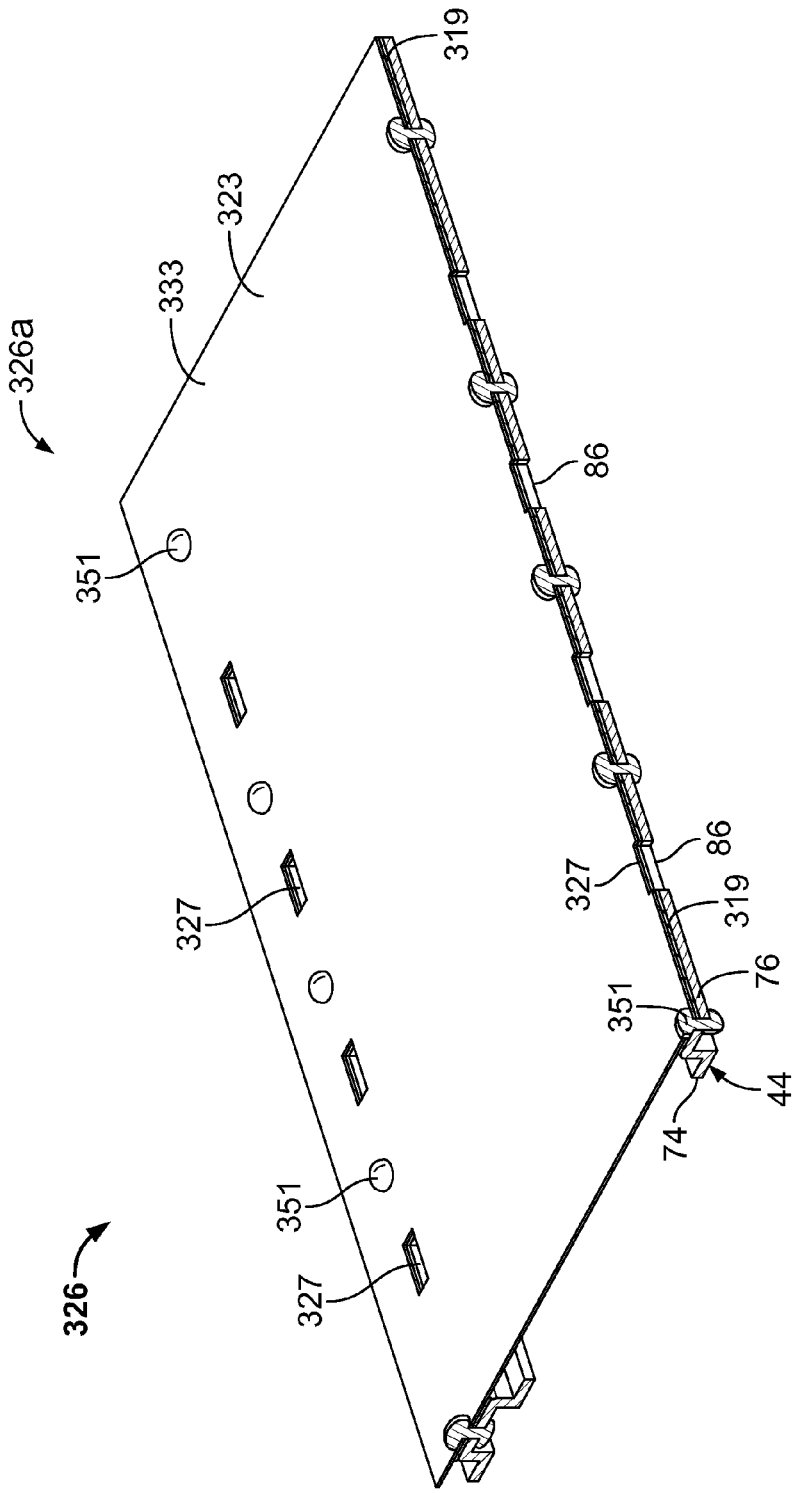
Figure 25:
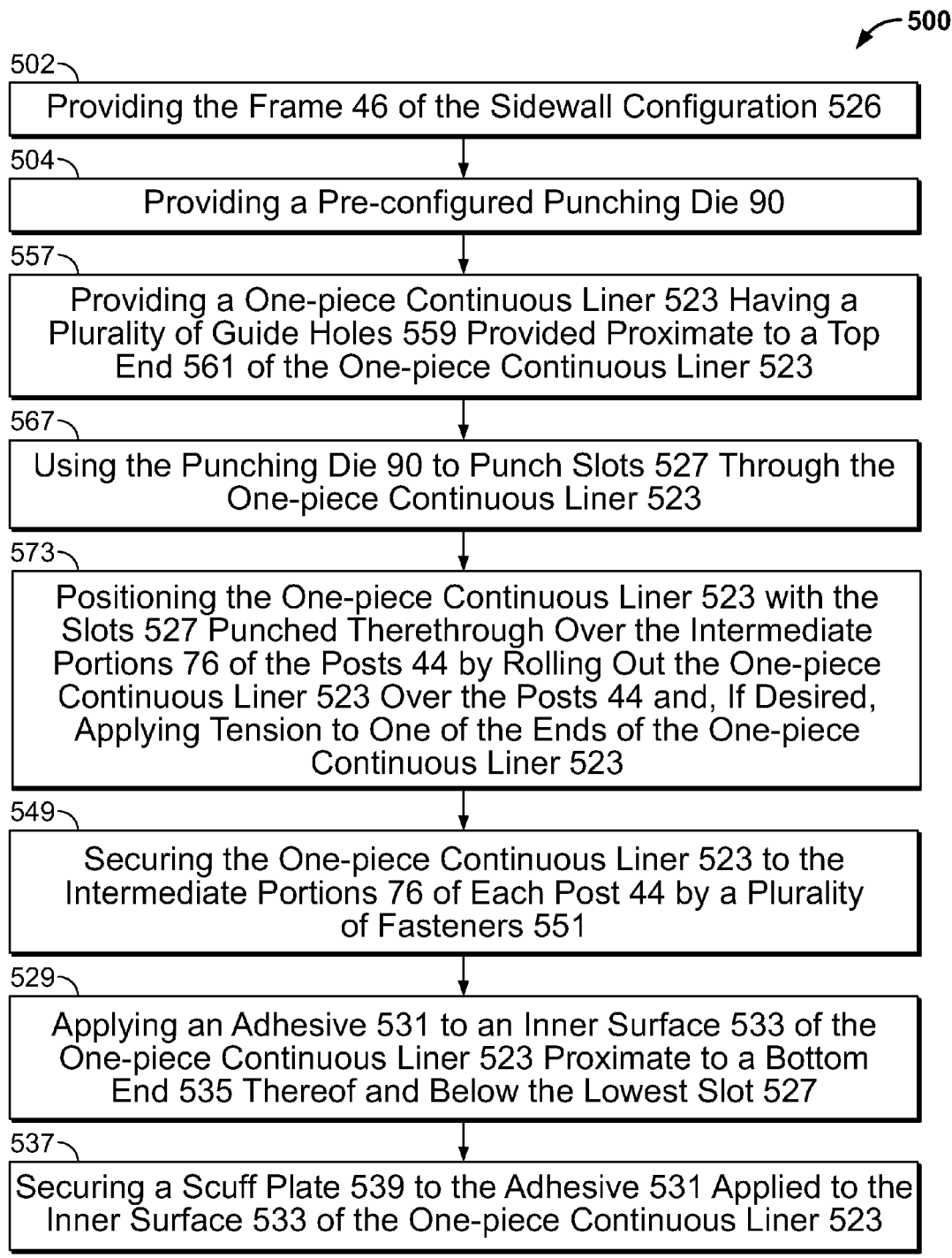
FIGS. 25 and 26 illustrate a fifth embodiment of a method for forming the inner wall of the sidewall.
Figure 26:
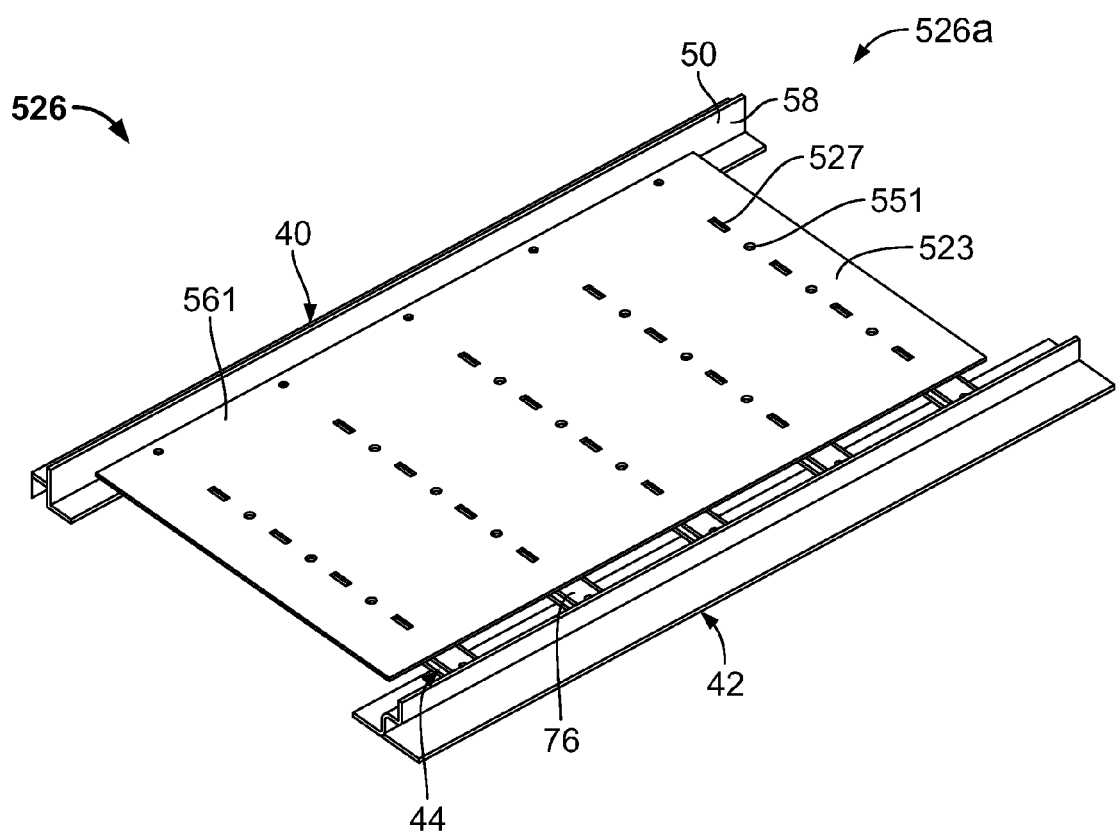
Figure 27:
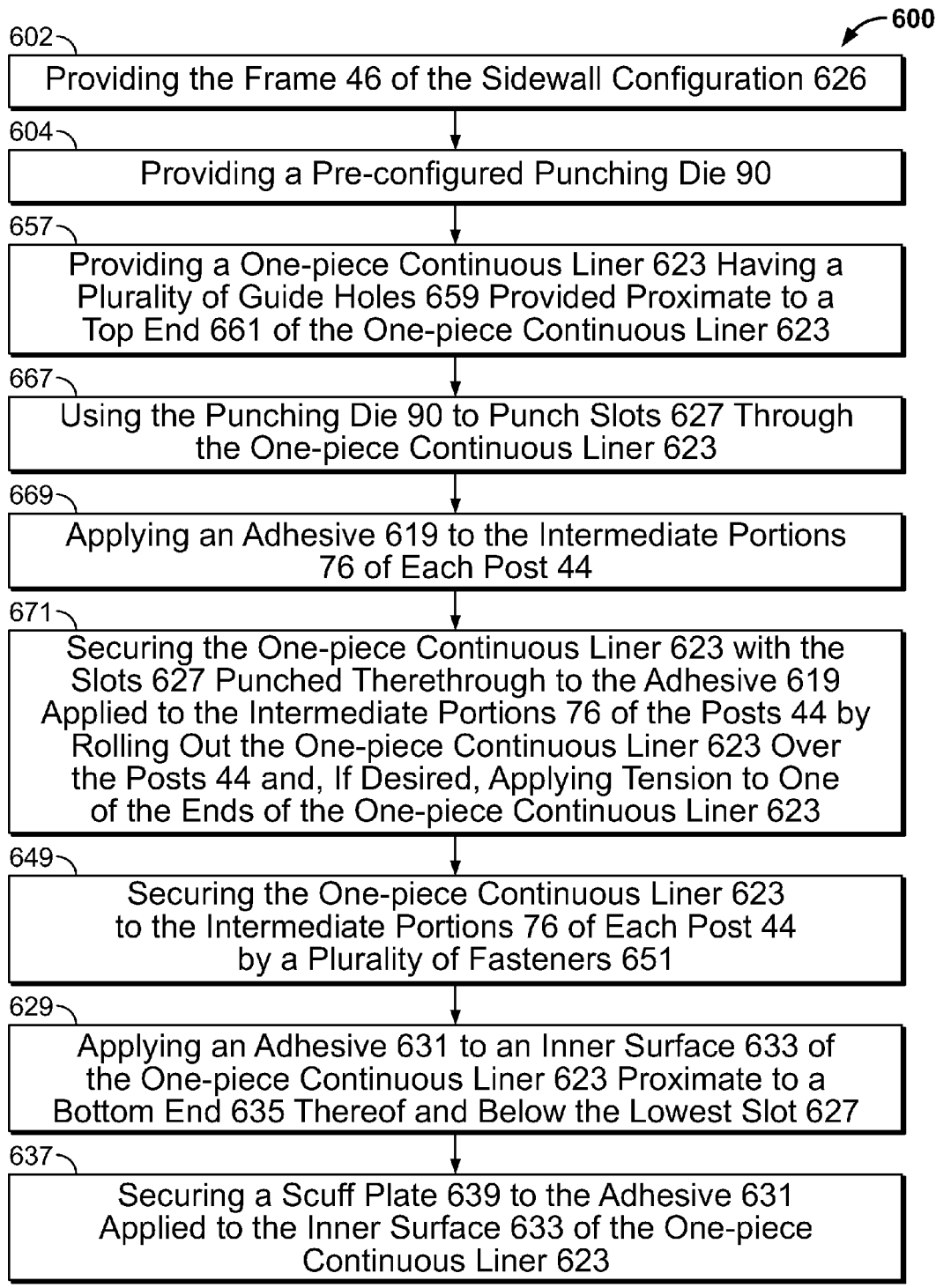
FIG. 27 is a flow chart of the sixth embodiment of the method.
Figure 31:
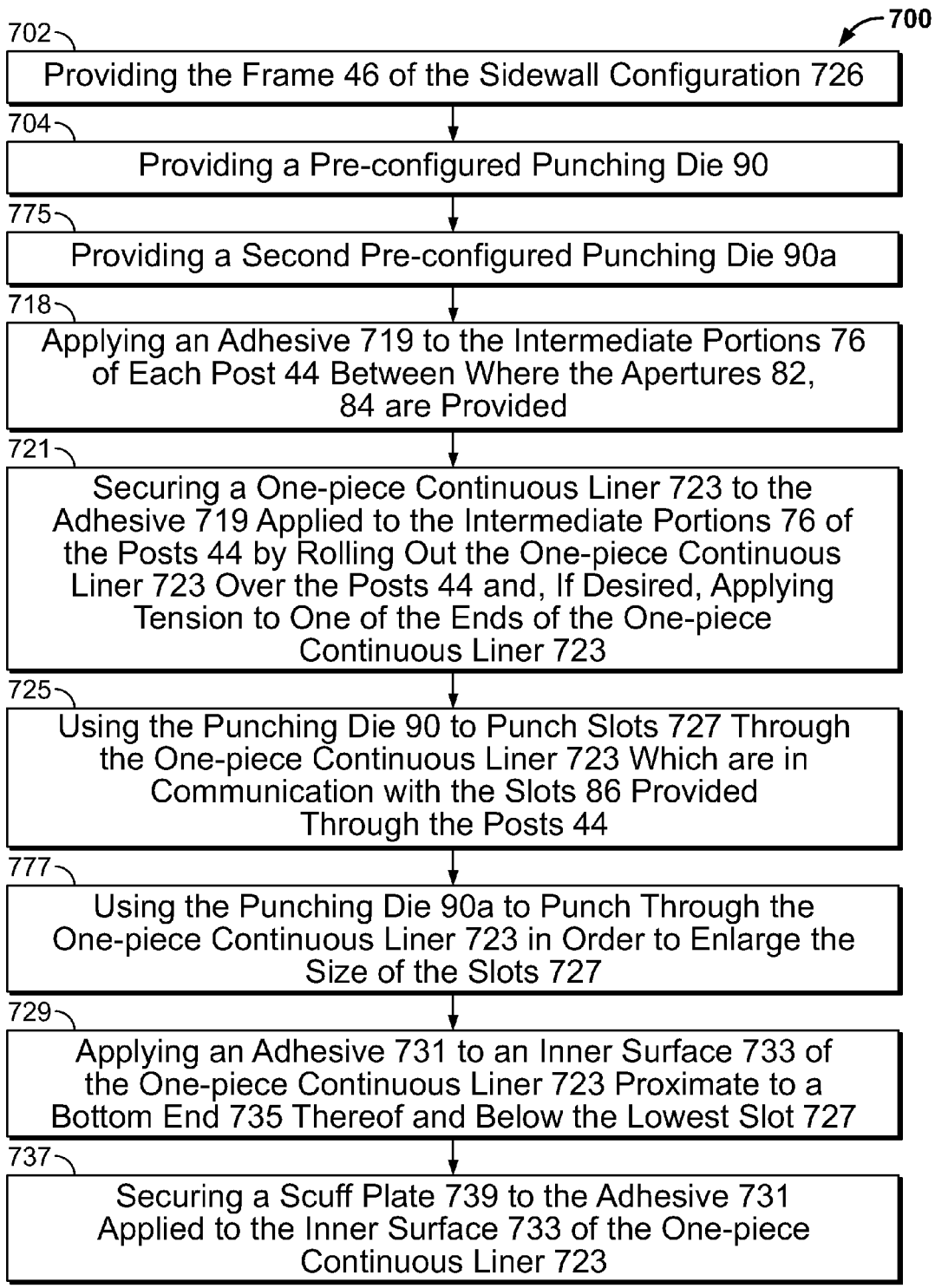
FIGS. 31 and 32 illustrate a seventh embodiment of a method for forming the inner wall of the sidewall.
Figure 32:
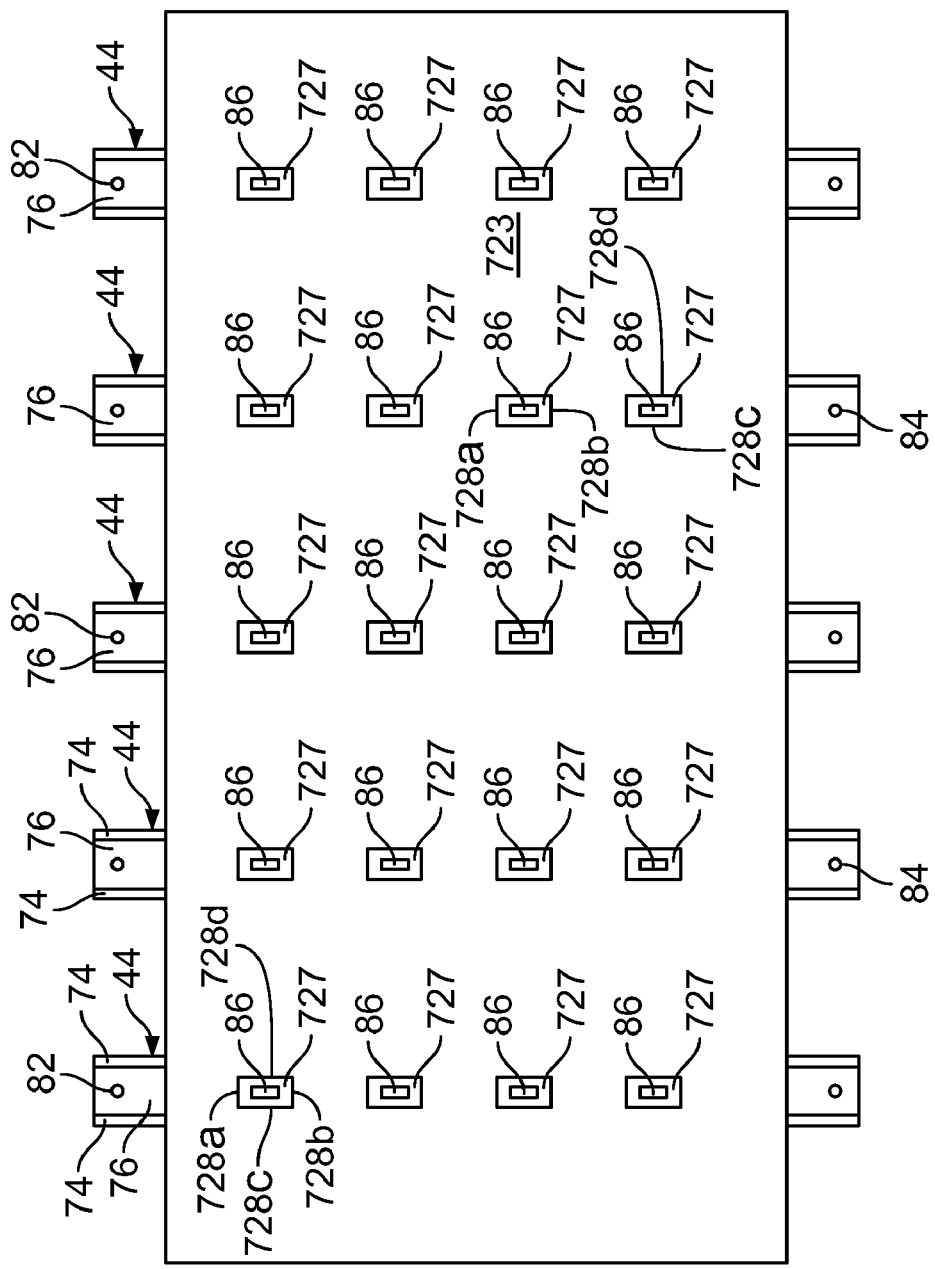
Figure 33:
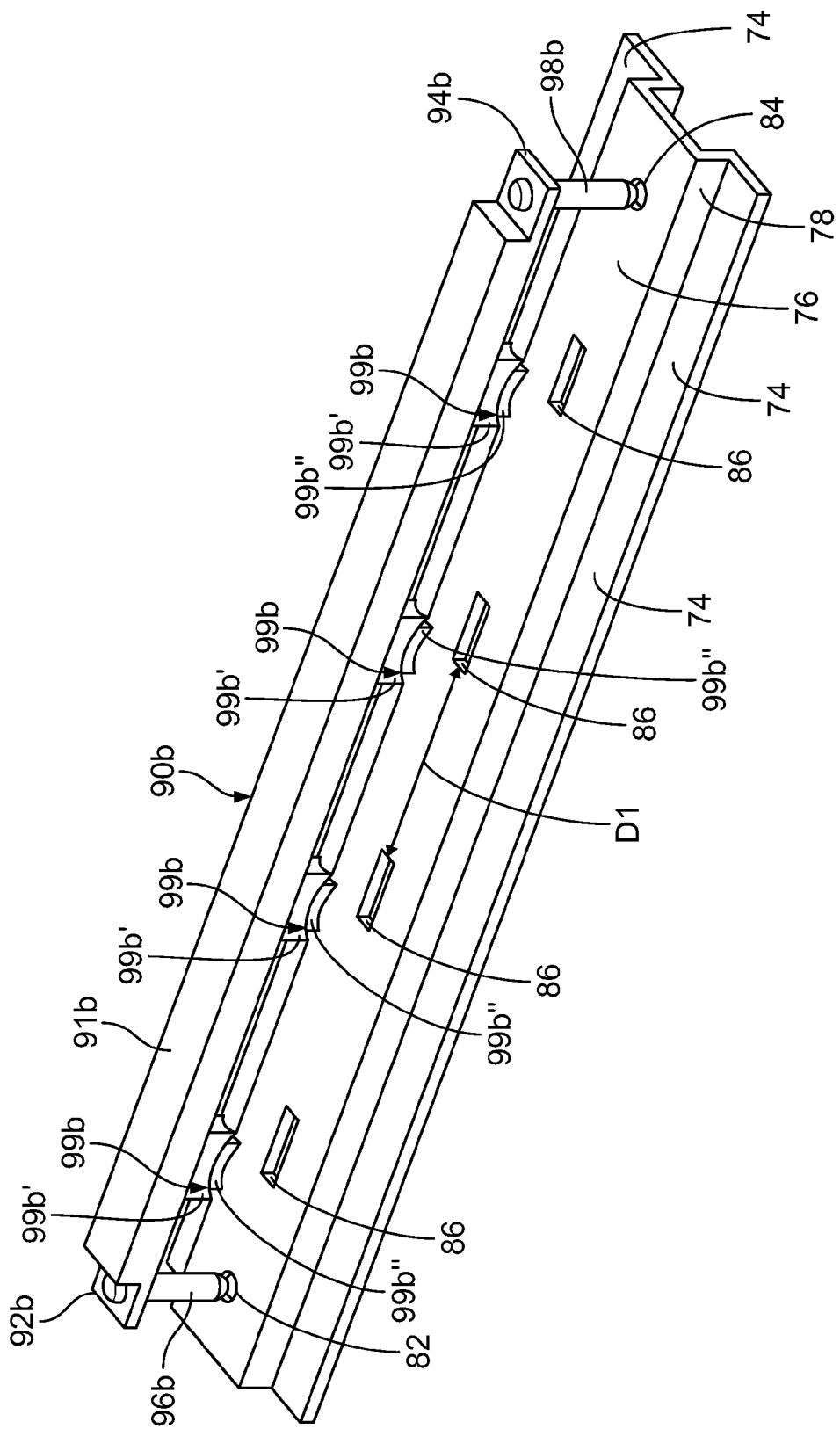
FIG. 33 is a perspective view of a second alternative pre-configured punching die used in the method of forming the inner wall of the sidewall.
Figure 34:
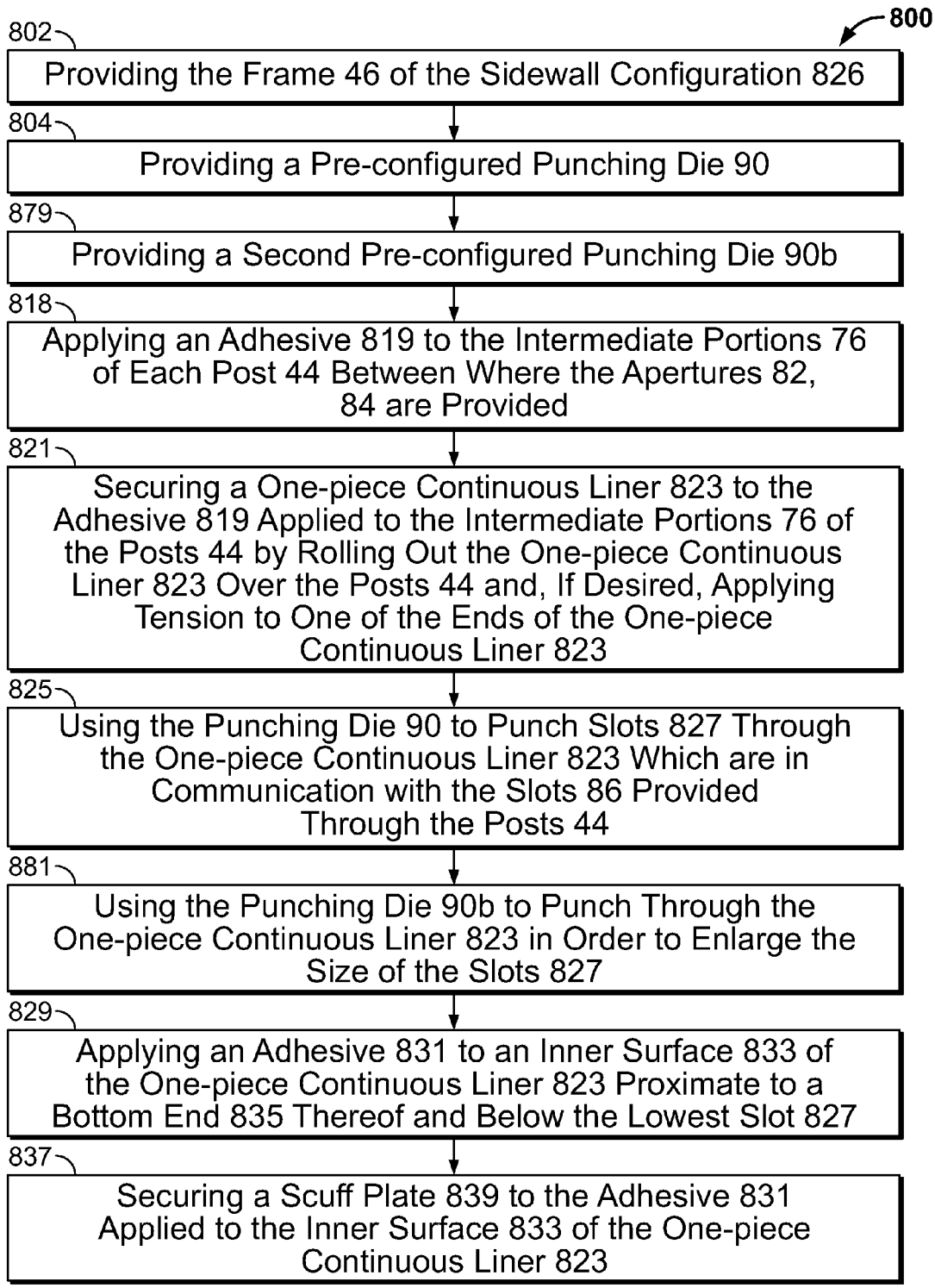
FIG. 34 is a flow chart of the eighth embodiment of a method for forming the inner wall of the sidewall.
Figure 35:
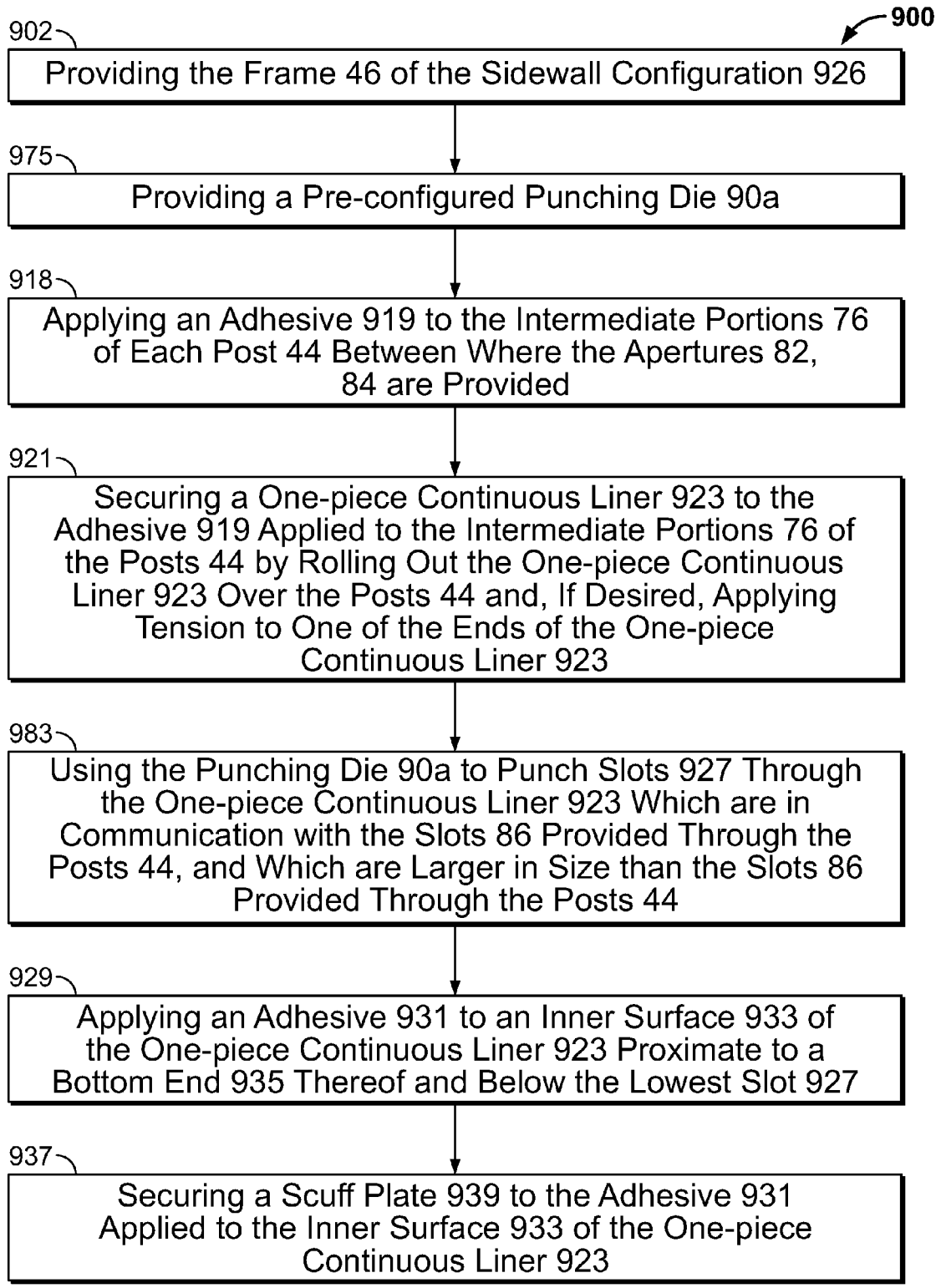
FIG. 35 is a flow chart of the ninth embodiment of a method for forming the inner wall of the sidewall.
Figure 36:
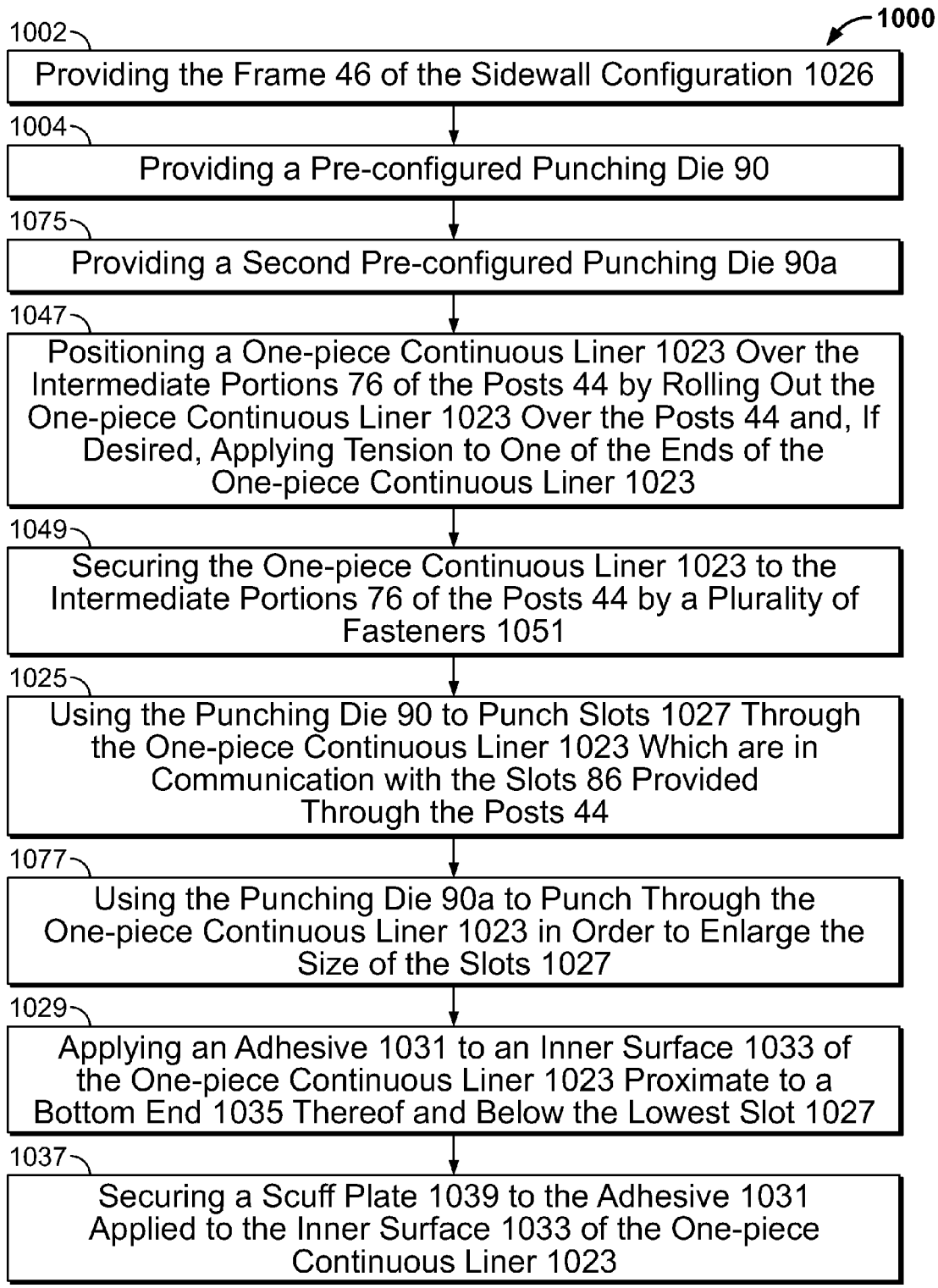
FIG. 36 is a flow chart of the tenth embodiment of a method for forming the inner wall of the sidewall.
Figure 37:
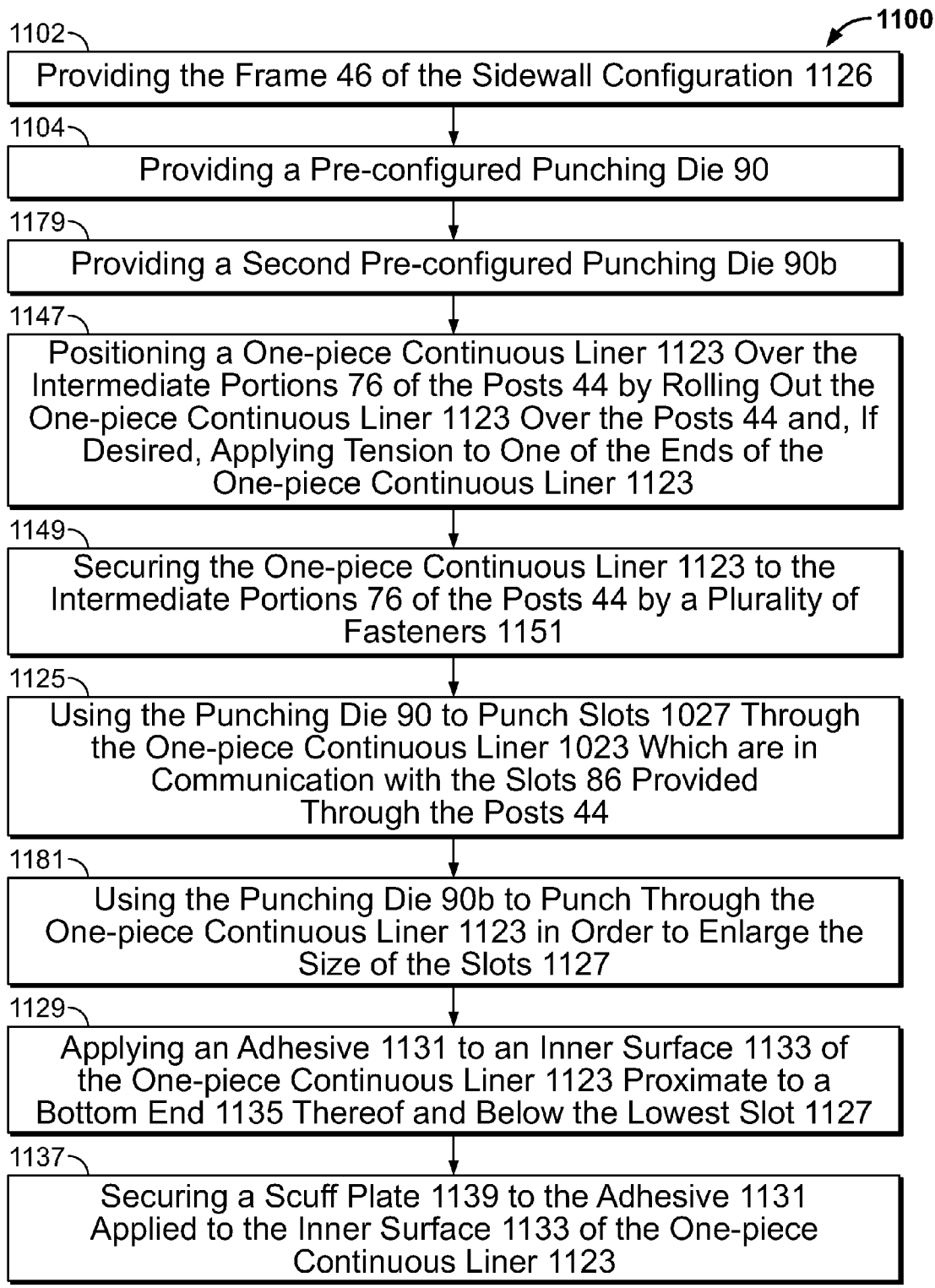
FIG. 37 is a flow chart of the eleventh embodiment of a method for forming the inner wall of the sidewall.
Figure 38:
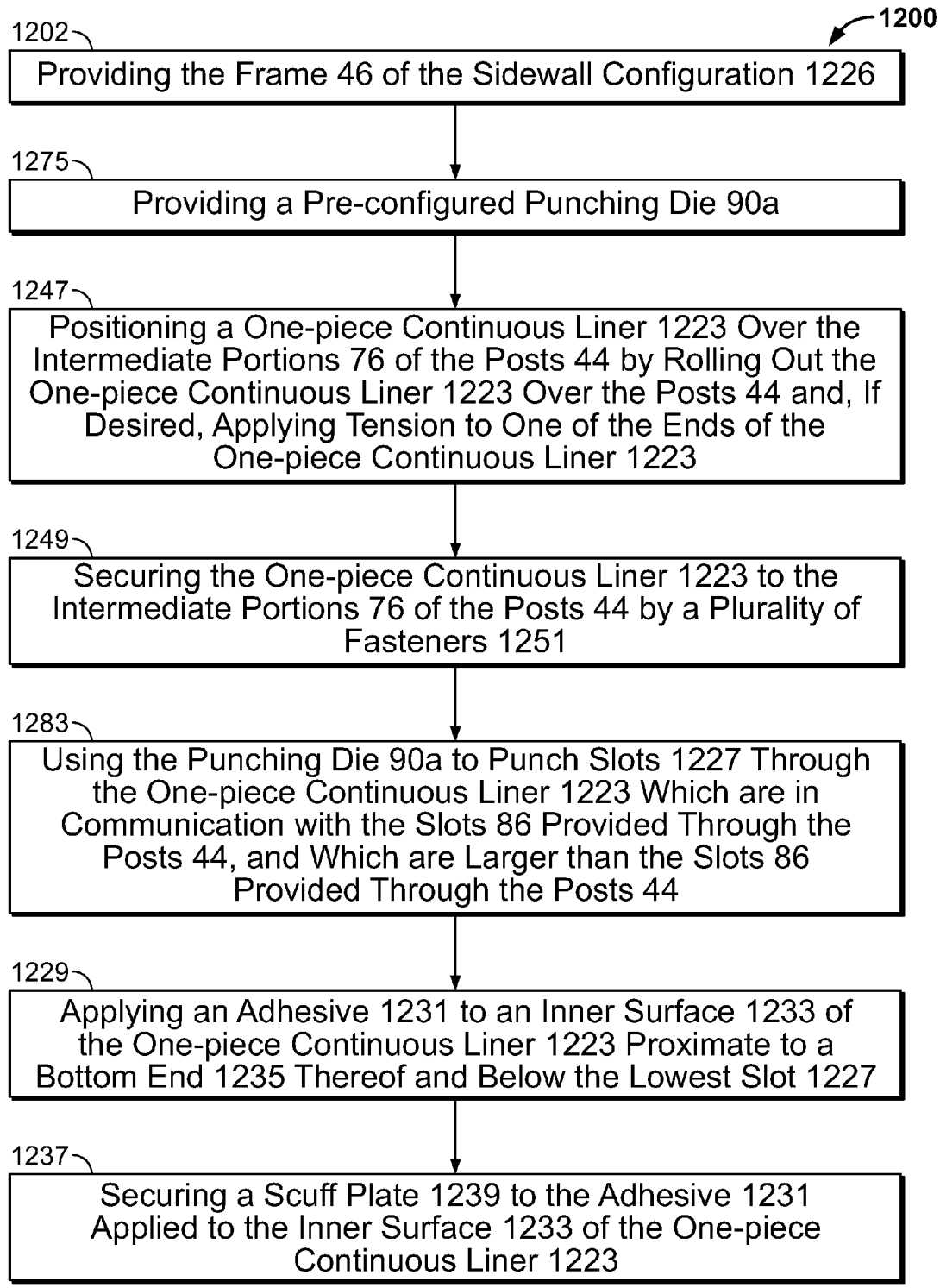
FIG. 38 is a flow chart of the twelfth embodiment of a method for forming the inner wall of the sidewall.
Figure 39:
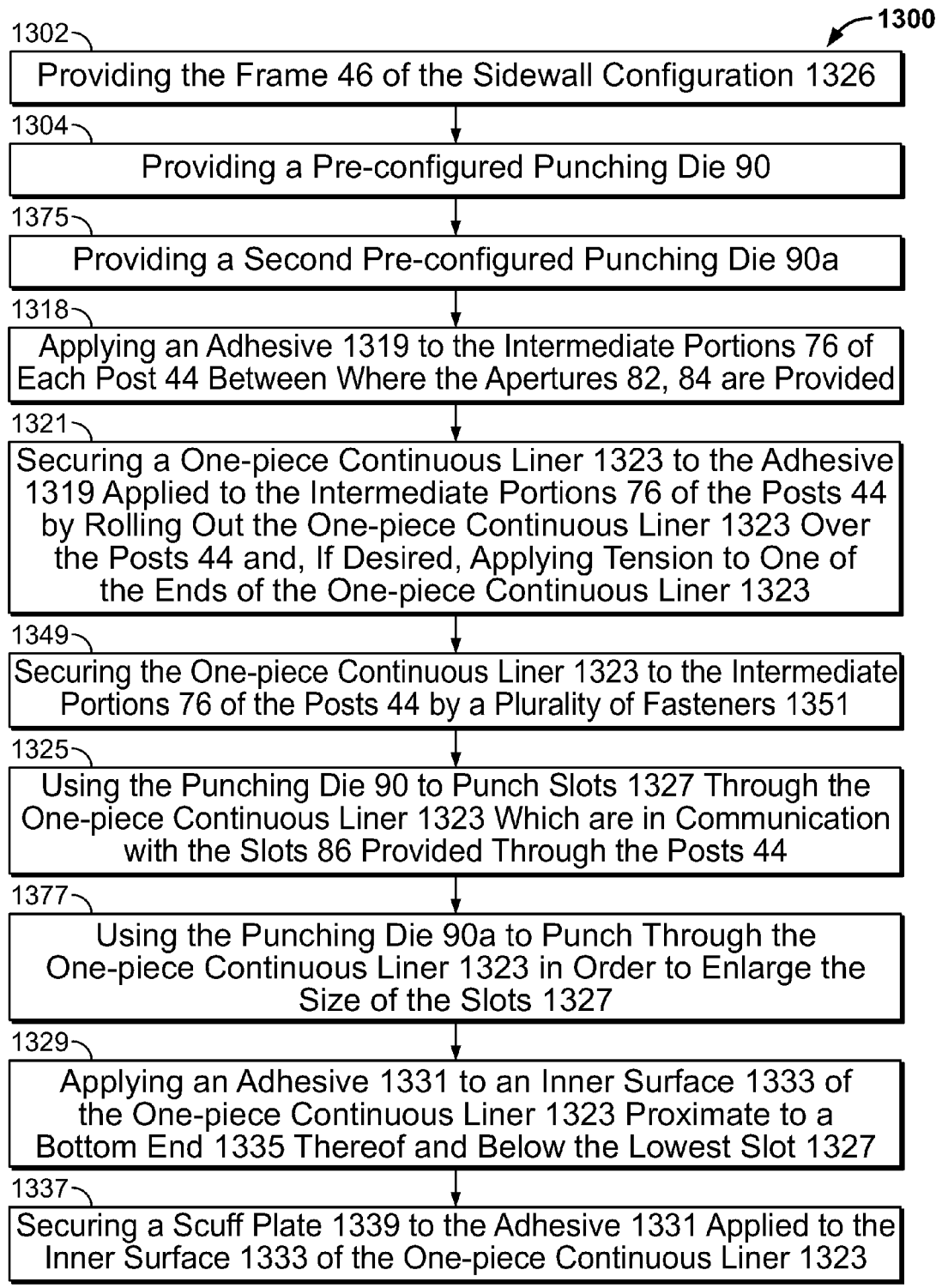
FIG. 39 is a flow chart of the thirteenth embodiment of a method for forming the inner wall of the sidewall.
Figure 40:
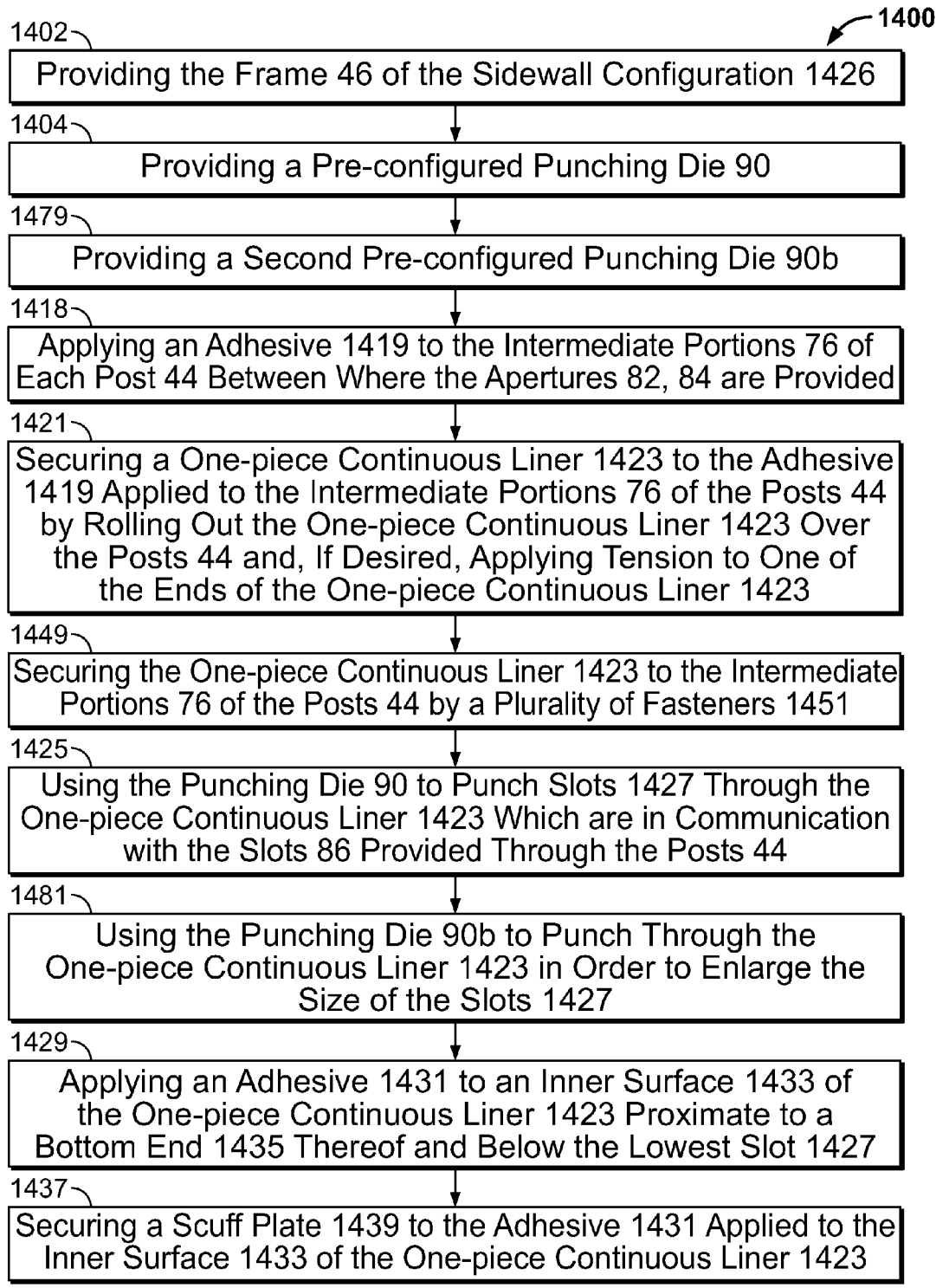
FIG. 40 is a flow chart of the fourteenth embodiment of a method for forming the inner wall of the sidewall.
Figure 41:
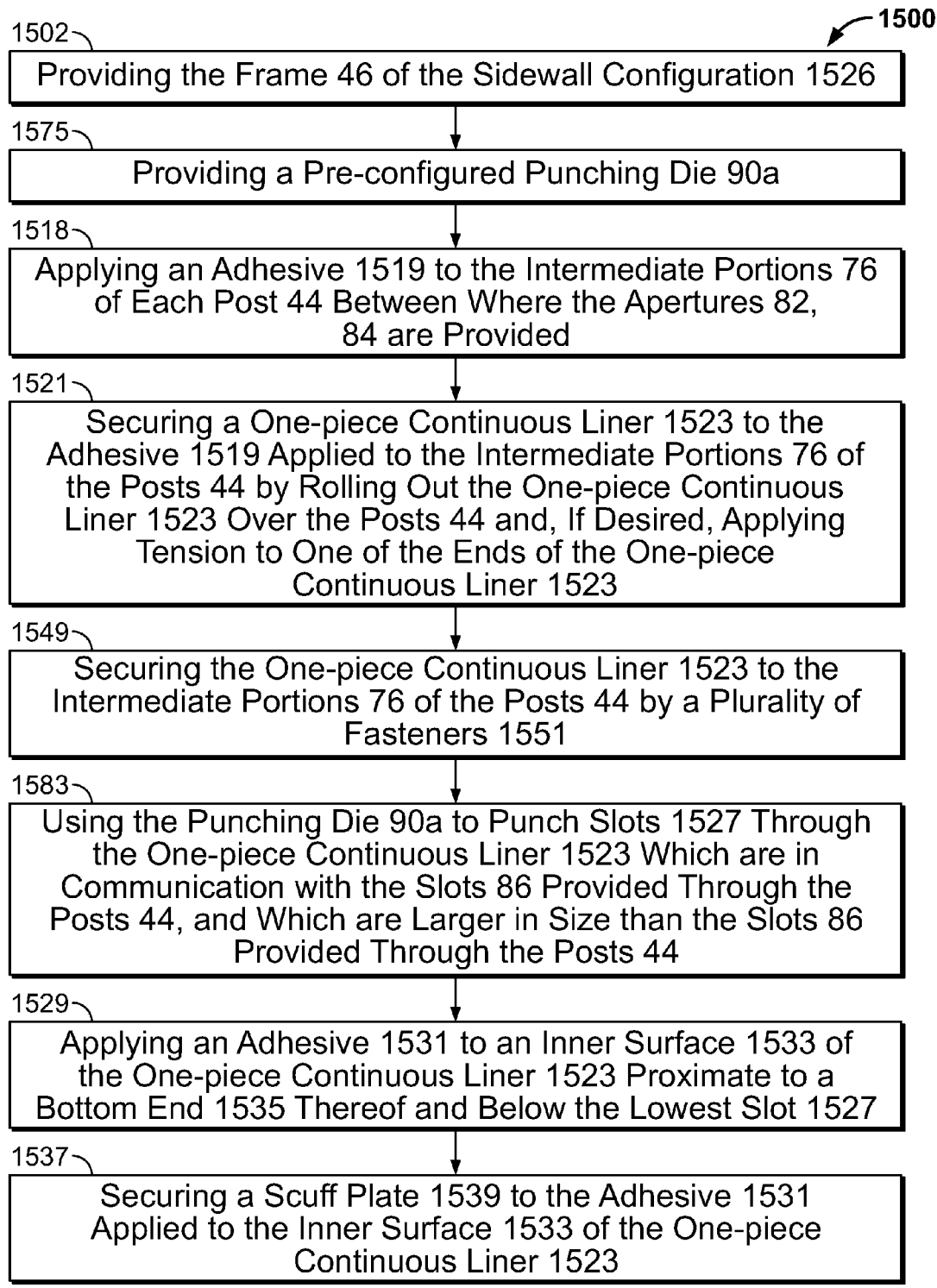
FIG. 41 is a flow chart of the fifteenth embodiment of a method for forming the inner wall of the sidewall.
Figure 42:
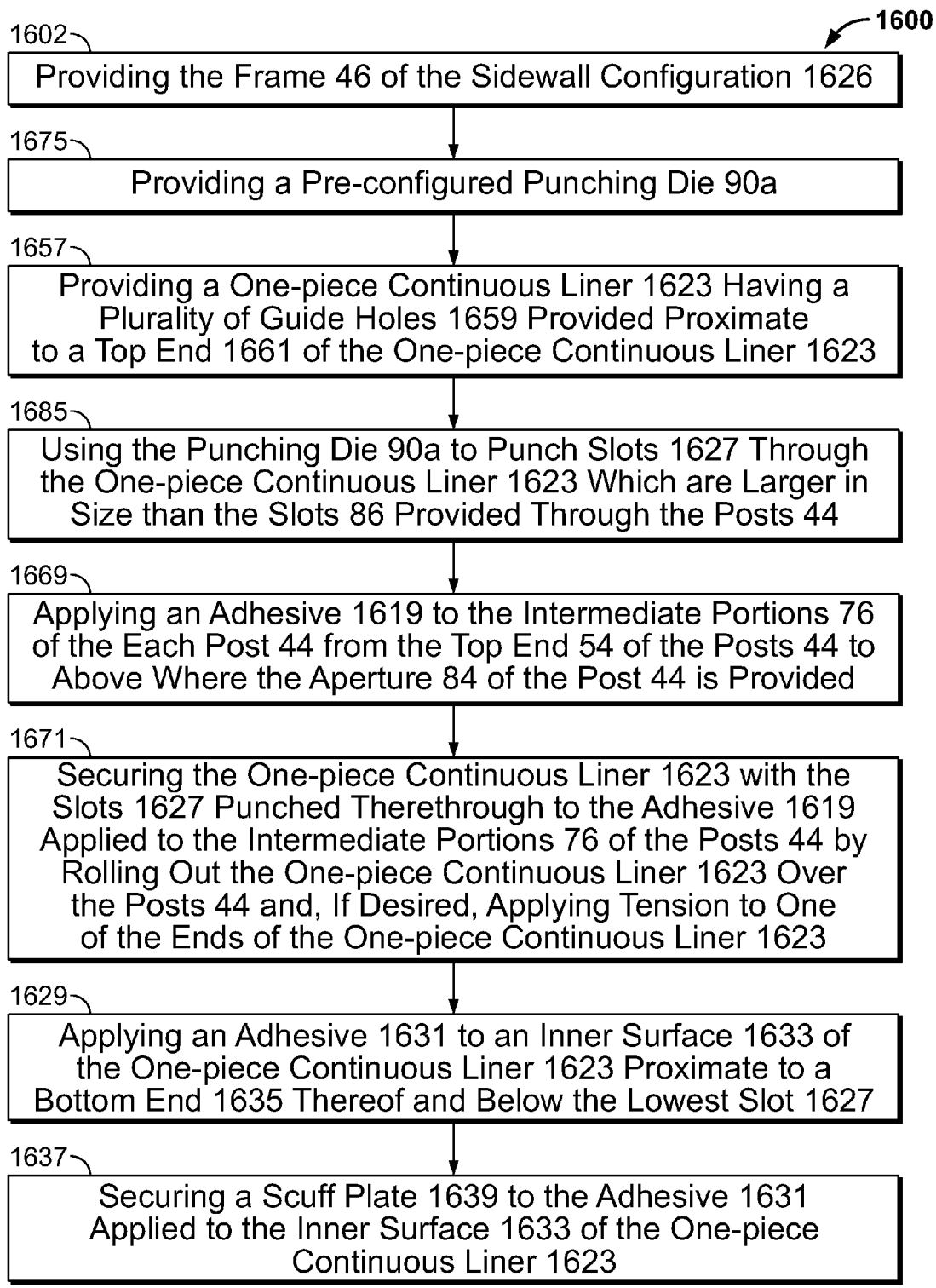
FIG. 42 is a flow chart of the sixteenth embodiment of a method for forming the inner wall of the sidewall.
Figure 43:
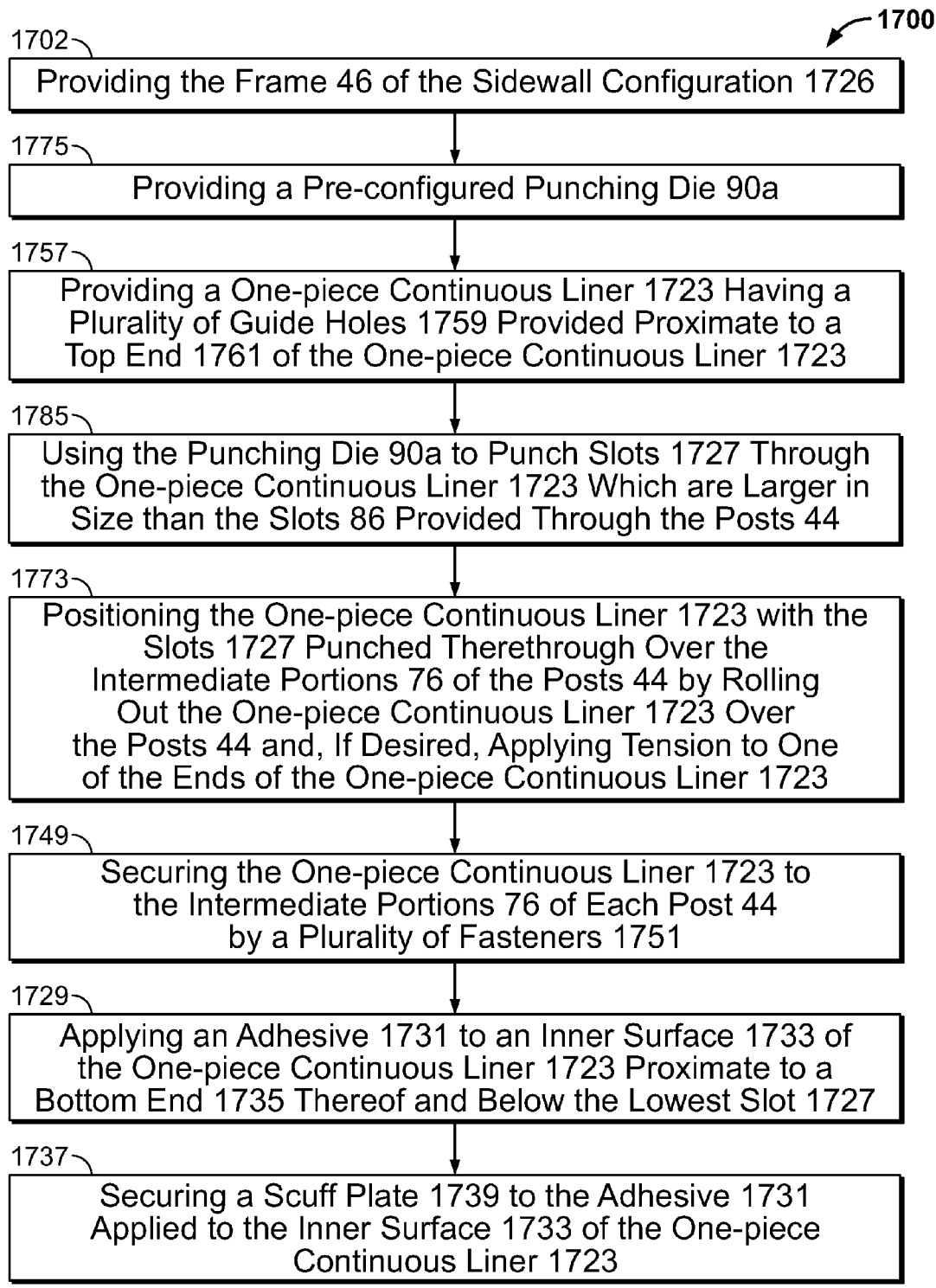
FIG. 43 is a flow chart of the seventeenth embodiment of a method for forming the inner wall of the sidewall.
Figure 44:
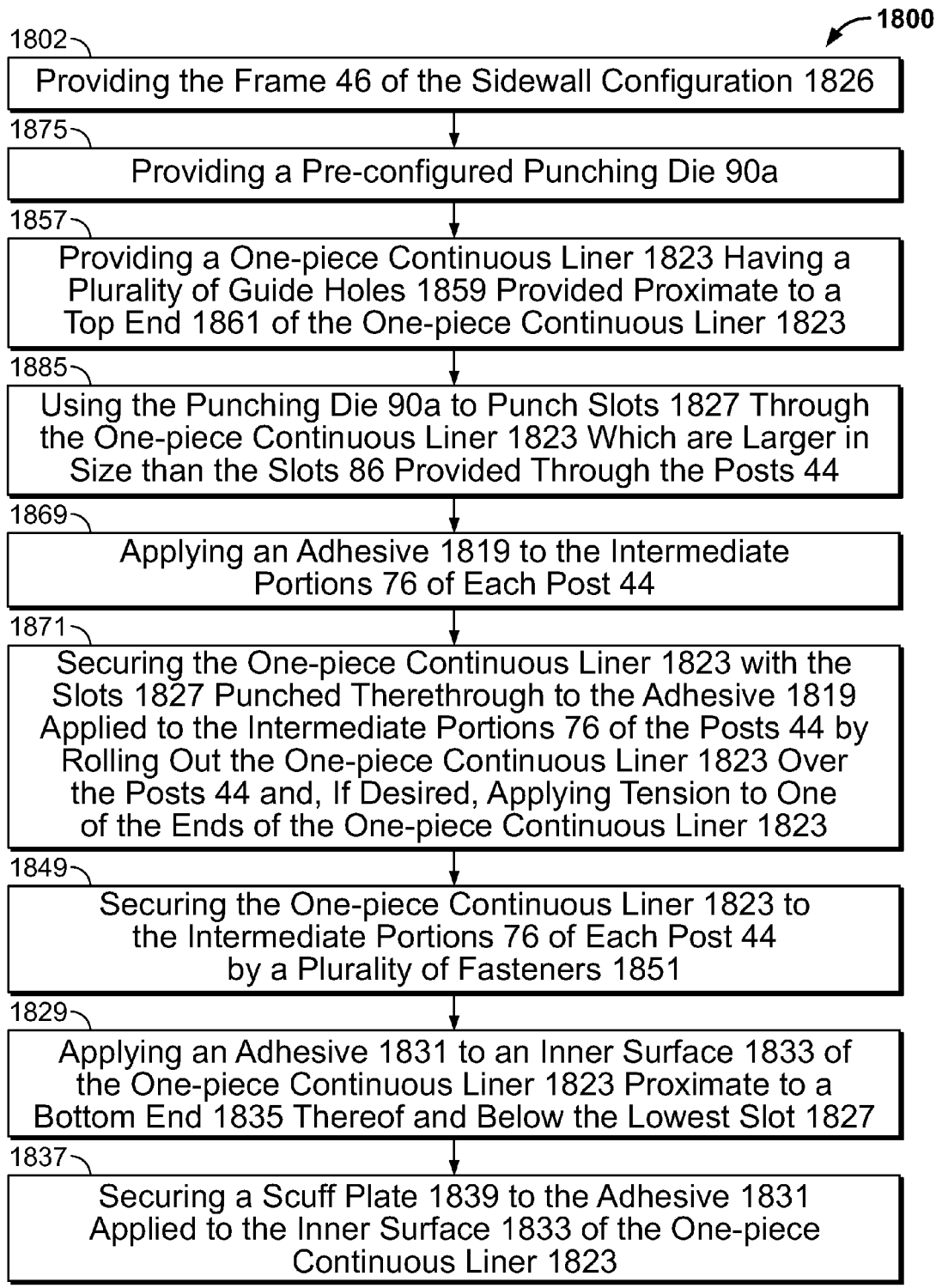
FIG. 44 is a flow chart of the eighteenth embodiment of a method for forming the inner wall of the sidewall.

Attention is now directed to the various embodiments of the configuration of the inner wall 26a of the sidewall 26 and the methods of forming same, as illustrated in FIGS. 8-27, 31, 32 and 34-44. A first embodiment of the inner wall 126a of the sidewall configuration 126 and a method 100 of forming same is illustrated in FIGS. 8-14. A second embodiment of the inner wall 226a of the sidewall configuration 226 and a method 100 of forming same is illustrated in FIGS. 15-18. A third embodiment of the inner wall 326a of the sidewall configuration 326 and a method 300 of forming same is illustrated in FIGS. 19-20. A fourth embodiment of the inner wall 426a of the sidewall configuration 426 and a method 400 of forming same is illustrated in FIGS. 21-24. A fifth embodiment of the inner wall 526a of the sidewall configuration 526 and a method 500 of forming same is illustrated in FIGS. 25-26. A sixth embodiment of the inner wall 626a of the sidewall configuration 626 and a method 600 of forming same is illustrated in FIG. 27. A seventh embodiment of the inner wall 726a of the sidewall configuration 726 and a method 700 of forming same is illustrated in FIGS. 31 and 32. An eighth embodiment of the inner wall 826a of the sidewall configuration 826 and a method 800 of forming same is illustrated in FIG. 34. A ninth embodiment of the inner wall 926a of the sidewall configuration 926 and a method 900 of forming same is illustrated in FIG. 35. A tenth embodiment of the inner wall 1026a of the sidewall configuration 1026 and a method 1000 of forming same is illustrated in FIG. 36. An eleventh embodiment of the inner wall 1126a of the sidewall configuration 1126 and a method 1100 of forming same is illustrated in FIG. 37. A twelfth embodiment of the inner wall 1226a of the sidewall configuration 1226 and a method 1200 of forming same is illustrated in FIG. 38. A thirteenth embodiment of the inner wall 1326a of the sidewall configuration 1326 and a method 1300 of forming same is illustrated in FIG. 39. A fourteenth embodiment of the inner wall 1426a of the sidewall configuration 1426 and a method 1400 of forming same is illustrated in FIG. 40. A fifteenth embodiment of the inner wall 1526a of the sidewall configuration 1526 and a method 1500 of forming same is illustrated in FIG. 41. A sixteenth embodiment of the inner wall 1626a of the sidewall configuration 1626 and a method 1600 of forming same is illustrated in FIG. 42. A seventeenth embodiment of the inner wall 1726a of the sidewall configuration 1726 and a method 1700 of forming same is illustrated in FIG. 43. An eighteenth embodiment of the inner wall 1826a of the sidewall configuration 1826 and a method 1800 of forming same is illustrated in FIG. 44.

Like elements are denoted with like reference numerals with the first embodiment of the inner wall 126a of the sidewall construction 126 and the method 100 of forming same being in the one hundreds, the second embodiment of the inner wall 226a of the sidewall construction 226 and the method 200 of forming same being in the two hundreds, the third embodiment of the inner wall 326a of the sidewall construction 326 and the method 300 of forming same being in the three hundreds, the fourth embodiment of the inner wall 426a of the sidewall construction 426 and the method 400 of forming same being in the four hundreds, the fifth embodiment of the inner wall 526a of the sidewall construction 526 and the method 500 of forming same being in the five hundreds, the sixth embodiment of the inner wall 626a of the sidewall construction 626 and the method 600 of forming same being in the six hundreds, the seventh embodiment of the inner wall 726a of the sidewall construction 726 and the method 700 of forming same being in the seven hundreds, the eighth embodiment of the inner wall 826a of the sidewall construction 826 and the method 800 of forming same being in the eight hundreds, the ninth embodiment of the inner wall 926a of the sidewall construction 926 and the method 900 of forming same being in the nine hundreds, the tenth embodiment of the inner wall 1026a of the sidewall construction 1026 and the method 1000 of forming same being in the ten hundreds, the eleventh embodiment of the inner wall 1126a of the sidewall construction 1126 and the method 1100 of forming same being in the eleven hundreds, the twelfth embodiment of the inner wall 1226a of the sidewall constructions 1226 and the method 1200 of forming same being in the twelve hundreds, the thirteenth embodiment of the inner wall 1326a of the sidewall constructions 1326 and the method 1300 of forming same being in the thirteen hundreds, the fourteenth embodiment of the inner wall 1426a of the sidewall constructions 1426 and the method 1400 of forming same being in the fourteen hundreds, the fifteenth embodiment of the inner wall 1526a of the sidewall constructions 1526 and the method 1500 of forming same being in the fifteen hundreds, the sixteenth embodiment of the inner wall 1626a of the sidewall constructions 1626 and the method 1600 of forming same being in the sixteen hundreds, the seventeenth embodiment of the inner wall 1726a of the sidewall constructions 1726 and the method 1700 of forming same being in the seventeen hundreds, and the eighteenth embodiment of the inner wall 1826a of the sidewall constructions 1826 and the method 1800 of forming same being in the eighteen hundreds.

As shown in the drawings, only a portion of the inner wall 126a, 226a, 326a, 426a, 526a, 626a, 726a, 826a, 926a, 1026a, 1126a, 1226a, 1326a, 1426a, 1526a, 1626a, 1726a, 1826a of the sidewall configurations 126, 226, 326, 426, 526, 626, 726, 826, 926, 1026, 1126, 1226, 1326, 1426, 1526, 1626, 1726, 1826 is illustrated. It is to be understood that each inner wall 126a, 226a, 326a, 426a, 526a, 626a, 726a, 826a, 926a, 1026a, 1126a, 1226a, 1326a, 1426a, 1526a, 1626a, 1726a, 1826a of the sidewall configuration 126, 226, 326, 426, 526, 626, 726, 826, 926, 1026, 1126, 1226, 1326, 1426, 1526, 1626, 1726, 1826 illustrated is provided for each sidewall 26 between the front wall 28 and the rear doors 30.

Figure 8:
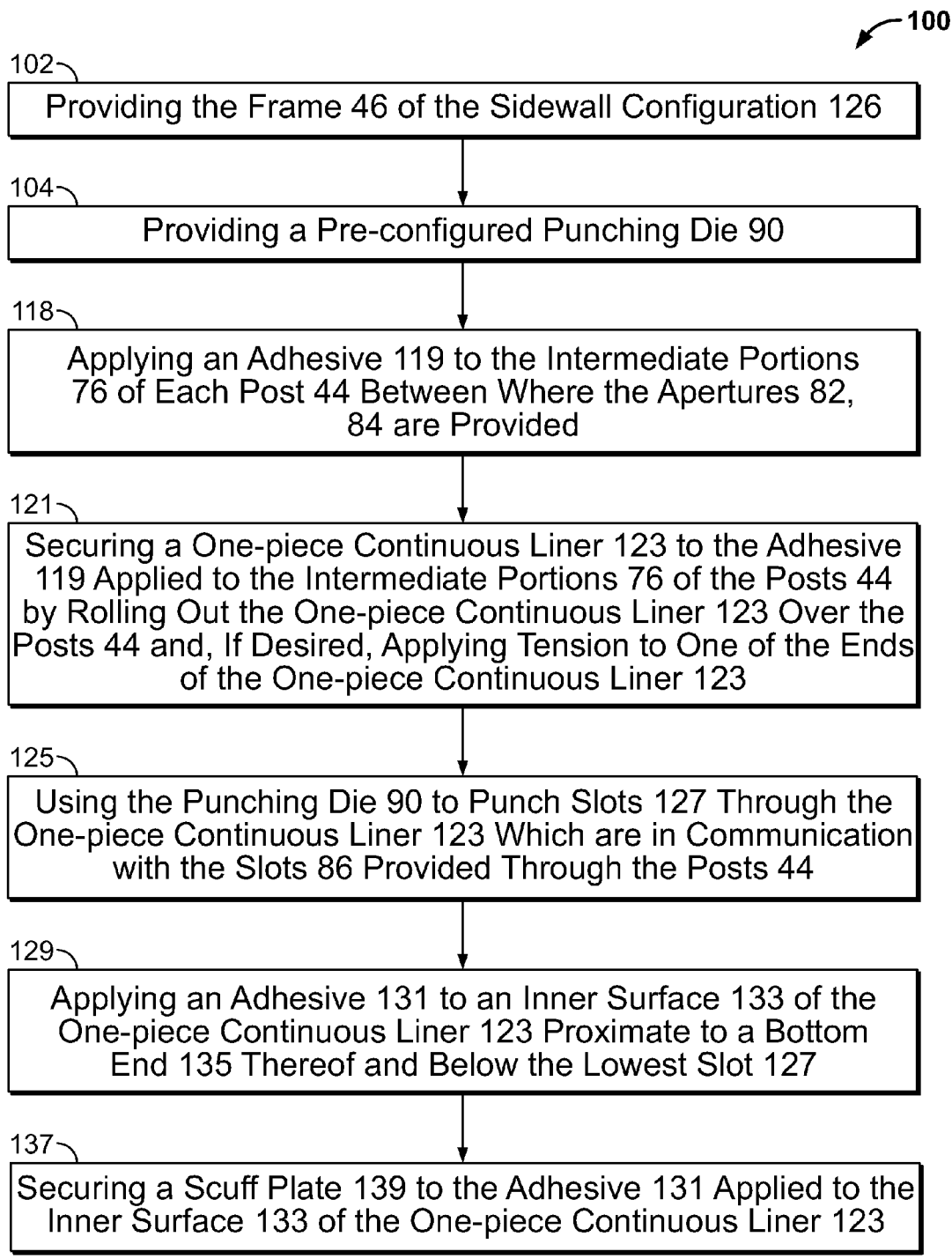
FIGS. 8-14 illustrate a first embodiment of a method for forming the inner wall of the sidewall.

Attention is directed to FIGS. 8-14 and the first embodiment of the inner wall 126a of the sidewall configuration 126 and the method 100 of forming same. A flow chart of the steps of the method 100 is illustrated in FIG. 8. Step 102 provides the frame 46 of the sidewall configuration 126, as illustrated in FIG. 3 and discussed hereinabove.

Figure 7:
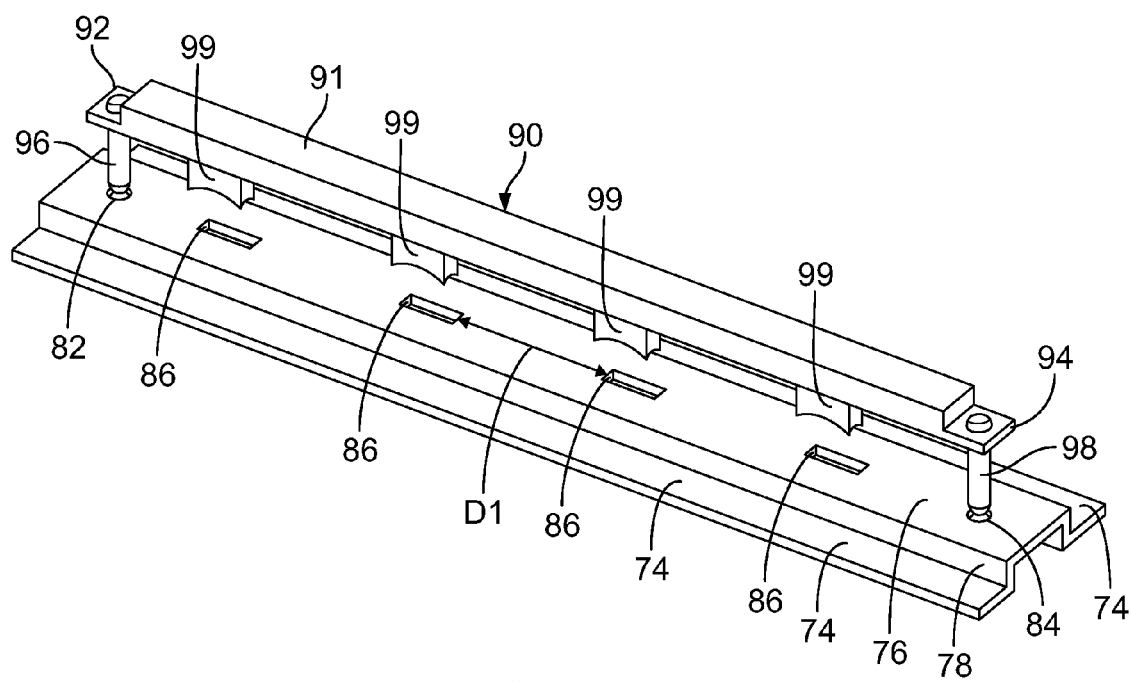
FIG. 7 is a perspective view of a pre-configured punching die used in the method of forming the inner wall of the sidewall.

Step 104 provides a pre-configured punching die 90, which is illustrated in FIG. 7. The punching die 90 is formed from an elongated body 91 having a first end 92 and a second end 94. Proximate to the first end 92, the elongated body 91 has a guiding pin member 96 which extends through the elongated body 91 and, proximate to the second end 94, the elongated body 91 has a guiding pin member 98 which extends through the elongated body 91. The punching die 90 is pre-configured such that the guiding pin member 96 can be positioned within the aperture 82 of the post 44 and such that the guiding pin member 98 can be positioned within the aperture 84 of the post 44. The elongated body 91 is also pre-configured to have a plurality of shearing punches 99 provided between the guiding pin members 96, 98. Each shearing punch 99 protrudes from the elongated body 91 and is sized to correspond to the size of the slots 86 in the post 44. Each shearing punch 99 is distanced from an adjacent shearing punch 99 to correspond to the distance between adjacent slots 86 in the post 44.

Figure 10:
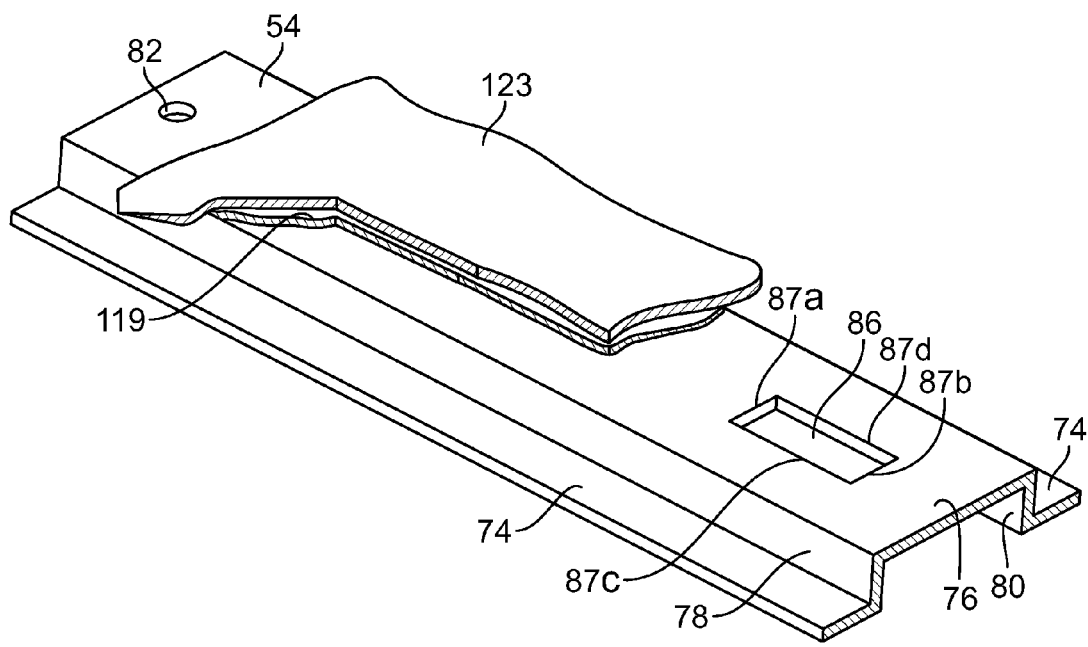

In step 118, an adhesive 119, which can be seen in FIG. 10, is preferably applied to the inner surface 78 of the intermediate portions 76 of each post 44 between where the apertures 82, 84 are provided, such that areas of the inner surface 78 of the intermediate portions 76 of each post 44 preferably do not have the adhesive 119 applied thereto, namely the top and bottom ends 54, 70 of the posts 44. When post 44a is utilized, the adhesive 119 would be applied to the inner surface 78a of at least one of the flat end portions 74a between where the apertures 82a, 84a are provided. When post 44b is utilized, the adhesive 119 would be applied to the inner surface 78b of the second flat end portion 77b between where the apertures 82b, 84b are provided.

Figure 9:
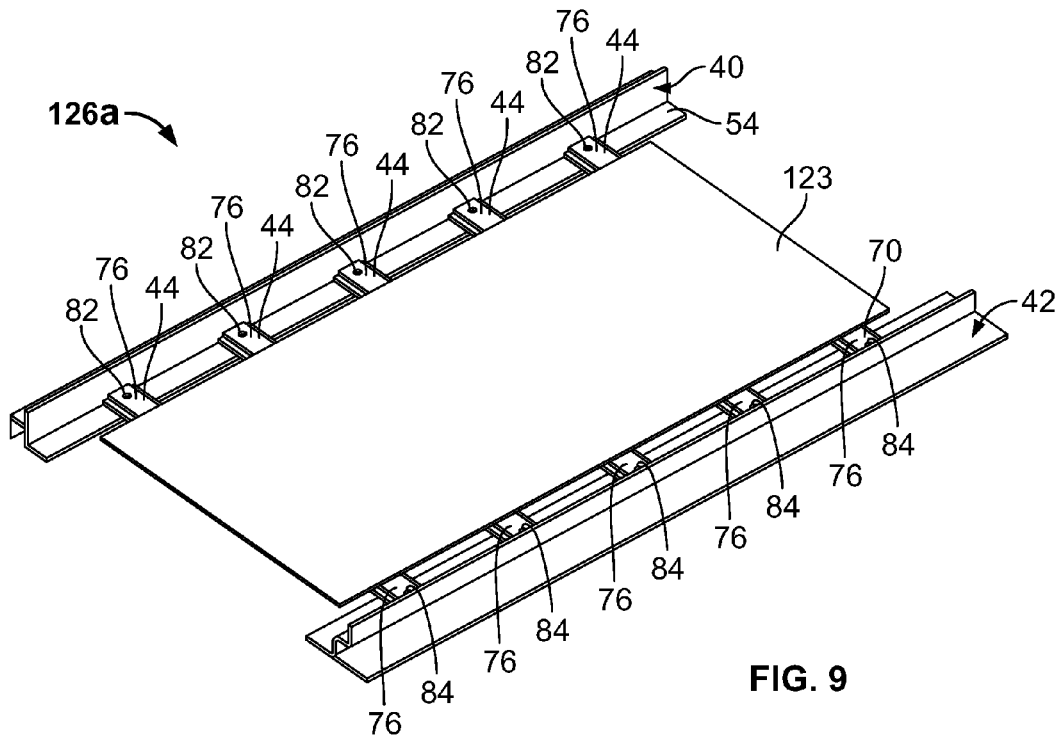

Step 121 secures a one-piece continuous liner 123 to the adhesive 119 applied to the intermediate portions 76 of the posts 44, as illustrated in FIGS. 9 and 10. The one-piece continuous liner 123 is preferably formed of a fiber reinforced plastic, such as a thermoplastic or thermoset glass reinforced material, or a metal, such as steel or aluminum, such that the one-piece continuous liner 123 is strong, but is also preferably a lightweight material.

The one-piece continuous liner 123 is preferably rectangular and extends from proximate to the top end 54 of each post 44 to proximate to the bottom end 70 of each post 44, such that it covers the adhesive 119 applied to the posts 44. The one-piece continuous liner 123 also preferably extends from the front wall 28 of the trailer 20 to the rear doors 30 of the trailer 20. Preferably, the one-piece continuous liner 123 is rolled out over the posts 44, beginning from either the end of the sidewall 126 proximate to the front wall 28 of the trailer 20, or from the end of the sidewall 126 proximate to the rear doors 30 of the trailer 20. Also, if desired, tension may be applied to one of the ends of the one-piece continuous liner 123 when the one-piece continuous liner 123 is rolled out over the posts 44 such that the one-piece continuous liner 123 is able to be relatively snag resistant and which, in addition, is able to absorb and deflect punishment without being scratched, punctured or otherwise defaced. Alternatively, the one-piece continuous liner 123 is placed down onto the posts 44.

Figure 11:
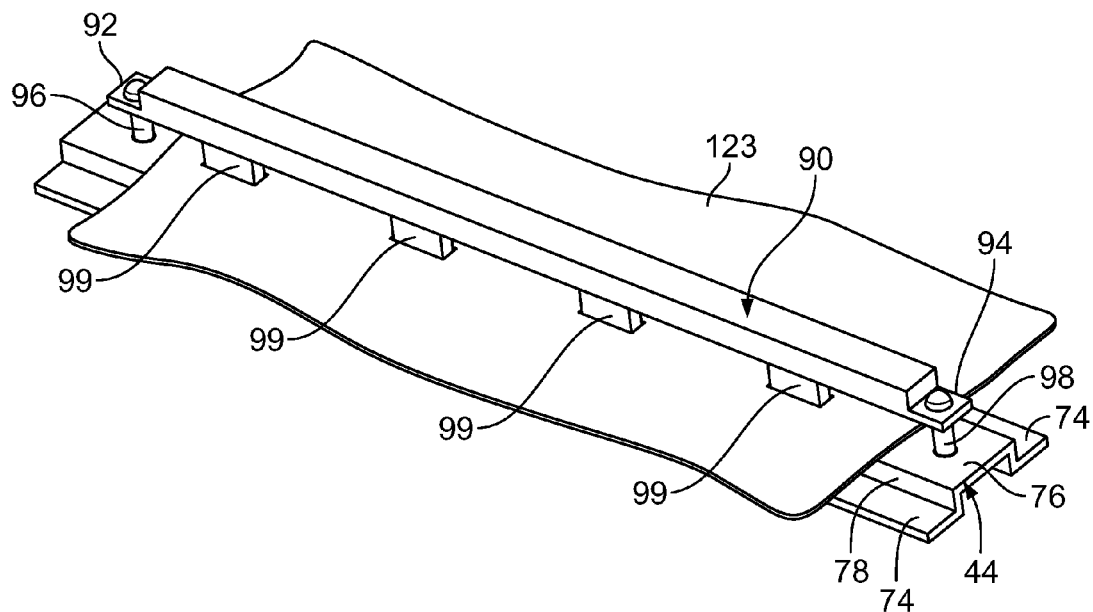
Figure 12:
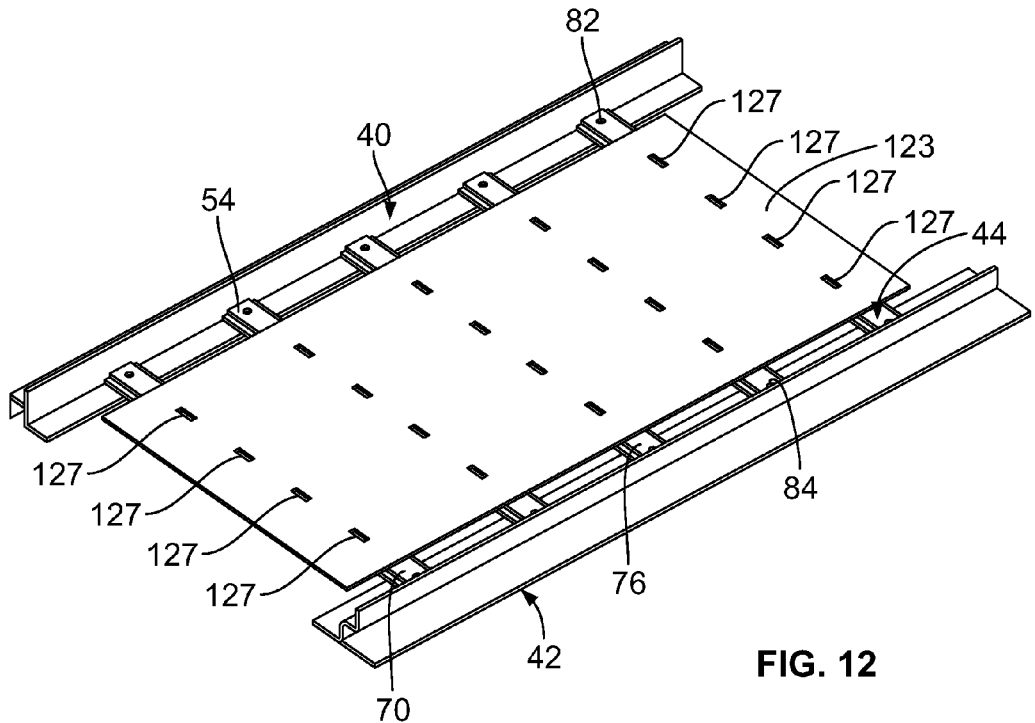

Step 125 uses the punching die 90 to punch slots 127 through the one-piece continuous liner 123 which are in communication with the slots 86 provided through the posts 44, as illustrated in FIG. 11. Step 125 is performed by first inserting the guiding pin member 96 into the aperture 82 of the post 44, and by inserting the guiding pin member 98 into the aperture 84 of the post 44. A force is then applied to the body 91 of the punching die 90 such that the shearing punches 99 are forced through the one-piece continuous liner 123 and into the slots 86 of the posts 44. The shearing punches 99 remove portions of the one-piece continuous liner 123 to provide the slots 127 through the one-piece continuous liner 123. The slots 127 are sized to be commensurate with the size of the slots 86, and the slots 127 are distanced from one another commensurate with the distance of the slots 86 from one another, as the punching die 90 is pre-configured in this manner. The slots 127 in the one-piece continuous liner 123 provide access to the slots 86 from an interior of the trailer 20 such that equipment can be engaged with the slots 86. Space is also provided behind the intermediate portion 76 of the posts 44 as the intermediate portion 76 bulges away from the flat end portions 74 further provides room within the sidewall configuration 126 such that equipment can be engaged with the slots 86 as part of the equipment would be positioned within the space provided behind the intermediate portion 76 of the posts 44. The punching die 90 is then removed from the one-piece continuous liner 123. Thus, the one-piece continuous liner 123 with the slots 127 punched therethrough is illustrated in FIG. 12.

The punching steps include: positioning the pre-configured punching die adjacent a first one of the plurality of posts; inserting the guide pin members into openings proximate to the top and bottom ends of the first post; applying a downward force to the pre-configured punching die in order to force the shearing punches through the one-piece continuous liner; removing the guide pin members of the pre-configured punching die from the openings of the first one of the plurality of posts; positioning the pre-configured punching die adjacent a second one of the plurality of posts; and applying a downward force to the pre-configured punching die in order to force the shearing punches through the one-piece continuous liner.

Step 129 applies an adhesive 131, which can be seen in FIG. 14, to an inner surface 133 of the one-piece continuous liner 123 proximate to a bottom end 135 thereof and below the lowest slot 127, where the bottom end 135 of the one-piece continuous liner 123 is provided proximate to the aperture 84 of the post 44.

Figure 13:
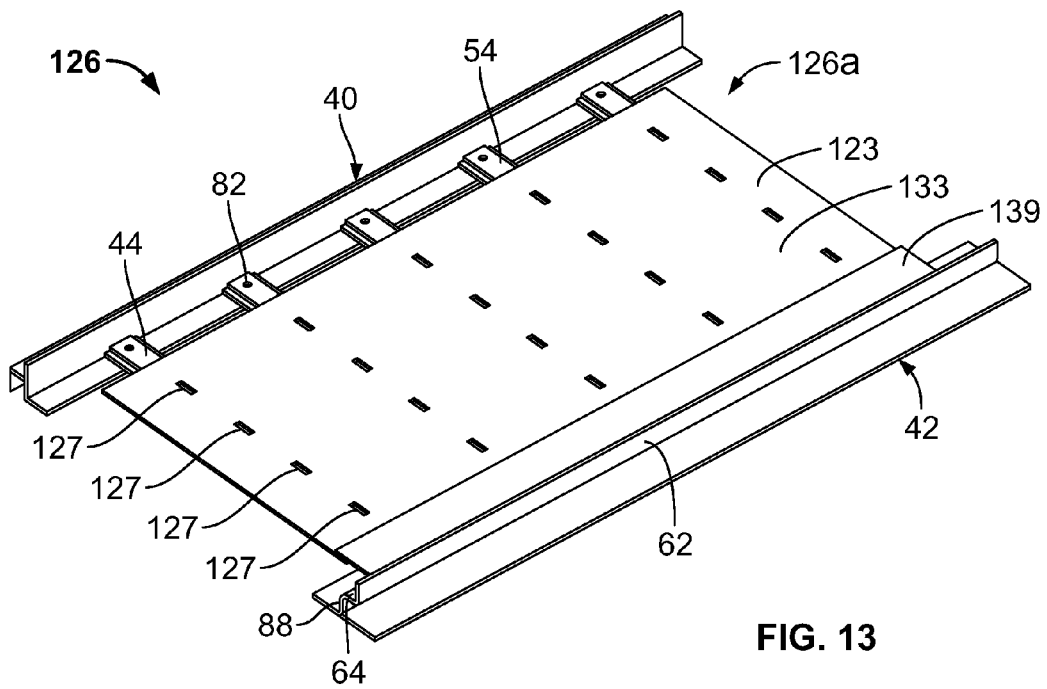
Figure 14:
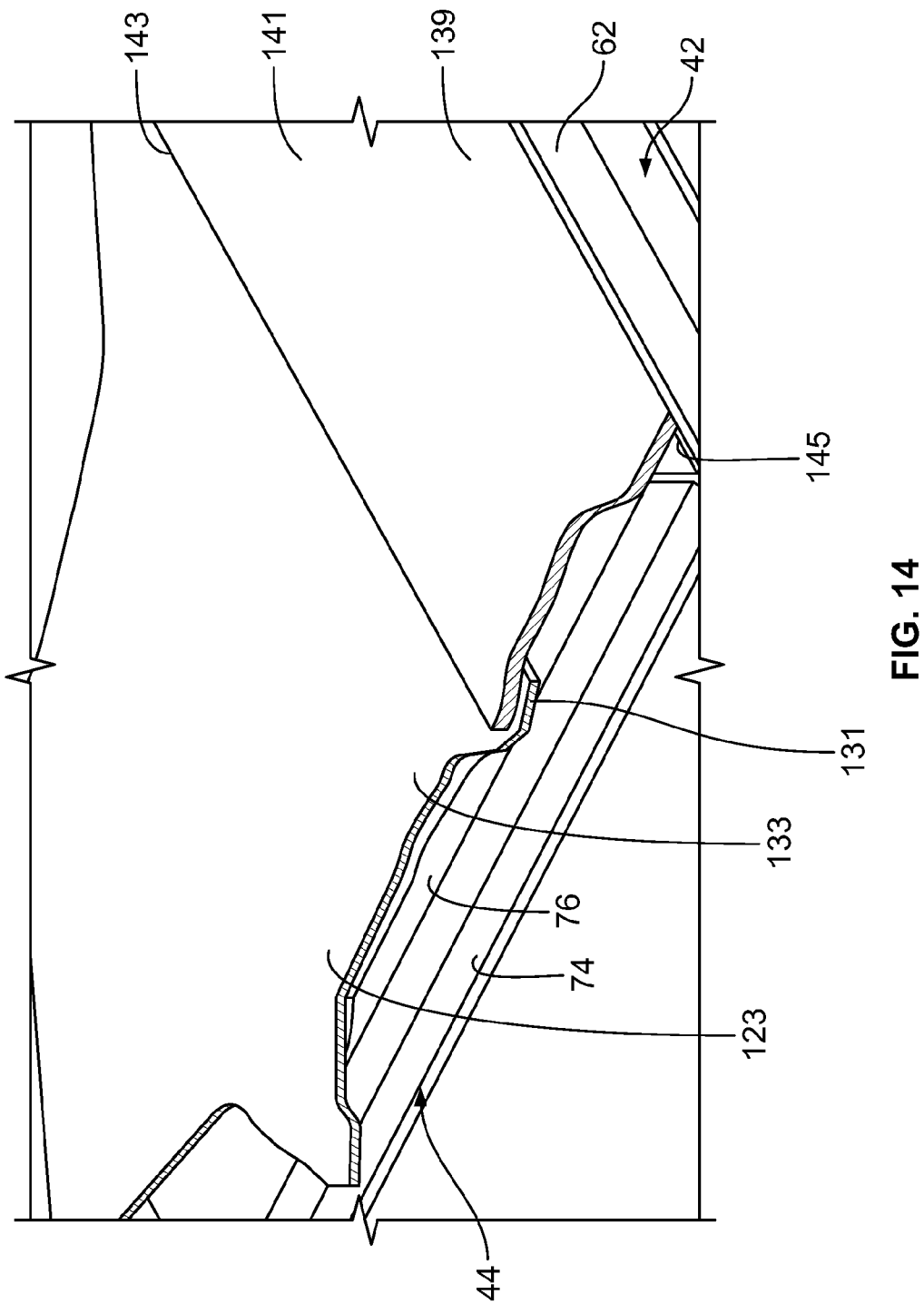

Step 137 secures a scuff plate 139 to the adhesive 131 applied to the inner surface 133 of the one-piece continuous liner 123, as illustrated in FIGS. 13 and 14. The scuff plate 139 is preferably a generally thin, elongated piece of metal or fiberglass which has an inner surface 141, an outer surface (not shown), a top end 143, and a bottom end 145, although other materials, such as wood, could be used to form the scuff plate 139. The outer surface of the scuff plate 139 proximate to the top end 143 thereof is secured to the adhesive 131 applied to the inner surface 133 of the one-piece continuous liner 123. The outer surface of the scuff plate 139 proximate to the bottom end 145 thereof is positioned against an inner surface 88 of the second portion 64 and the bottom end 145 of the scuff plate 139 is positioned proximate to, and preferably abuts against, a top surface (not shown) of the first portion 62. The scuff plate 139 may be secured to the bottom rail 42 by appropriate and known means, such as by fasteners, for instance rivets, or by adhesive, if desired.

The scuff plate 139 protects the sidewall 126 from damage, such as a fork lift scratching or puncturing the sidewall 126. The scuff plate 139 may extend the length of the sidewall 126 from the front wall 28 to the rear doors 30, or the scuff plate 139 may be comprised of a plurality of pieces which are secured to one another by appropriate and known means, such as fasteners, for instance rivets, or adhesive.

It is to be understood that the one-piece continuous liner 123 need not be secured to each of the posts 44 comprising the frame 46, but that such a construction is preferred. The one-piece continuous liner 123 need only be secured to enough of the posts 44 comprising the frame 46 to ensure the stability of the one-piece continuous liner 123 on the frame 46. At a minimum, the one-piece continuous liner 123 is preferably secured to at least the post 44 which is positioned closest to the front wall 28 of the trailer 20 and to the post 44 which is positioned closest to the rear doors 30 of the trailer 20.

It is further to be understood that the method 100 of forming the inner wall 126a of the sidewall configuration 126 may be performed at any time during the construction of the trailer 20, and the steps of the method 100 may be performed in any order feasible.

Figure 15:
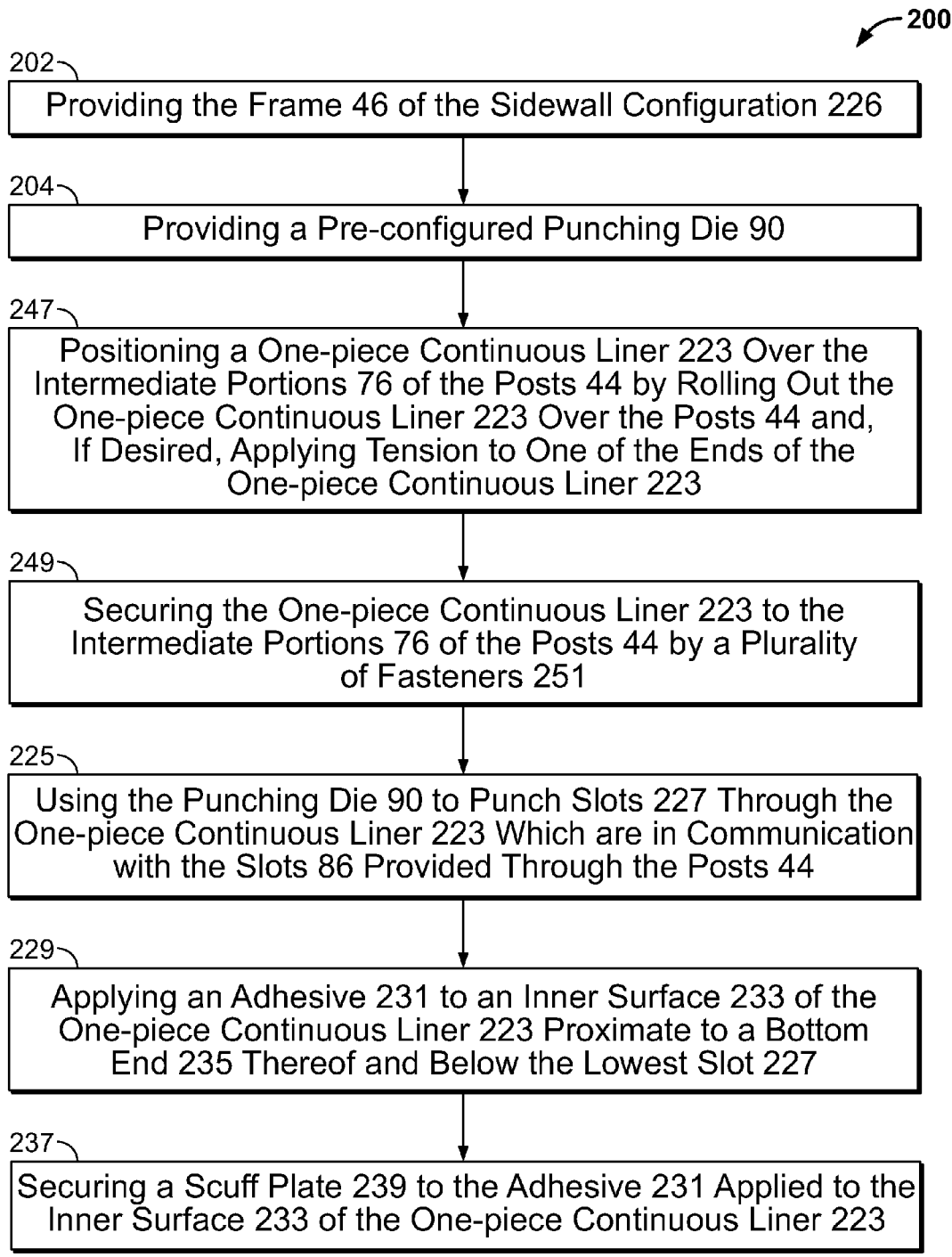
FIGS. 15-18 illustrate a second embodiment of a method for forming the inner wall of the sidewall.

Attention is directed to FIGS. 15-18 and the second embodiment of the inner wall 226a of the sidewall configuration 226 and the method 200 of forming same. A flow chart of the steps of the method 200 is illustrated in FIG. 15. The method 200 includes steps 202, 204, 225, 229 and 237, which are identical to respective steps 102, 104, 125, 129 and 137 of the method 100 and, therefore, are not repeated herein.

Figure 16:
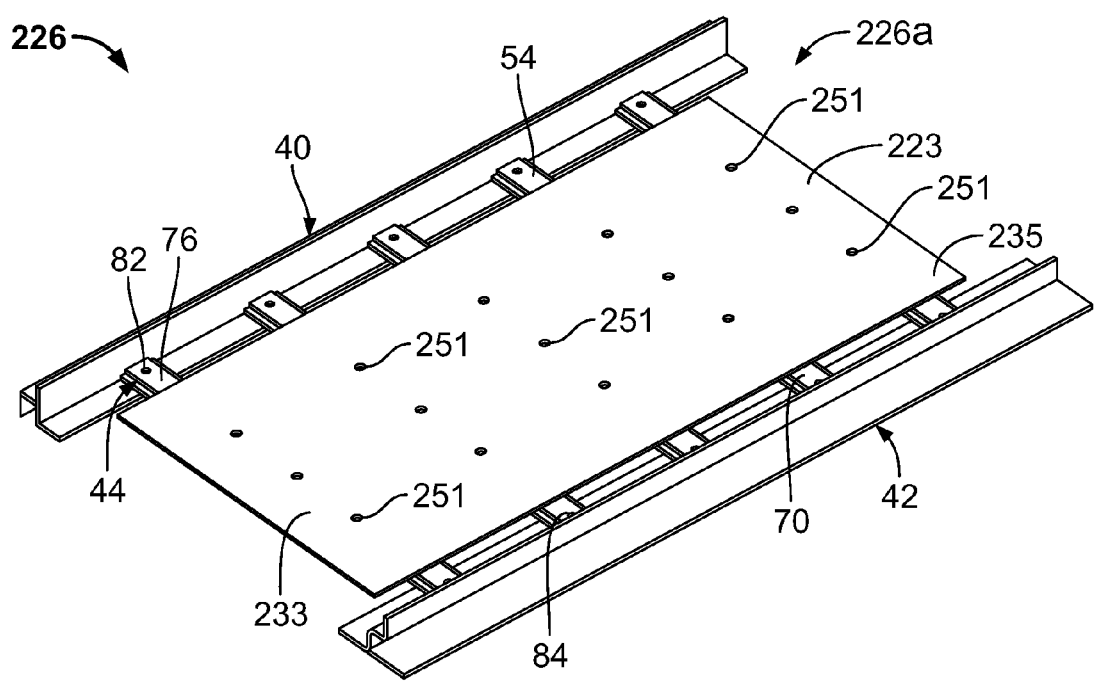

Step 247 positions a one-piece continuous liner 223 over the intermediate portions 76 of the posts 44, as illustrated in FIG. 16. The one-piece continuous liner 223 is preferably formed of a fiber reinforced plastic, such as a thermoplastic or thermoset glass reinforced material, or a metal, such as steel or aluminum, such that the one-piece continuous liner 223 is strong, but is also preferably a lightweight material.

The one-piece continuous liner 223 is preferably rectangular and extends from proximate to the top end 54 of each post 44 to proximate to the bottom end 70 of each post 44, such that it covers the inner surface 78 of the intermediate portions 76 of each post 44 between where the apertures 82, 84 are provided. When post 44a is utilized, the one-piece continuous liner 223 would cover the inner surface 78a of the flat end portions 74a between where the apertures 82a, 84a are provided. When post 44b is utilized, the one-piece continuous liner 223 would cover the inner surface 78b of the second flat end portion 77b between where the apertures 82b, 84b are provided.

The one-piece, continuous liner 223 also preferably extends from the front wall 28 of the trailer 20 to the rear doors 30 of the trailer 20. Preferably, the one-piece continuous liner 223 is rolled out over the posts 44, beginning from either the end of the sidewall 226 proximate to the front wall 28 of the trailer 20, or from the end of the sidewall 226 proximate to the rear doors 30 of the trailer 20. Also, if desired, tension may be applied to one of the ends of the one-piece continuous liner 223 when the one-piece continuous liner 223 is rolled out over the posts 44 such that the one-piece continuous liner 223 is able to be relatively snag resistant and which, in addition, is able to absorb and deflect punishment without being scratched, punctured or otherwise defaced. Alternatively, the one-piece continuous liner 223 is placed down onto the posts 44.

Figure 17:
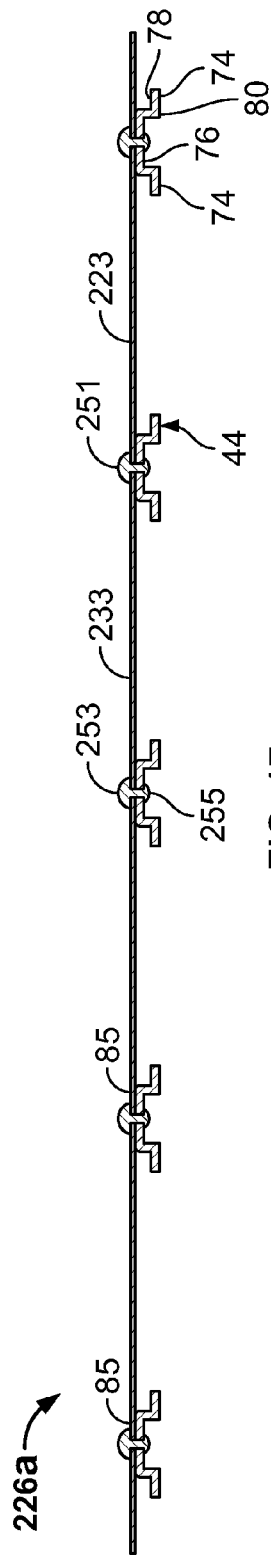
Figure 18:
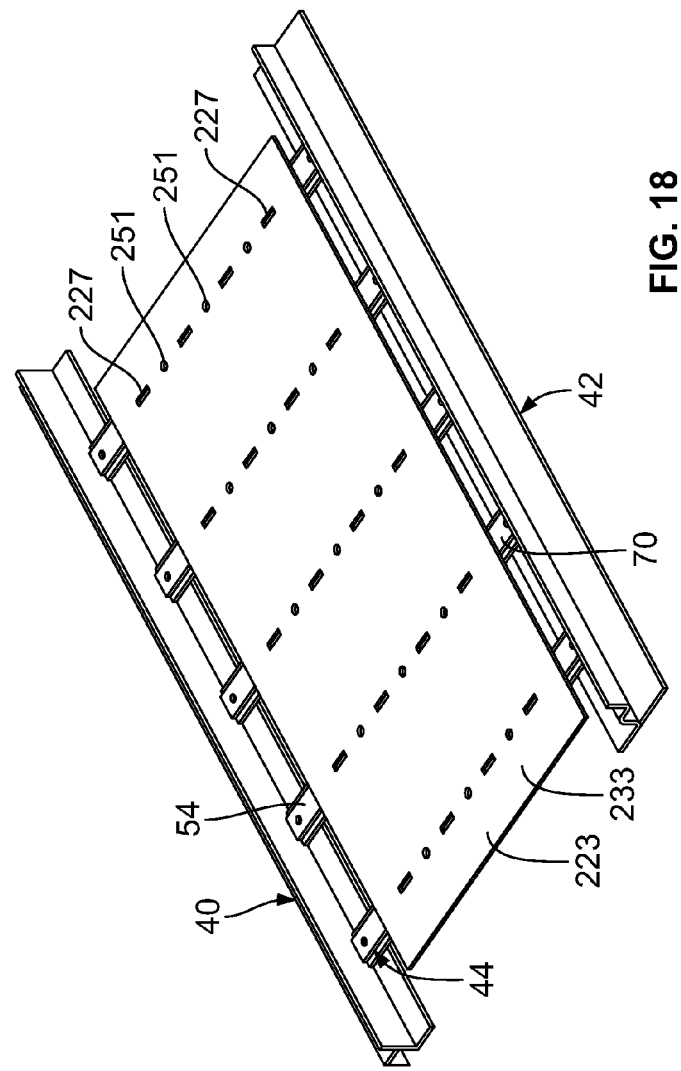

Step 249 secures the one-piece continuous liner 223 to the intermediate portions 76 of each post 44 by a plurality of fasteners 251, such as rivets, as illustrated in FIGS. 16 and 17. A head portion 253 of each rivet 251 is positioned against an inner surface 233 of the one-piece continuous liner 223 and a shank portion 255 of each rivet 251 extends through the one-piece continuous liner 223 and through the intermediate portions 76 of each post 44, in order to secure the one-piece continuous liner 223 to the posts 44. The rivets 251 preferably extend through the intermediate portions 76 of each post 44 between where the slots 86 are provided in the post 44. Each post 44 may be pre-configured to have holes 85 therethrough through which the shank portions 255 of the rivets 251 would extend. When post 44a is utilized, the one-piece continuous liner 223 would be secured to at least one of the flat end portions 74a of each post 44a by a plurality of fasteners 251, such as rivets. When post 44b is utilized, the one-piece continuous liner 223 would be secured to the second flat end portion 77b of each post 44b by a plurality of fasteners 251, such as rivets.

It is to be understood that the one-piece continuous liner 223 need not be secured to each of the posts 44 comprising the frame 46, but that such a construction is preferred. The one-piece continuous liner 223 need only be secured to enough of the posts 44 comprising the frame 46 to ensure the stability of the one-piece continuous liner 223 on the frame 46. At a minimum, the one-piece continuous liner 223 is preferably secured to at least the post 44 which is positioned closest to the front wall 28 of the trailer 20 and to the post 44 which is positioned closest to the rear doors 30 of the trailer 20.

It is further to be understood that the method 200 of forming the inner wall 226a of the sidewall configuration 226 may be performed at any time during the construction of the trailer 20, and the steps of the method 200 may be performed in any order where feasible.

Attention is directed to FIGS. 19 and 20 and the third embodiment of the inner wall 326a of the sidewall configuration 326 and the method 300 of forming same. A flow chart of the steps of the method 300 is illustrated in FIG. 19. The method 300 includes the steps 302, 304, 318, 321, 325, 329 and 337, which are identical to respective steps 102, 104, 118, 121, 125, 129 and 137 of the method 100 and, therefore, are not repeated herein. The method 300 also includes the step 349 which is identical to respective step 249 of the method 200 and, therefore, is not repeated herein.

Thus, method 300 includes all of the steps of method 100, but also includes one of the steps of method 200, namely step 249 of securing the one-piece continuous liner 223 to the intermediate portions 76 of each post 44 by a plurality of fasteners 251, such as rivets. By securing the one-piece continuous liner 323 to the intermediate portions 76 of each post 44 by at least an adhesive 319 and/or by a plurality of fasteners 351, the method 300 provides a stronger securement of the one-piece continuous liner 323 to the intermediate portions 76 of each post 44 than do either of the methods 100, 200. Preferably, the one-piece continuous liner 323 is secured to each post 44 by the adhesive 319 and is further secured to the post 44 positioned closest to the front wall 28 of the trailer 20 and to the post 44 positioned closest to the rear doors 30 of the trailer 20, by the plurality of fasteners 351.

It is to be understood that the one-piece continuous liner 323 need not be secured to each of the posts 44 comprising the frame 46, but that such a construction is preferred. The one-piece continuous liner 323 need only be secured to enough of the posts 44 comprising the frame 46 to ensure the stability of the one-piece continuous liner 323 on the frame 46. At a minimum, the one-piece continuous liner 323 is preferably secured to at least the post 44 which is positioned closest to the front wall 28 of the trailer 20 and to the post 44 which is positioned closest to the rear doors 30 of the trailer 20.

It is to be understood that the method 300 of forming the inner wall 326a of the sidewall configuration 326 may be performed at any time during the construction of the trailer 20, and the steps of the method 300 may be performed in any order where feasible.

Figure 21:
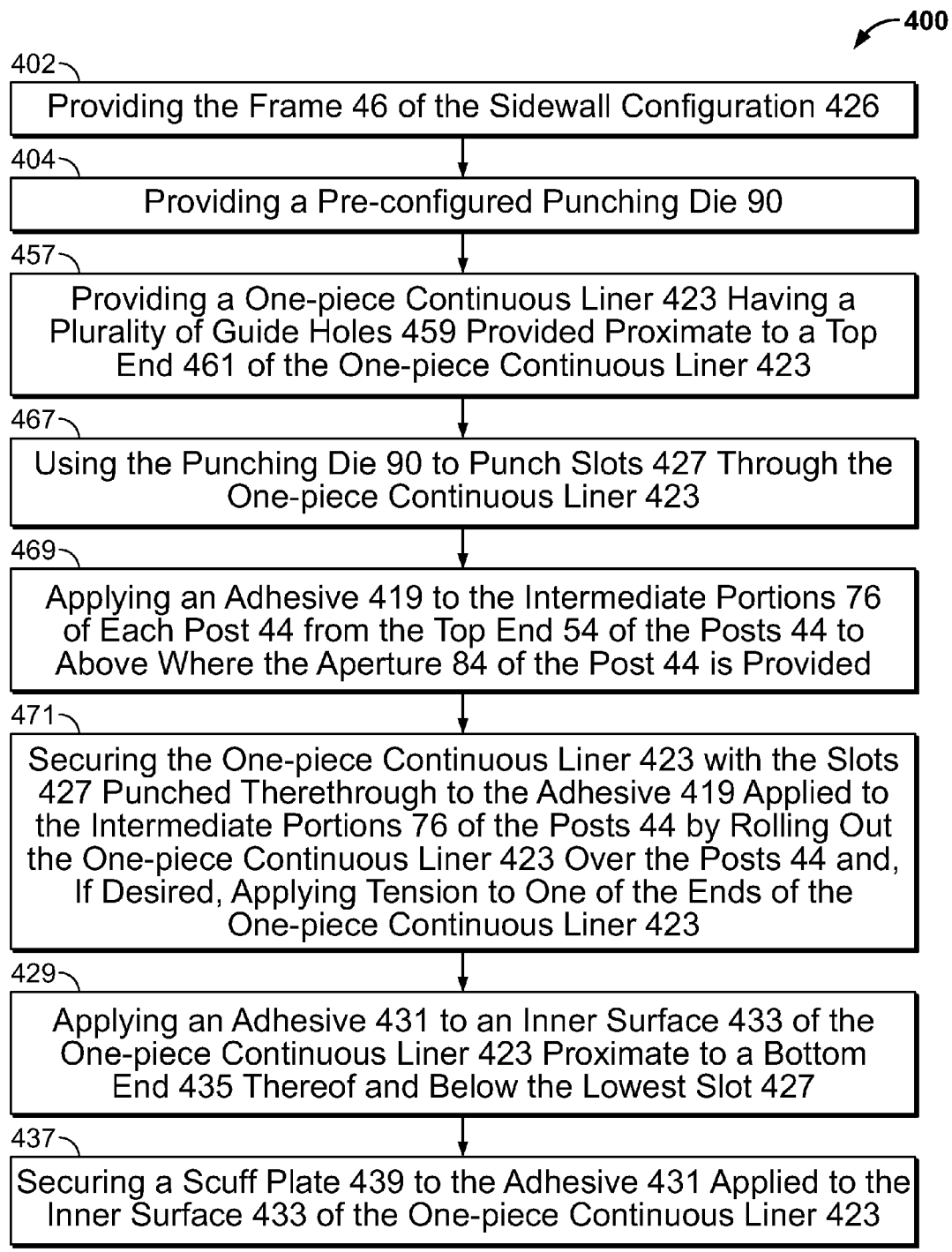
FIGS. 21-24 illustrate a fourth embodiment of a method for forming the inner wall of the sidewall.

Attention is directed to FIGS. 21-24 and the fourth embodiment of the inner wall 426a of the sidewall configuration 426 and the method 400 of forming same. A flow chart of the steps of the method 400 is illustrated in FIG. 21. The method 400 includes steps 402, 404, 429 and 437, which are identical to respective steps 102, 104, 129 and 137 of the method 100 and, therefore, are not repeated herein.

Figure 22:
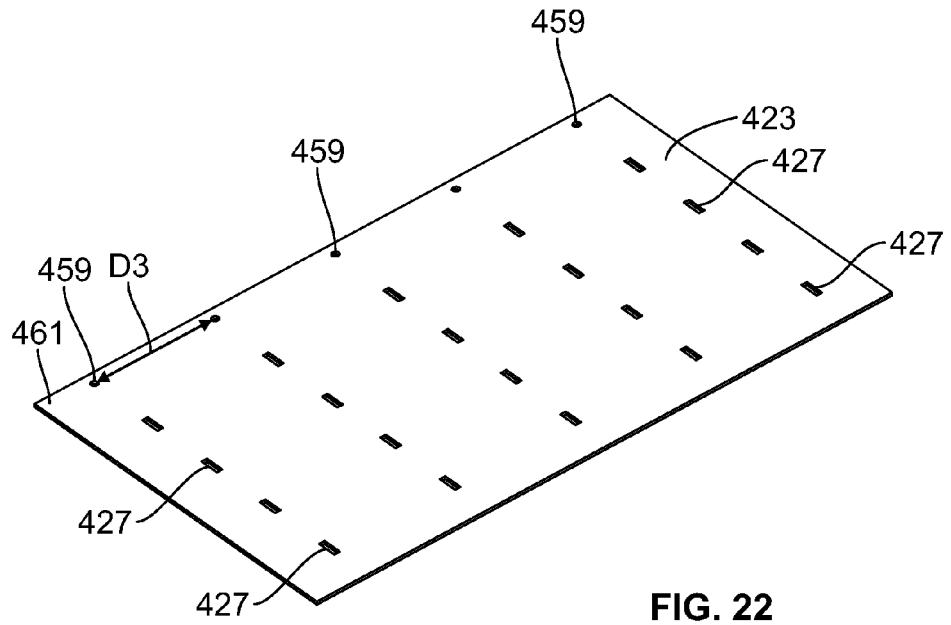

Step 457 provides a one-piece continuous liner 423 having a plurality of guide holes 459 provided proximate to a top end 461 of the one-piece continuous liner 423, as illustrated in FIG. 22. Each guide hole 459 is separated from an adjacent guide hole 459 by a predetermined distance D3. The one-piece continuous liner 423 is preferably formed of a fiber reinforced plastic, such as a thermoplastic or thermoset glass reinforced material, or a metal, such as steel or aluminum, such that the one-piece continuous liner 423 is strong, but is also preferably a lightweight material.

Step 467 uses the punching die 90 to punch slots 427 through the one-piece continuous liner 423. Step 467 is performed by first inserting the guiding pin member 96 into the guide hole 459 of the one-piece continuous liner 423. A force is then applied to the punching die 90 such that the shearing punches 99 are forced through the one-piece continuous liner 423, such that the shearing punches 99 remove portions of the one-piece continuous liner 423 to provide the slots 427 through the one-piece continuous liner 423. The slots 427 are sized to be commensurate with the size of the slots 86, and the slots 427 are distanced from one another to be commensurate with the distance of the slots 86 from one another, as the punching die 90 is pre-configured in this manner. The punching die 90 is then removed from the one-piece continuous liner 423. The one-piece continuous liner 423 having the slots 427 punched therethrough is illustrated in FIG. 22.

Step 469 preferably applies an adhesive 419 to the intermediate portions 76 of each post 44 from the top end 54 of the posts 44 to above where the aperture 84 of the post 44 is provided, such areas of the intermediate portions 76 of each post 44 preferably do not have the adhesive 419 applied thereto, namely at the bottom end 70 of the posts 44, similar to that as illustrated in FIGS. 9 and 10. When post 44a is utilized, the adhesive 419 would be applied to the inner surface 78a of at least one of the flat end portions 74a between where the apertures 82a, 84a are provided. When post 44b is utilized, the adhesive 419 would be applied to the inner surface 78b of the second flat end portion 77b between where the apertures 82b, 84b are provided.

Figure 23:
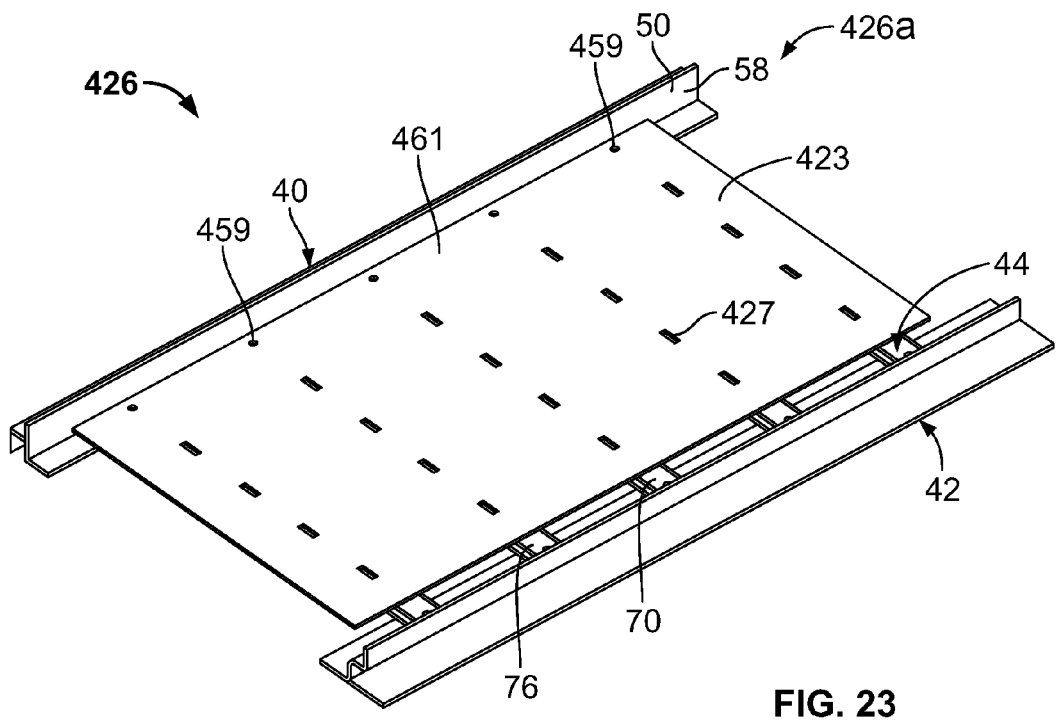

Step 471 secures the one-piece continuous liner 423 with the slots 427 punched therethrough to the adhesive 419 applied to the intermediate portions 76 of the posts 44, as illustrated in FIG. 23. When post 44a is utilized, the one-piece continuous liner 423 would be secured to the adhesive 419 applied to the at least one of the flat end portions 74a. When post 44b is utilized, the one-piece continuous liner 423 would be secured to the adhesive 419 applied to the second flat end portion 77b.

Figure 23A:
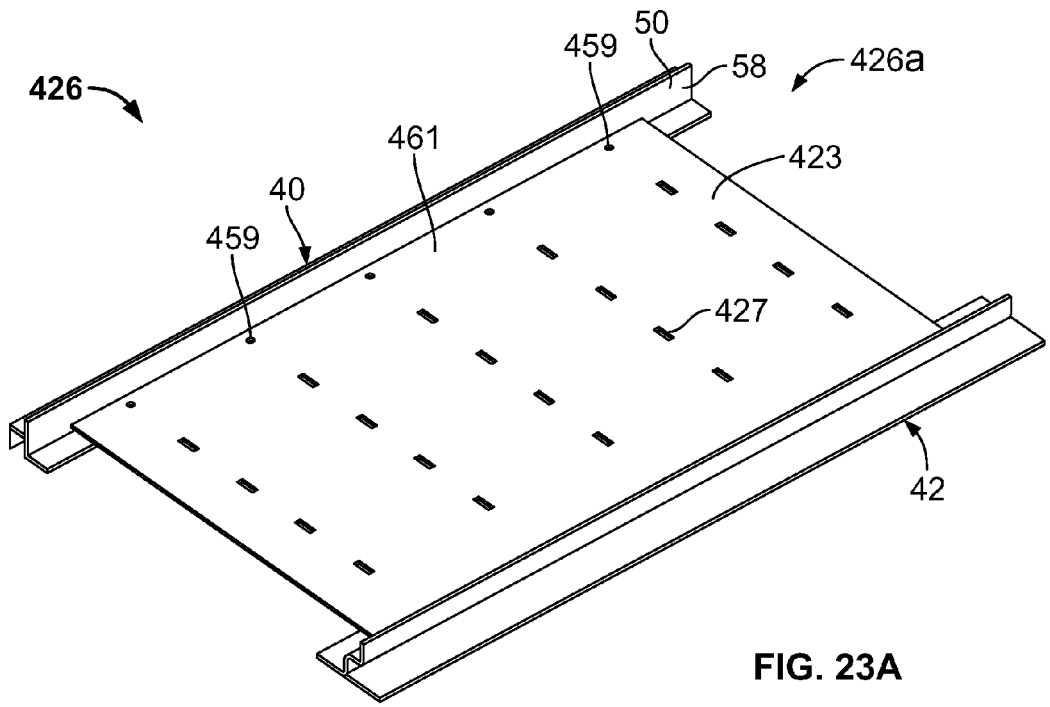
FIG. 23A is a perspective view of an alternative construction of the one-piece continuous liner which has the slots punched therethrough and having the apertures provided therethrough proximate to the top end thereof and being secured to the frame by adhesive such that the bottom end of the one-piece continuous liner abuts against the bottom rail.
Figure 24:
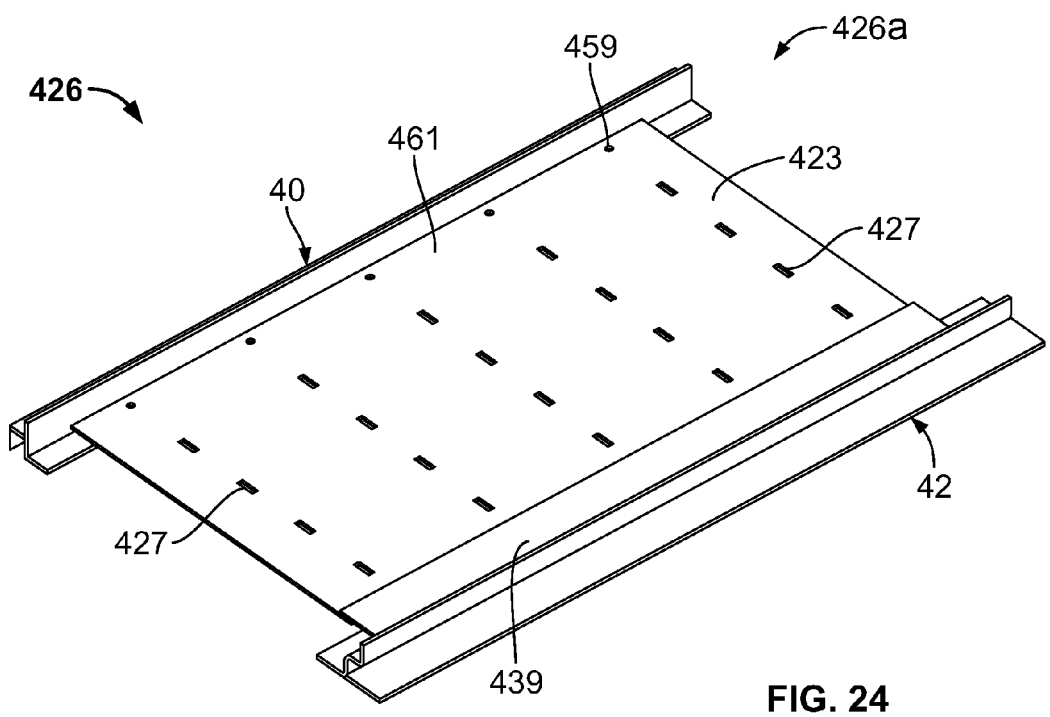

The one-piece continuous liner 423 is preferably rectangular and extends from the top end 54 of each post 44, such that the top end 461 of the one-piece continuous liner 423 is positioned proximate to, and preferably abuts against, the bottom surface 58 of the first flat portion 50 of the top rail 40, to proximate to the bottom end 70 of each post 44, such that is covers the adhesive 419 applied to the posts 44. If desired, the one-piece continuous liner 423 may be configured to extend to the bottom end 70 of each post 44, such that it covers the adhesive 419 applied to the posts 44 and such that it preferably abuts against the first horizontal flat portion 62 of the bottom rail 42, as illustrated in FIG. 23A. The one-piece continuous liner 423 also preferably extends from the front wall 28 of the trailer 20 to the rear doors 30 of the trailer 20. Preferably, the one-piece continuous liner 423 is rolled out over the posts 44, beginning from either the end of the sidewall 426 proximate to the front wall 28 of the trailer 20, or from the end of the sidewall 426 proximate to the rear doors 30 of the trailer 20. Also, if desired, tension may be applied to one of the ends of the one-piece continuous liner 423 when the one-piece continuous liner 423 is rolled out over the posts 44 such that the one-piece continuous liner 423 is able to be relatively snag resistant and which, in addition, is able to absorb and deflect punishment without being scratched, punctured or otherwise defaced. Alternatively, the one-piece continuous liner 423 is placed down onto the posts 44. Upon securing the one-piece continuous liner 423 to the adhesive 419 applied to the posts 44, the one-piece continuous liner 423 is positioned such that each of the slots 427 of the one-piece continuous liner 423 is positioned over one of the slots 86 of the posts 44, such that the slots 427 are in communication with the slots 86.

The slots 427 in the one-piece continuous liner 423 provide access to the slots 86 from an interior of the trailer 20 such that equipment can be engaged with the slots 86. Space is also provided behind the intermediate portion 76 of the posts 44 as the intermediate portion 76 bulges away from the flat end portions 74 further provides room within the sidewall configuration 426 such that equipment can be engaged with the slots 86 as part of the equipment would be positioned within the space provided behind the intermediate portion 76 of the posts 44.

It should be noted that if the one-piece continuous liner 423 is configured to extend to the bottom end 70 of the post 44 as illustrated in FIG. 23A, the scuff plate 439 is preferably formed from wood, preferably oak, rather than metal or fiberglass, and may be secured to the one-piece continuous liner 423 as previously described, or by any other suitable means.

It is to be understood that the one-piece continuous liner 423 need not be secured to each of the posts 44 comprising the frame 46, but that such a construction is preferred. The one-piece continuous liner 423 need only be secured to enough of the posts 44 comprising the frame 46 to ensure the stability of the one-piece continuous liner 423 on the frame 46. At a minimum, the one-piece continuous liner 423 is preferably secured to at least the post 44 which is positioned closest to the front wall 28 of the trailer 20 and to the post 44 which is positioned closest to the rear doors 30 of the trailer 20.

It is to be understood that the method 400 of forming the inner wall 426a of the sidewall configuration 426 may be performed at any time during the construction of the trailer 20, and the steps of the method 400 may be performed in any order where feasible.

Attention is directed to FIGS. 25 and 26 and the fifth embodiment of the inner wall 526a of the sidewall configuration 526 and the method 500 of forming same. A flow chart of the steps of the method 500 is illustrated in FIG. 25. The method 500 includes steps 502, 504, 529 and 537, which are identical to respective steps 102, 104, 129 and 137 of the method 100 and, therefore, are not repeated herein. The method 500 includes step 549, which is identical to respective step 249 of the method 200 and, therefore, is not repeated herein. The method 500 includes steps 557 and 567, which are identical to respective steps 457 and 467 of the method 400 and, therefore, are not repeated herein.

Step 573 positions the one-piece continuous liner 523 with the slots 527 punched therethrough over the intermediate portions 76 of the posts 44, as illustrated in FIG. 26. The one-piece continuous liner 523 is preferably formed of a fiber reinforced plastic, such as a thermoplastic or thermoset glass reinforced material, or a metal, such as steel or aluminum, such that the one-piece continuous liner 523 is strong, but it is also preferably a lightweight material.

The one-piece continuous liner 523 is preferably rectangular and extends from the top end 54 of each post 44, such that the top end 561 of the one-piece continuous liner 523 is positioned proximate to, and preferably abuts against, the bottom surface 58 of the first flat portion 50 of the top rail 40, to proximate to the bottom end 70 of each post 44. The one-piece continuous liner 523 also preferably extends from the front wall 28 of the trailer 20 to the rear doors 30 of the trailer 20. Preferably, the one-piece continuous liner 523 is rolled out over the posts 44, beginning from either the end of the sidewall 526 proximate to the front wall 28 of the trailer 20, or from the end of the sidewall 526 proximate to the rear doors 30 of the trailer 20. Also, if desired, tension may be applied to one of the ends of the one-piece continuous liner 523 when the one-piece continuous liner 523 is rolled out over the posts 44 such that the one-piece continuous liner 523 is able to be relatively snag resistant and which, in addition, is able to absorb and deflect punishment without being scratched, punctured or otherwise defaced. Alternatively, the one-piece continuous liner 523 is placed down onto the posts 44.

It should be noted that if the one-piece continuous liner 523 is configured to extend to the bottom end 70 of the post 44, the scuff plate 539 is preferably formed from wood, preferably oak, rather than metal or fiberglass, and may be secured to the one-piece continuous liner 523 as previously described, or by any other suitable means.

It is to be understood that the one-piece continuous liner 523 need not be secured to each of the posts 44 comprising the frame 46, but that such a construction is preferred. The one-piece continuous liner 523 need only be secured to enough of the posts 44 comprising the frame 46 to ensure the stability of the one-piece continuous liner 523 on the frame 46. At a minimum, the one-piece continuous liner 523 is preferably secured to at least the post 44 which is positioned closest to the front wall 28 of the trailer 20 and to the post 44 which is positioned closest to the rear doors 30 of the trailer 20.

It is to be understood that the method 500 of forming the inner wall 526a of the sidewall configuration 526 may be performed at any time during the construction of the trailer 20, and the steps of the method 500 may be performed in any order where feasible.

Attention is directed to FIG. 27 and the sixth embodiment of the inner wall 626a of the sidewall configuration 626 and the method 600 of forming same. A flow chart of the steps of the method 600 is illustrated in FIG. 27. The method 600 includes steps 602, 604, 629 and 637, which are identical to steps 102, 104, 129 and 137 of the method 100 and, therefore, are not repeated herein. The method 600 includes step 649 which is identical to step 249 of the method 200 and, therefore, is not repeated herein. The method 600 includes steps 657, 667, 669 and 671, which are identical to steps 457, 467, 469 and 471 and, therefore, are not repeated herein.

Thus, method 600 includes all of the steps of method 400, but also includes one of the steps of method 500, namely step 549 of securing the one-piece continuous liner 523 to the intermediate portions 76 of each post 44 by a plurality of fasteners 551, such as rivets. By securing the one-piece continuous liner 623 to the intermediate portions 76 of each post 44 by at least an adhesive 619 and/or by a plurality of fasteners 651, the method 600 provides a stronger securement of the one-piece continuous liner 623 to the intermediate portions 76 of each post 44 than do either of the methods 400, 500. Preferably, the one-piece continuous liner 623 is secured to each post 44 by the adhesive 619 and is further secured to the post 44 positioned closest to the front wall 28 of the trailer 20 and to the post 44 positioned closest to the rear doors 30 of the trailer 20, by the plurality of fasteners 651.

It is to be understood that the one-piece continuous liner 623 need not be secured to each of the posts 44 comprising the frame 46, but that such a construction is preferred. The one-piece continuous liner 623 need only be secured to enough of the posts 44 comprising the frame 46 to ensure the stability of the one-piece continuous liner 623 on the frame 46. At a minimum, the one-piece continuous liner 623 is preferably secured to at least the post 44 which is positioned closest to the front wall 28 of the trailer 20 and to the post 44 which is positioned closest to the rear doors 30 of the trailer 20.

It should be noted that if the one-piece continuous liner 623 is configured to extend to the bottom end 70 of the post 44, the scuff plate 639 is preferably formed from wood, preferably oak, rather than metal or fiberglass, and may be secured to the one-piece continuous liner 623 as previously described, or by any other suitable means.

It is to be understood that the method 600 of forming the inner wall 626a of the sidewall configuration 626 may be performed at any time during the construction of the trailer 20, and the steps of the method 300 may be performed in any order where feasible.

Attention is directed to FIGS. 31 and 32 and the seventh embodiment of the inner wall 726a of the sidewall configuration 726 and the method 700 of forming same. A flow chart of the steps of the method 700 is illustrated in FIG. 31. The method 700 includes steps 702, 704, 718, 721, 725, 729, 737 which are identical to respective steps 102, 104, 118, 121, 125, 129, 137 of the method 100 and, therefore, are not repeated herein.

Figure 30:
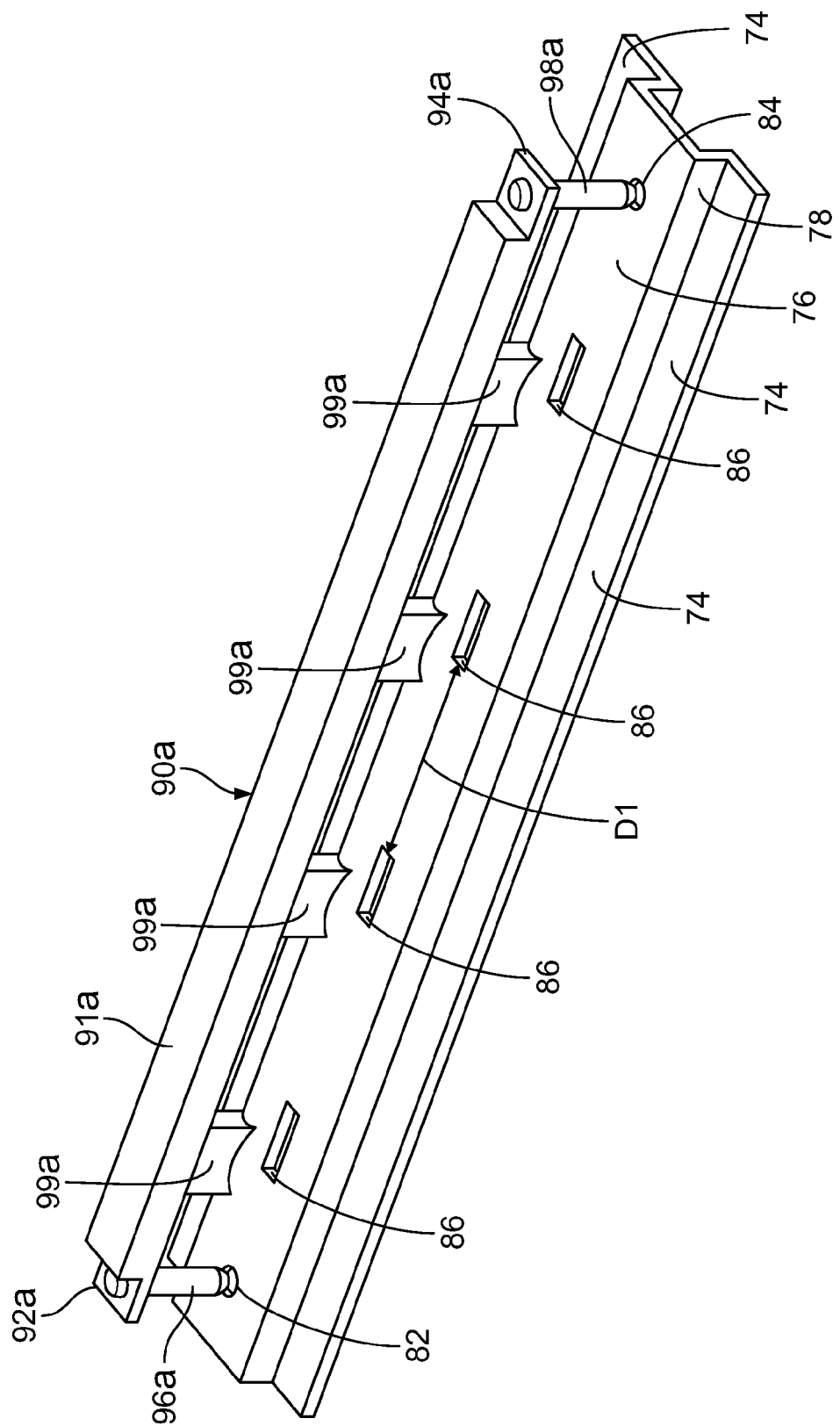
FIG. 30 is a perspective view of an alternative pre-configured punching die used in the method of forming the inner wall of the sidewall.

Step 775 provides a second pre-configured punching die 90a, which is illustrated in FIG. 30. The punching die 90a is formed from an elongated body 91a having a first end 92a and a second end 94a. Proximate to the first end 92a, the elongated body 91a has a guiding pin member 96a which extends through the elongated body 91a and, proximate to the second end 94a, the elongated body 91a has a guiding pin member 98a which extends through the elongated body 91a. The punching die 90a is pre-configured such that the guiding pin member 96a can be positioned within the aperture 82 of the post 44 and such that the guiding pin member 98a can be positioned within the aperture 84 of the post 44. The elongated body 91a is also pre-configured to have a plurality of shearing punches 99a provided between the guiding pin members 96a, 98a. Each shearing punch 99a protrudes from the elongated body 91a and is sized to be larger than the size of the slots 86 in the post 44, such that the shearing punch 99a is larger than the size of the shearing punch 99. Each shearing punch 99a is distanced from an adjacent shearing punch 99a by a distance which is less than the distance between adjacent slots 86 in the post 44.

Step 777 uses the punching die 90a to punch through the one-piece continuous liner 723 in order to enlarge the size of the slots 727 previously punched through the one-piece continuous liner in step 725. Step 777 is performed by first inserting the guiding pin member 96a into the aperture 82 of the post 44, and by inserting the guiding pin member 98a into the aperture 84 of the post 44. A force is then applied to the body 91a of the punching die 90a such that the shearing punches 99a are forced through the one-piece continuous liner 723, but not forced through the post 44. The shearing portions 99a remove portions of the one-piece continuous liner 723 to enlarge the slots 727 through the one-piece continuous liner 723. Each slot 727 is preferably rectangular in configuration such that it has opposite top and bottom edges 728a, 728b and opposite side edges 728c, 728d. A distance between top and bottom edges 728a, 728b is preferably greater than a distance between top and bottom edges 87a, 87b of the slots 86, and a distance between side edges 728c, 728d is preferably greater than a distance between side edges 87c, 87d of the slots 86. A shoulder is preferably provided between each of the edges 728a, 728b, 728c, 728d and edges 87a, 87b, 87c, 87d, although if desired, one or more of the edges 728a, 728b, 728c, 728d may be generally flush with one or more of the edges 87a, 87b, 87c, 87d, so long as the slot 727 is larger in size than the slot 86. The slots 727 are thus sized to be larger than the size of the slots 86, and the slots 727 are preferably distanced from one another at a distance which is less than a distance from which the slots 86 are distanced from one another, as the punching die 90a is pre-configured in this manner. The slots 727 in the one-piece continuous liner 723 provide access to the slots 86 from an interior of the trailer 20 such that equipment can be engaged with the slots 86. The enlarged slots 727 allow for manufacturing tolerances and stack-ups between components and assemblies. The enlarged slots 727 ensure that the trailer 20 can be assembled with the slots 86 in the post 44 being exposed and fully functional. Space is also provided behind the intermediate portion 76 of the posts 44 as the intermediate portion 76 bulges away from the flat end portions 74 further provides room within the sidewall configuration 726 such that equipment can be engaged with the slots 86 as part of the equipment would be positioned within the space provided behind the intermediate portion 76 of the posts 44. The punching die 90a is then removed from the one-piece continuous liner 723. Thus, the one-piece continuous liner 723 with the enlarged slots 727 punched therethrough is illustrated in FIG. 32.

Attention is directed to FIG. 35 and the eighth embodiment of the inner wall 826a of the sidewall configuration 826 and the method 800 of forming same. A flow chart of the steps of the method 800 is illustrated in FIG. 35. The method 800 includes steps 802, 804, 818, 821, 825, 829, 837 which are identical to respective steps 102, 104, 118, 121, 125, 129, 137 of the method 100 and, therefore, are not repeated herein.

Step 879 provides a second pre-configured punching die 90b, which is illustrated in FIG. 34. The punching die 90b is formed from an elongated body 91b having a first end 92b and a second end 94b. Proximate to the first end 92b, the elongated body 91b has a guiding pin member 96b which extends through the elongated body 91b and, proximate to the second end 94b, the elongated body 91b has a guiding pin member 98b which extends through the elongated body 91b. The punching die 90b is pre-configured such that the guiding pin member 96b can be positioned within the aperture 82 of the post 44 and such that the guiding pin member 98b can be positioned within the aperture 84 of the post 44. The elongated body 91b is also pre-configured to have a plurality of shearing punches 99b provided between the guiding pin members 96b, 98b. Each shearing punch 99b has a first portion 99b' which protrudes from the elongated body 91b and a second portion 99b" which protrudes from the first portion 99b'. The second portion 99b" is sized to generally correspond to the size of the slots 86 in the post 44 with each second portion 99b" being distanced from an adjacent second portion 99b" to correspond to the distance between adjacent slots 86 in the post 44. The first portion 99b' is sized to be larger than the size of the slots 86 in the post 44, and thus the second portion 99b", with each first portion 99b' being distanced from an adjacent first portion 99b' by a distance which is less than the distance between adjacent slots 86 in the post 44.

Step 881 uses the punching die 90b to punch through the one-piece continuous liner 823 in order to enlarge the size of the slots 827 previously punched through the one-piece continuous liner in step 825. Step 881 is performed by first inserting the guiding pin member 96b into the aperture 82 of the post 44, and by inserting the guiding pin member 98b into the aperture 84 of the post 44. A force is then applied to the body 91b of the punching die 90b such that the second portion 99b" extends through the slot 827 and into the slots 86 of the post 44, and such that the first portion 99b' is forced through the one-piece continuous liner 823, but not forced through the post 44. The first portions 99b' remove portions of the one-piece continuous liner 823 to enlarge the slots 827 through the one-piece continuous liner 823. The slots 827 are thus sized to be larger than the size of the slots 86, and the slots 827 are distanced from one another at a distance which is less than a distance from which the slots 86 are distanced from one another, as the punching die 90b is pre-configured in this manner. The slots 827 in the one-piece continuous liner 823 provide access to the slots 86 from an interior of the trailer 20 such that equipment can be engaged with the slots 86. The enlarged slots 827 allow for manufacturing tolerances and stack-ups between components and assemblies. The enlarged slots 827 ensures that the trailer 20 can be assembled with the slots 86 in the post 44 being exposed and fully functional. Space is also provided behind the intermediate portion 76 of the posts 44 as the intermediate portion 76 bulges away from the flat end portions 74 further provides room within the sidewall configuration 826 such that equipment can be engaged with the slots 86 as part of the equipment would be positioned within the space provided behind the intermediate portion 76 of the posts 44. The punching die 90b is then removed from the one-piece continuous liner 823.

Attention is directed to FIG. 35 and the ninth embodiment of the inner wall 926a of the sidewall configuration 926 and the method 900 of forming same. A flow chart of the steps of the method 900 is illustrated in FIG. 35. The method 900 includes steps 902, 918, 921, 929, 937 which are identical to respective steps 102, 118, 121, 129, 137 of the method 100 and, therefore, are not repeated herein. The method 900 further includes step 975 which is identical to respective step 775 of the method 700 and, therefore, is not repeated herein.

Method 900 further includes step 983 which uses the punching die 90a to punch slots 927 through the one-piece continuous liner 923 which are in communication with the slots 86 provided through the posts 44, and which are larger in size than the slots 86 provided through the posts 44. Step 983 is performed by first inserting the guiding pin member 96a into the aperture 82 of the post 44, and by inserting the guiding pin member 98a into the aperture 84 of the post 44. A force is then applied to the body 91a of the punching die 90a such that the shearing punches 99a are forced through the one-piece continuous liner 923, but not forced through the post 44. The shearing portions 99a remove portions of the one-piece continuous liner 923 to provide slots 927 through the one-piece continuous liner 923 which are larger than the size of the slots 86 provided through the post 44. The slots 927 are thus distanced from one another at a distance which is less than a distance from which the slots 86 are distanced from one another, as the punching die 90a is pre-configured in this manner. The slots 927 in the one-piece continuous liner 923 provide access to the slots 86 from an interior of the trailer 20 such that equipment can be engaged with the slots 86. The slots 927 being larger in size than the slots 86 through the post 44 allow for manufacturing tolerances and slack-ups between components and assemblies. The slots 927 ensure that the trailer 20 can be assembled with the slots 86 in the post 44 being exposed and fully functional. Space is also provided behind the intermediate portion 76 of the posts 44 as the intermediate portion 76 bulges away from the flat end portions 74 further provides room within the sidewall configuration 926 such that equipment can be engaged with the slots 86 as part of the equipment would be positioned within the space provided behind the intermediate portion 76 of the posts 44. The punching die 90a is then removed from the one-piece continuous liner 923.

Attention is directed to FIG. 36 and the tenth embodiment of the inner wall 1026a of the sidewall configuration 1026 and the method 1000 of forming same. A flow chart of the steps of the method 1000 is illustrated in FIG. 36. The method 1000 includes steps 1002, 1004, 1047, 1049, 1025, 1029, 1037 which are identical to respective steps 202, 204, 247, 249, 225, 229, 237 of the method 200 and, therefore, are not repeated herein. The method 1000 further includes steps 1075, 1077 which are identical to respective steps 775, 777 of the method 700 and, therefore, are not repeated herein.

Attention is directed to FIG. 37 and the eleventh embodiment of the inner wall 1126a of the sidewall configuration 1126 and the method 1100 of forming same. A flow chart of the steps of the method 1100 is illustrated in FIG. 37. The method 1100 includes steps 1102, 1104, 1147, 1149, 1125, 1129, 1137 which are identical to respective steps 202, 204, 247, 249, 225, 229, 237 of the method 200 and, therefore, are not repeated herein. The method 1100 further includes steps 1179, 1181 which are identical to respective steps 879, 881 of the method 800 and, therefore, are not repeated herein.

Attention is directed to FIG. 38 and the twelfth embodiment of the inner wall 1226a of the sidewall configuration 1226 and the method 1200 of forming same. A flow chart of the steps of the method 1200 is illustrated in FIG. 38. The method 1200 includes steps 1202, 1247, 1249, 1229, 1237 which are identical to respective steps 202, 247, 249, 229, 237 of the method 200 and, therefore, are not repeated herein. The method 1200 further includes step 1275 which is identical to respective step 775 of the method 700 and, therefore, is not repeated herein. The method 1200 further includes step 1283 which is identical to respective step 983 of the method 900 and, therefore, is not repeated herein.

Attention is directed to FIG. 39 and the thirteenth embodiment of the inner wall 1326*a* of the sidewall configuration 1326 and the method 1300 of forming same. A flow chart of the steps of the method 1300 is illustrated in FIG. 39. The method 1300 includes steps 1302, 1304, 1318, 1321, 1349, 1325, 1329, 1337 which are identical to respective steps 302, 304, 318, 321, 349, 325, 329, 337 of the method 300 and, therefore, are not repeated herein. The method 1300 further includes steps 1375, 1377 which are identical to respective steps 775, 777 of the method 700 and, therefore, are not repeated herein.

Attention is directed to FIG. 40 and the fourteenth embodiment of the inner wall 1426*a* of the sidewall configuration 1426 and the method 1400 of forming same. A flow chart of the steps of the method 1400 is illustrated in FIG. 40. The method 1400 includes steps 1402, 1404, 1418, 1421, 1449, 1425, 1429, 1437 which are identical to respective steps 302, 304, 318, 321, 349, 325, 329, 337 of the method 300 and, therefore, are not repeated herein. The method 1400 further includes steps 1479, 1481 which are identical to respective steps 879, 881 of the method 800 and, therefore, are not repeated herein.

Attention is directed to FIG. 41 and the fifteenth embodiment of the inner wall 1526*a* of the sidewall configuration 1526 and the method 1500 of forming same. A flow chart of the steps of the method 1500 is illustrated in FIG. 41. The method 1500 includes steps 1502, 1518, 1521, 1549, 1529, 1537 which are identical to respective steps 302, 318, 321, 349, 329, 337 of the method 300 and, therefore, are not repeated herein. The method 1500 further includes step 1575 which is identical to respective step 775 of the method 700 and, therefore, is not repeated herein. The method 1500 further includes step 1583 which is identical to respective step 983 of the method 900 and, therefore, is not repeated herein.

Attention is directed to FIG. 42 and the sixteenth embodiment of the inner wall 1626*a* of the sidewall configuration 1626 and the method 1600 of forming same. A flow chart of the steps of the method 1600 is illustrated in FIG. 42. The method 1600 includes steps 1602, 1657, 1669, 1671, 1629, 1637 which are identical to respective steps 402, 457, 469, 471, 429, 437 of the method 400 and, therefore, are not repeated herein. The method 1600 further includes step 1675 which is identical to respective step 775 of the method 700 and, therefore, is not repeated herein.

Method 1600 further includes step 1685 which uses the punching die 90*a* to punch slots 1627 through the one-piece continuous liner 1623. Step 1685 is performed by first inserting the guiding pin member 96*a* into the guide hole 1659 of the one-piece continuous liner 1623. A force is then applied to the punching die 90*a* such that the shearing punches 99*a* are forced through the one-piece continuous liner 1623, such that the shearing punches 99*a* remove portions of the one-piece continuous liner 1623 to provide the slots 1627 through the one-piece continuous liner 1623. The slots 1627 are sized to be larger in size than the slots 86 provided through the posts 44. The slots 1627 are thus distanced from one another at a distance which is less than a distance from which the slots 86 are distanced from one another, as the punching die 90*a* is pre-configured in this manner. The slots 1627 in the one-piece continuous liner 1623 will provide access to the slots 86 from an interior of the trailer 20 such that equipment can be engaged with the slots 86. The slots 1627 being larger in size than the slots 86 through the post 44 allow for manufacturing tolerances and stack-ups between components and assemblies. The slots 1627 ensure that the trailer 20 can be assembled with the slots 86 in the post 44 being exposed and fully functional. Space is also provided behind the intermediate portion 76 of the posts 44 as the intermediate portion 76 bulges away from the flat end portions 74 further provides room within the sidewall configuration 16926 such that equipment can be engaged with the slots 86 as part of the equipment would be positioned within the space provided behind the intermediate portion 76 of the posts 44. The punching die 90*a* is then removed from the one-piece continuous liner 1623.

Attention is directed to FIG. 43 and the seventeenth embodiment of the inner wall 1726*a* of the sidewall configuration 1726 and the method 1700 of forming same. A flow chart of the steps of the method 1700 is illustrated in FIG. 43. The method 1700 includes steps 1702, 1757, 1773, 1749, 1729, 1737 which are identical to respective steps 502, 557, 573, 549, 529, 537 of the method 500 and, therefore, are not repeated herein. The method 1700 further includes step 1775 which is identical to respective step 775 of the method 700 and, therefore, is not repeated herein. The method 1700 further includes the step 1785 which is identical to respective step 1685 of the method 1600 and, therefore, is not repeated herein.

Attention is directed to FIG. 44 and the eighteenth embodiment of the inner wall 1826*a* of the sidewall configuration 1826 and the method 1800 of forming same. A flow chart of the steps of the method 1800 is illustrated in FIG. 44. The method 1800 includes steps 1802, 1857, 1869, 1871, 1849, 1829, 1837 which are identical to respective steps 602, 657, 669, 671, 649, 629, 637 of the method 600 and, therefore, are not repeated herein. The method 1800 further includes step 1875 which is identical to respective step 775 of the method 700 and, therefore, is not repeated herein. The method 1800 further includes the step 1885 which is identical to respective step 1685 of the method 1600 and, therefore, is not repeated herein.

Figure 9A:
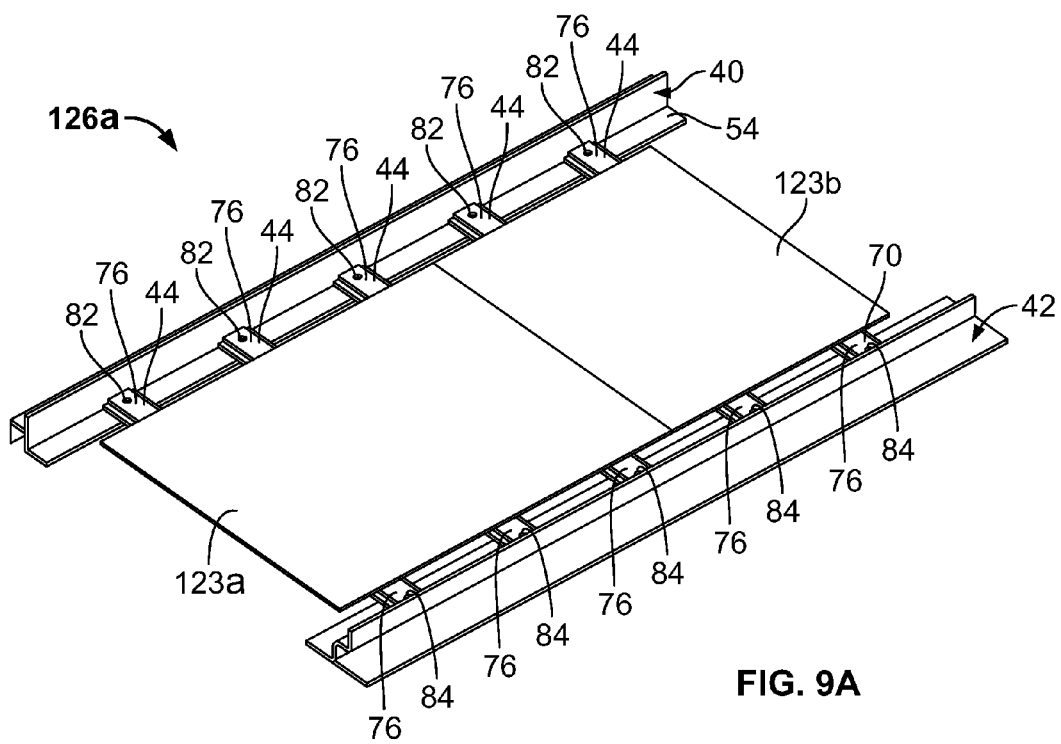
FIG. 9A is a perspective view of a plurality of continuous liners being secured to the frame by an adhesive.

It should further be noted that in the preferred embodiment of each of the methods 100, 200, 300, 400, 500, 600, 700, 800, 900, 1000, 1100, 1200, 1300, 1400, 1500, 1600, 1700, 1800 the liner 123, 223, 323, 423, 523, 623, 723, 823, 923, 1023, 1123, 1223, 1323, 1423, 1523, 1623, 1723 is one-piece as illustrated and described, but the liner 123, 223, 323, 423, 523, 623, 723, 823, 923, 1023, 1123, 1223, 1323, 1423, 1523, 1623, 1723, 1823 as illustrated in FIG. 9A with reference to liner 123 only, may be formed of a plurality of pieces 123*a*, 123*b*, but each piece 123*a*, 123*b* spans the distance between at least two adjacent posts 44.

Figure 28:
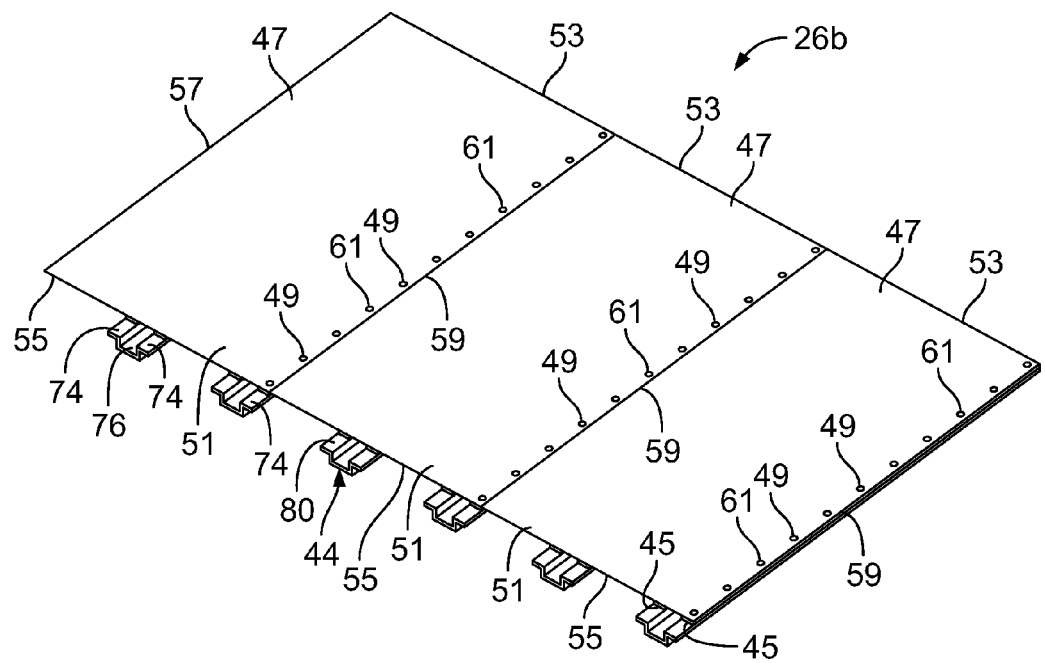
FIG. 28 is a perspective view of an outer wall of the sidewall configuration of the present invention.

Each sidewall construction 126, 226, 326, 426, 526, 626, 726, 826, 926, 1026, 1126, 1226, 1326, 1426, 1526, 1626, 1726, 1826 also preferably has an outer wall 26*b*, as illustrated in FIG. 28. As shown in the drawings, only a portion of the outer walls 26*b* is illustrated. It is to be understood that the outer wall 26*b* illustrated is generally provided for each sidewall 26 between the front wall 28 and the rear doors 30.

Outer wall 26*b* is formed of the plurality of the posts 44, adhesive 45, a plurality of panels 47, and a plurality of fasteners 49, such as rivets.

Each post 44 has the adhesive 45 provided along an outer surface 80 of the flat end portions 74 of the post 44.

Bach panel 47 has an inner surface (not shown) and an outer surface 51. Each panel 47 further has a top edge 53, a bottom edge 55, a first side edge 57 and a second side edge 59. The inner surface of each panel 47 proximate to the first side edge 57 thereof is secured to one of the flat end portions 74 of one of the posts 44 by the adhesive 45. The inner surface of each panel 47 between the first and second side edges 57, 59 is secured to both of the flat end portions 74 of one of the posts 44 by the adhesive 45. The inner surface of each panel 47 proximate to the second side edge 59 thereof is positioned on top of the outer surface 51 of an adjacent panel 47 proximate to the first side edge 57 thereof.

The plurality of rivets 49 extend through the panel 47 proximate to the second side edge 59 thereof, through the adjacent panel 47 proximate to the first side edge 57 thereof, through the adhesive 45, and through the one flat end portion 74 of the post 44, in order to secure the panels 47 and the post 44 together, and such that a head portion 61 of the rivets 49 are positioned against the outer surface 51 of the panels 47 proximate to the second side edge 59 thereof.

It is to be understood that other configurations of outer walls could be utilized as desired.

Figure 29:
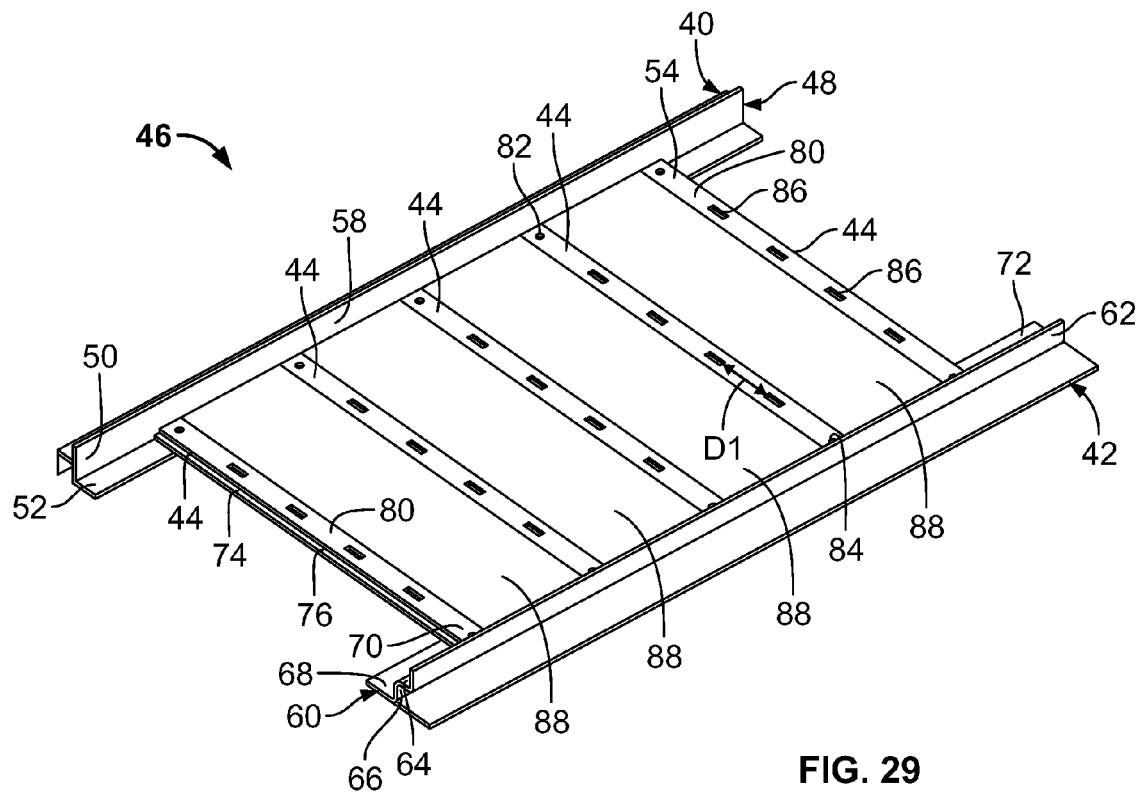
FIG. 29 is a perspective view of the frame of the sidewall of the trailer illustrated in FIG. 3, having insulative material provided between the posts of the frame.

Regardless of which embodiment 126a, 226a, 326a, 426a, 526a, 626a, 726a, 826a, 926a, 1026a, 1126a, 1226a, 1326a, 1426a, 1526a, 1626a, 1726a, 1826a of the inner wall 26a of the sidewall construction 26 is used, an insulative material 88 may be provided between the inner wall 26a and the outer wall 26b and between adjacent posts 44, if desired. The insulative material 88 may be in the form of a foam panel, as illustrated in FIG. 29 or in any other form known in the art.

It should further be noted that, if desired, the posts 44 may be secured to only the top rail 40 and not the bottom rail 42, or may be secured to only the bottom rail 42 and not the top rail 40, or may be secured to neither the top rail 40 or the bottom rail 42, as the posts 44 will still be properly positioned within the sidewall 26 by the securement of the posts 44 to the inner wall 26a and/or the outer wall 26b.

While preferred embodiments of the invention are shown and described, it is envisioned that those skilled in the art may devise various modifications without departing from the spirit and scope of the foregoing description and the appended claims.

The invention is claimed as follows:

1. A method of forming an inner wall of a sidewall configuration of a trailer, said method comprising the steps of:
    a) providing a plurality of posts, each post having slots provided therethrough;
    b) providing at least one pre-configured punching die;
    c) providing a one-piece continuous liner;
    d) securing said one-piece continuous liner to said plurality of posts; and
    e) punching slots through said one-piece continuous liner with said at least one pre-configured punching die,
    wherein step (d) can be performed either before or after step (e), and
    wherein one of the plurality of posts and the one-piece continuous liner includes guide openings for engagement with corresponding guide pins on said preconfigured punching die, said guide openings positioned above and below the slots of the respective one of the plurality of the posts and the one-piece continuous liner wherein each guide opening defines a first shape, and wherein a second shape of each slot of the respective one of the plurality of the posts and the one-piece continuous liner is different than the first shape of each guide opening.

2. The method as defined in claim 1, further including the step of:
    f) providing a bottom rail, a bottom end of said one-piece continuous liner extending to a position above said bottom rail; and
    g) securing a scuff plate to an inner surface of said one-piece continuous liner such that said scuff plate generally extends to said bottom rail.

3. The method as defined in claim 2, wherein step (g) includes the sub-steps of:
    g1) applying an adhesive to said inner surface of said one-piece continuous liner proximate to said bottom end thereof; and
    g2) securing said scuff plate to said adhesive applied to said inner surface of said one-piece continuous liner.

4. The method as defined in claim 1, wherein in step (d), said one-piece continuous liner is secured to at least two of said plurality of posts by an adhesive.

5. The method as defined in claim 4, wherein in step (d), said one-piece continuous liner is rolled out over said plurality of posts.

6. The method as defined in claim 5, wherein in step (d), said one-piece continuous liner is rolled out over said plurality of posts under tension.

7. The method as defined in claim 1, wherein in step (d), said one-piece continuous liner is secured to at least two of said plurality of posts by a plurality of fasteners.

8. The method as defined in claim 7, wherein in step (d), said one-piece continuous liner is rolled out over said plurality of posts.

9. The method as defined in claim 8, wherein in step (d), said one-piece continuous liner is rolled out over said plurality of posts under tension.

10. The method as defined in claim 1, wherein in step (d), said one-piece continuous liner is secured to at least two of said plurality of posts by a combination of an adhesive and a plurality of fasteners.

11. The method as defined in claim 10, wherein in step (d), said one-piece continuous liner is rolled out over said plurality of posts.

12. The method as defined in claim 11, wherein in step (d), said one-piece continuous liner is rolled out over said plurality of posts under tension.

13. The method as defined in claim 1, wherein step (d) is performed before step (e), and wherein each said post has the guide opening provided proximate to a top end thereof and another guide opening proximate to a bottom end thereof, and wherein said pre-configured punching die has a guiding pin member proximate to a top end thereof and proximate to a bottom end thereof, and wherein said pre-configured punching die has a plurality of shearing punches provided between said guiding pin members, wherein each shearing punch is sized and distanced from one another commensurate with a size and distance of said slots of each said post.

14. The method as defined in claim 13, wherein step (e) further includes the sub-steps of:
    e1) inserting the guiding pin members into said openings proximate to said top and bottom ends of said post;
    e2) applying a force to said pre-configured punching die such that said shearing punches are forced through said one-piece continuous liner and into said slots of said posts in order to provide slots through said one-piece continuous liner which are in communication with said slots of said posts; and
    e3) removing said pre-configured punching die from said one-piece continuous liner.

15. The method as defined in claim 1, wherein step (e) is performed before step (d), and wherein said one-piece continuous liner is provided with the plurality of guide openings proximate to a top end thereof and proximate to a bottom end thereof, and wherein said pre-configured punching die has a guiding pin member proximate to a top end thereof and proximate to a bottom end thereof, and wherein said pre-configured punching die has a plurality of shearing punches provided between said guiding pin members, wherein each shearing punch is sized and distanced from one another commensurate with a size and distance of said slots of each said post.

16. The method as defined in claim 15, wherein step (e) further includes the sub-steps of:
  e1) inserting the guiding pin members into said openings proximate to said top and bottom ends of said one-piece continuous liner;
  e2) applying a force to said pre-configured punching die such that said shearing punches are forced through said one-piece continuous liner in order to provide slots through said one-piece continuous liner which are configured to be in communication with said slots of said posts during step (e); and
  e3) removing said pre-configured punching die from said one-piece continuous liner.

17. The method as defined in claim 15, further comprising the step of: aligning the punched slots through said one-piece continuous liner from step (c) with said slots of said posts before performing step (d).

18. The method as defined in claim 15, further comprising the step of:
  f) aligning the punched slots through said one-piece continuous liner from step (e) with said slots of said posts while performing step (d).

19. The method as defined in claim 1, wherein said slots punched through said one-piece continuous liner are larger in size than said slots provided through said posts.

20. The method as defined in claim 19, wherein a single pre-configured punching die is used to punch said slots through said one-piece continuous liner.

21. The method as defined in claim 19, wherein first and second pre-configured punching dies are used to punch said slots through said one-piece continuous liner, said first pre-configured punching die being used to punch said slots through said one-piece continuous liner which are generally equivalent in size to said slots provided through said posts, and said second pre-configured punching die being used to punch through said one-piece continuous liner in order to enlarge the size of said slots previously punched through said one-piece continuous liner.

22. The method of claim 1, wherein the guide opening is provided in each of the plurality of posts and is positioned above a top edge of the liner.

23. The method of claim 1, wherein the guide opening is generally circular in shape and the shape of each slot of each post is generally elongated.

24. The method of claim 1, wherein each guide opening defines a first area, and wherein a second area of each slot of each post is greater than the first area.

25. The method of claim 1, wherein a top edge of the liner is positioned below a top edge of each of the plurality of posts and a bottom edge of the liner is positioned above a bottom edge of each of the plurality of posts.

26. A method of forming an inner wall of a sidewall configuration of a trailer, said method comprising the steps of:
  a) providing a plurality of posts, each post having slots provided therethrough;
  b) providing at least one pre-configured punching die;
  c) providing a one-piece continuous liner;
  d) positioning said one piece continuous liner against said posts
  e) securing said one piece continuous liner to said plurality of posts; and
  f) punching slots through said one-piece continuous liner with said at least one pre-configured punching die while said one-piece continuous liner is positioned against said posts,
  wherein step (e) can be performed either before or after step (f),
  wherein each post is a monolithic, unitary member spaced-apart from each adjacent post, and wherein each post includes a single, planar surface configured to engage the liner, and
  wherein step (e) includes securing the one-piece continuous liner to the single, planar surface of each post.

27. A method of forming an inner wall of a sidewall configuration of a trailer, said method comprising the steps of:
  a) providing a plurality of posts, each post having slots provided therethrough;
  b) providing at least one pre-configured punching die;
  c) providing a one-piece continuous liner;
  d) positioning said one piece continuous liner against said posts
  e) securing said one piece continuous liner to said plurality of posts; and
  f) punching slots through said one-piece continuous liner with said at least one pre-configured punching die while said one-piece continuous liner is positioned against said posts,
  wherein step (e) can be performed either before or after step (f),
  wherein step (f) includes positioning the pre-configured punching die adjacent another one of the plurality of posts after the punching.

28. The method of claim 27, wherein the at least one pre-configured punching dies includes an elongated body and a plurality of shearing punches between an upper guide pin member and a lower guide pin member

29. The method of claim 28, wherein step (f) further includes:
  f1) positioning the pre-configured punching die adjacent a first one of the plurality of posts;
  f2) inserting the guide pin members into openings proximate to the top and bottom ends of the first post;
  f3) applying a downward force to the pre-configured punching die in order to force the shearing punches through the one-piece continuous liner;
  f4) removing the guide pin members of the pre-configured punching die from the openings of the first one of the plurality of posts;
  f5) positioning the pre-configured punching die adjacent a second one of the plurality of posts; and
  f6) applying a downward force to the pre-configured punching die in order to force the shearing punches through the one-piece continuous liner.

* * * * *